(12) United States Patent
Takahashi et al.

(10) Patent No.: US 10,756,579 B2
(45) Date of Patent: Aug. 25, 2020

(54) TRANSMISSION UNIT, RECEPTION UNIT, AND COMMUNICATION SYSTEM

(71) Applicant: Sony Corporation, Tokyo (JP)

(72) Inventors: Hiroo Takahashi, Kanagawa (JP); Hideyuki Matsumoto, Tokyo (JP); Tatsuya Sugioka, Tokyo (JP); Hiroaki Hayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/030,202

(22) Filed: Jul. 9, 2018

(65) Prior Publication Data

US 2018/0331585 A1   Nov. 15, 2018

Related U.S. Application Data

(60) Continuation of application No. 15/284,129, filed on Oct. 3, 2016, now Pat. No. 10,038,346, which is a (Continued)

(30) Foreign Application Priority Data

May 30, 2014  (JP) .................................. 2014-112685

(51) Int. Cl.
*G06F 11/00* (2006.01)
*H02J 50/60* (2016.01)
(Continued)

(52) U.S. Cl.
CPC ............. *H02J 50/60* (2016.02); *H02J 50/12* (2016.02); *H02J 50/80* (2016.02); *H04L 25/028* (2013.01);
(Continued)

(58) Field of Classification Search
CPC .. H02J 50/60; H02J 50/12; H02J 50/80; H02J 7/025; H04L 25/03878; H04L 25/03343;
(Continued)

(56) References Cited

U.S. PATENT DOCUMENTS 6,369,137 B2   4/2002   Kersjes et al.
7,568,127 B2   7/2009   Volk
(Continued)

FOREIGN PATENT DOCUMENTS

JP   2002-094365 A   3/2002
JP   2010-056620 A   3/2010
(Continued)

OTHER PUBLICATIONS

European Office Communication pursuant to Article 94(C) dated Dec. 12, 2018 for corresponding European Application No. 15727075.2.
(Continued)

*Primary Examiner* — Dav V Ha
(74) *Attorney, Agent, or Firm* — Michael Best & Friedrich LLP

(57) ABSTRACT

A transmitter includes: a transmission control circuit that determines whether or not to perform an emphasis on a data signal, based on a transition pattern of the data signal; and a transmission driver that selectively performs the emphasis based on a result of the determination by the transmission control circuit, to generate at least one transmission signal.

23 Claims, 38 Drawing Sheets

Related U.S. Application Data division of application No. 15/059,915, filed on Mar. 3, 2016, now Pat. No. 9,515,858, which is a continuation of application No. PCT/JP2015/002347, filed on May 8, 2015.

(51) Int. Cl.

| | | |
|---|---|---|
| *H04L 25/03* | (2006.01) | |
| *H04L 25/02* | (2006.01) | |
| *H02J 50/80* | (2016.01) | |
| *H02J 50/12* | (2016.01) | |
| *H04L 25/49* | (2006.01) | |
| *H02J 7/02* | (2016.01) | |

(52) U.S. Cl.
CPC .. *H04L 25/03343* (2013.01); *H04L 25/03878* (2013.01); *H02J 7/025* (2013.01); *H04L 25/0272* (2013.01); *H04L 25/4917* (2013.01)

(58) Field of Classification Search
CPC .............. H04L 25/028; H04L 25/4917; H04L 25/0272
See application file for complete search history.

(56) References Cited

U.S. PATENT DOCUMENTS

| | | | |
|---|---|---|---|
| 7,924,046 | B1 | 4/2011 | Ding |
| 8,289,049 | B2 | 10/2012 | Matsushima |
| 8,654,890 | B2 * | 2/2014 | Jin .................... H04L 25/03885 375/232 |
| 8,934,598 | B2 * | 1/2015 | Gupta ...................... H04N 5/21 375/371 |
| 9,148,198 | B1 | 9/2015 | Zhang et al. |
| 9,246,715 | B1 * | 1/2016 | Chan ................... H04L 25/0272 |
| 2002/0167999 | A1 | 11/2002 | Naito et al. |
| 2003/0099311 | A1 | 5/2003 | Klingenbrunn et al. |
| 2004/0076228 | A1 | 4/2004 | Park et al. |
| 2004/0196408 | A1 | 10/2004 | Ishikawa |
| 2004/0223768 | A1 | 11/2004 | Shastri et al. |
| 2005/0169412 | A1 | 8/2005 | Yang |
| 2006/0233287 | A1 | 10/2006 | Yang |
| 2007/0025488 | A1 | 2/2007 | Ho |
| 2007/0063739 | A1 | 3/2007 | Kim |
| 2009/0290651 | A1 | 11/2009 | Okamura |
| 2009/0290671 | A1 | 11/2009 | Rea et al. |
| 2009/0296851 | A1 * | 12/2009 | Ono .................... H04L 25/0272 375/295 |
| 2010/0177830 | A1 | 7/2010 | Dreps |
| 2010/0266066 | A1 | 10/2010 | Werner |
| 2013/0058389 | A1 | 3/2013 | Hung |
| 2014/0064404 | A1 | 3/2014 | Gonzalez |
| 2015/0312066 | A1 | 10/2015 | Liao et al. |

FOREIGN PATENT DOCUMENTS

| | | |
|---|---|---|
| JP | 2011-142382 A | 7/2011 |
| JP | 2011-239374 A | 11/2011 |
| JP | 2015527797 A | 9/2015 |
| JP | 2017-063475 A | 3/2017 |
| JP | 6369137 | 7/2018 |
| WO | 2008/035582 A1 | 3/2008 |
| WO | 2015/021257 A1 | 2/2015 |

OTHER PUBLICATIONS

International Search Report; International Application No. PCT/JP2015/002347; Filing Date: May 8, 2015. Form PCT/ISA/210.
Japanese Office Action dated Nov. 14, 2017, for corresponding Japanese Application No. 2014-112685.
Chinese Office Action dated Aug. 5, 2019 for corresponding Chinese Application No. 201580026787.1.
Japanese Office Action dated Jun. 12, 2019 for corresponding Japanese Application No. 2018-128332.

* cited by examiner

[Fig. 1]
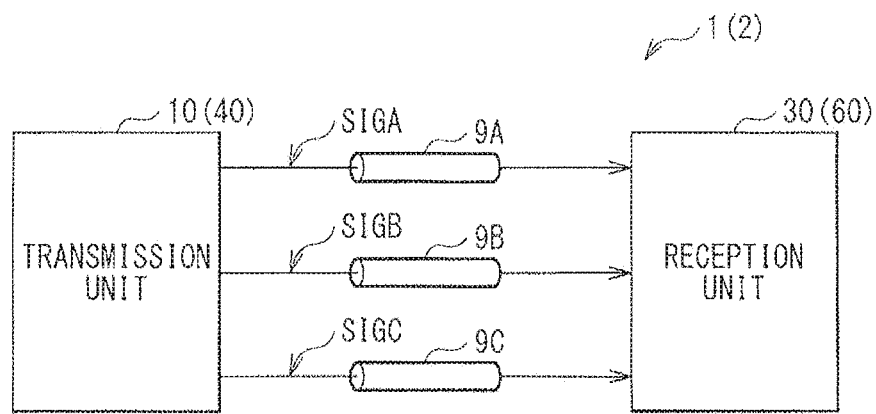
[Fig. 2]

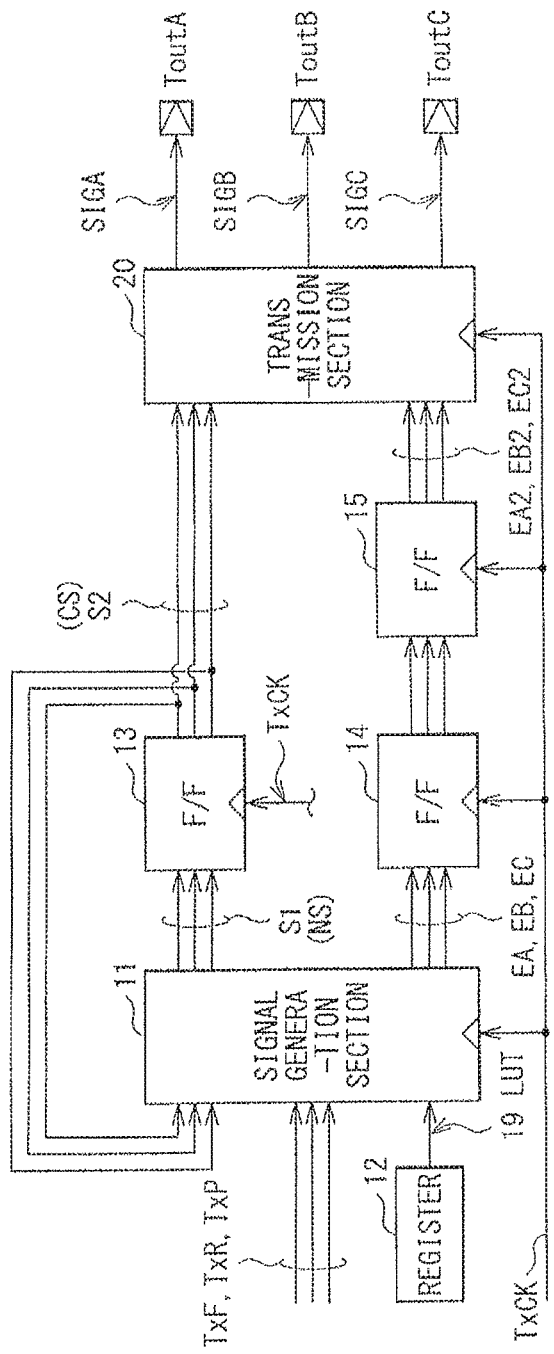
[Fig. 3]

[Fig. 4]
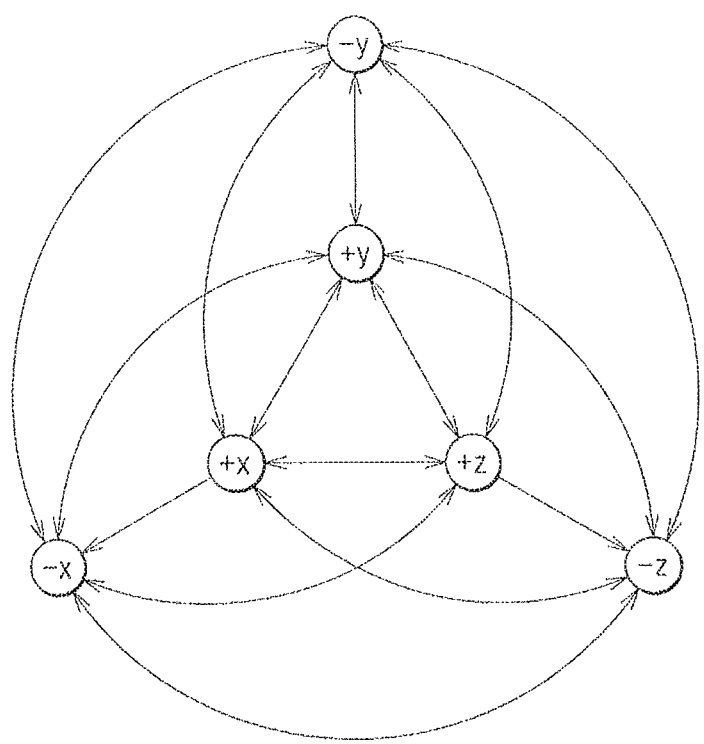

[Fig. 5]
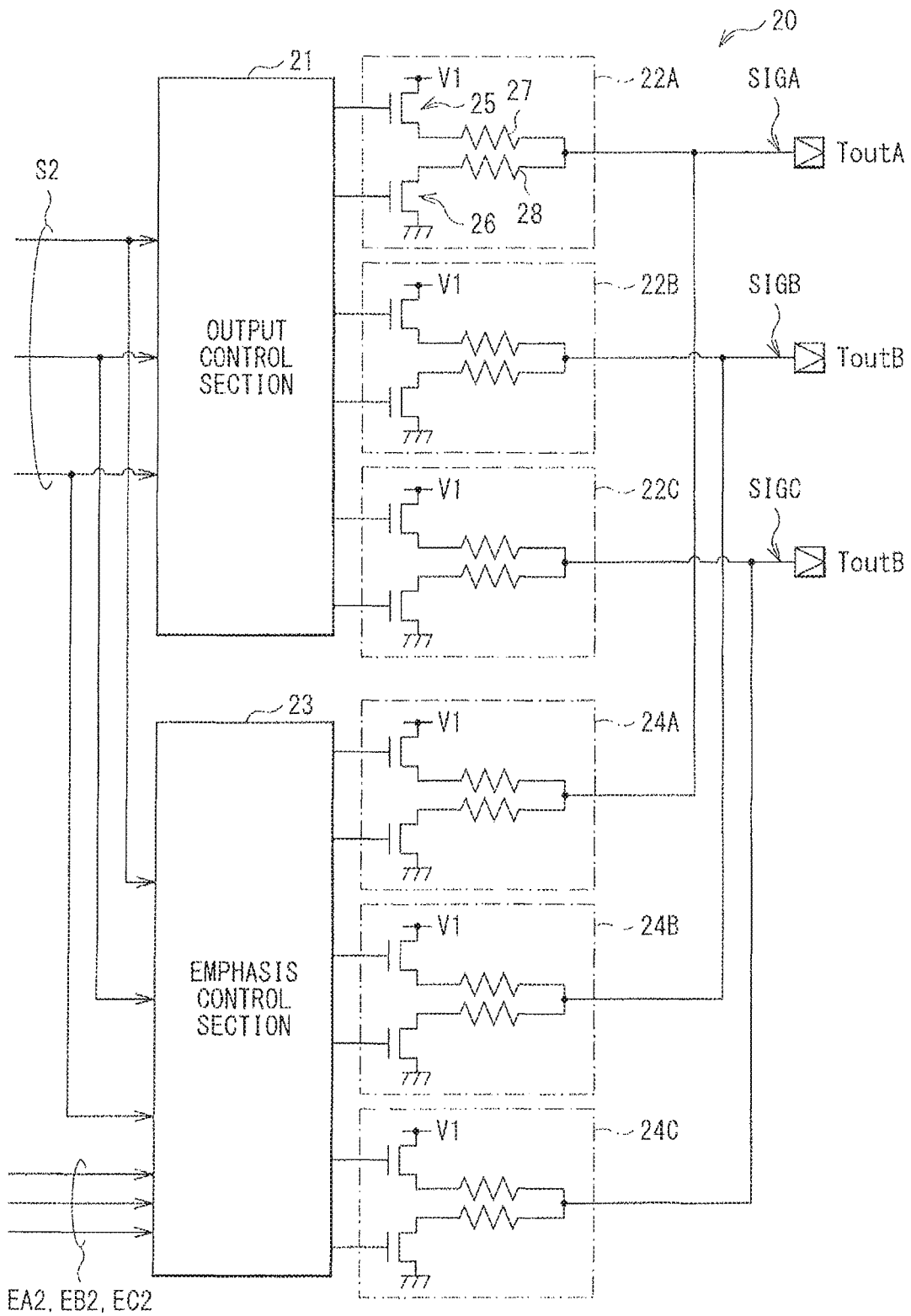

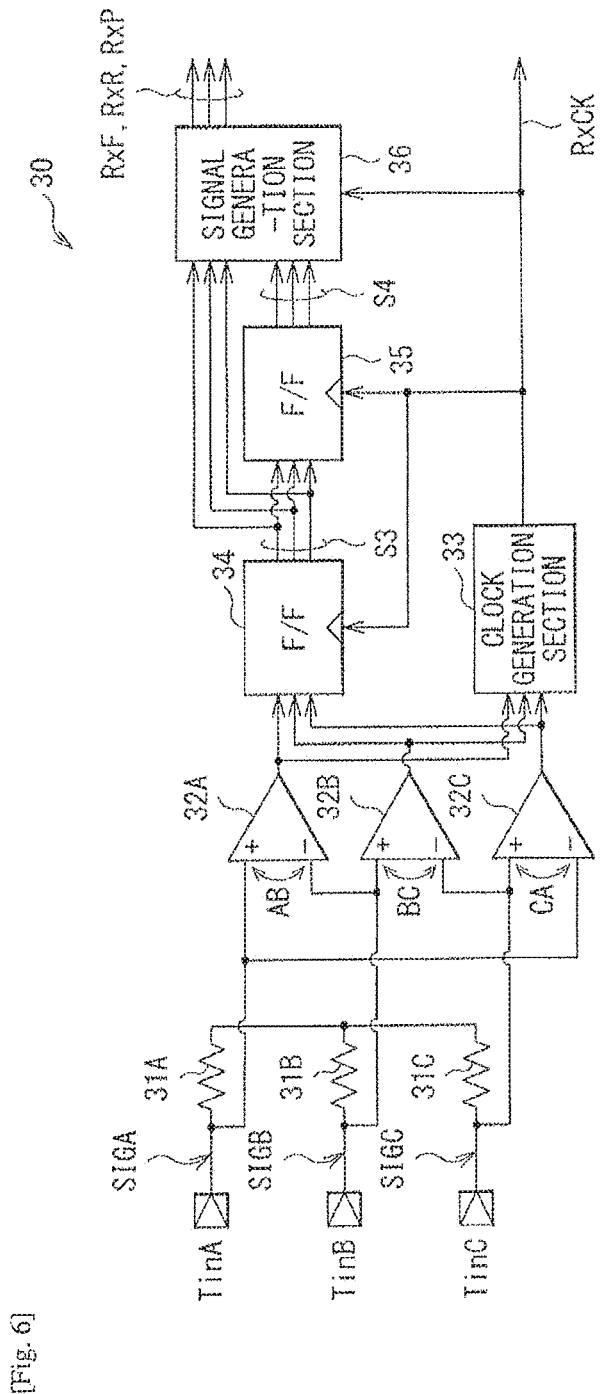
[Fig. 6]

[Fig. 7]
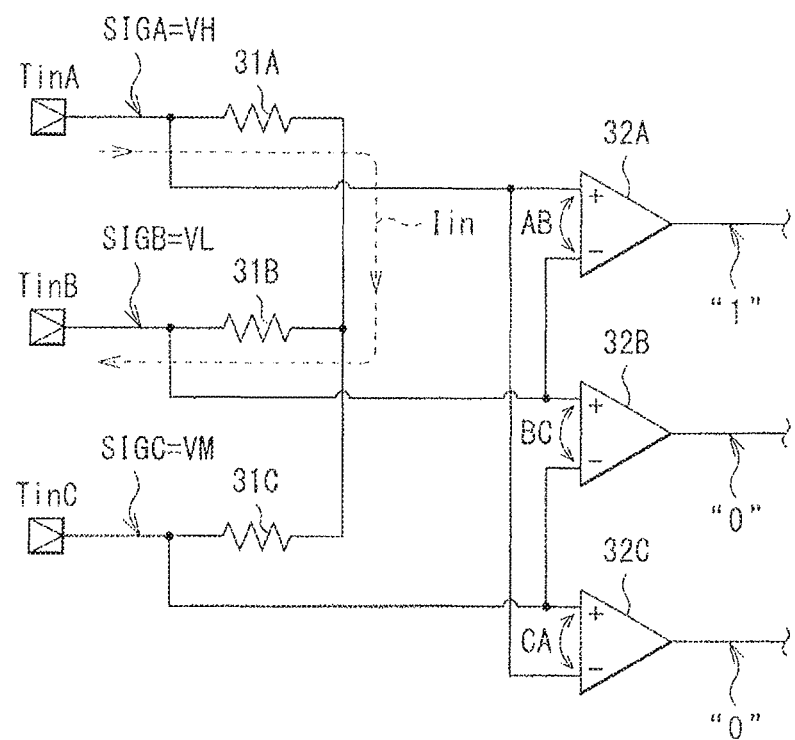

[Fig. 8]

| CS | TxF, TxR, TxP | NS | EA, EB, EC |
|---|---|---|---|
| +x | 000 | +z | 101 |
| | 001 | -z | 101 |
| | 010 | +y | 011 |
| | 011 | -y | 011 |
| | 100 | -x | 110 |
| +y | 000 | +x | 110 |
| | 001 | -x | 101 |
| | 010 | +z | 101 |
| | 011 | -z | 101 |
| | 100 | -y | 011 |
| +z | 000 | +y | 011 |
| | 001 | -y | 011 |
| | 010 | +x | 110 |
| | 011 | -x | 110 |
| | 100 | -z | 101 |
| -x | 000 | -z | 101 |
| | 001 | +z | 101 |
| | 010 | -y | 011 |
| | 011 | +y | 011 |
| | 100 | +x | 110 |
| -y | 000 | -x | 110 |
| | 001 | +x | 110 |
| | 010 | -z | 101 |
| | 011 | +z | 101 |
| | 100 | +y | 011 |
| -z | 000 | -y | 011 |
| | 001 | +y | 011 |
| | 010 | -x | 110 |
| | 011 | +x | 110 |
| | 100 | +z | 101 |

[Fig. 9A]
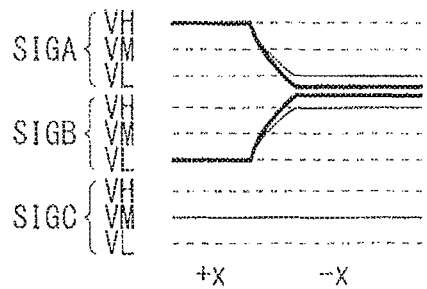
[Fig. 9B]
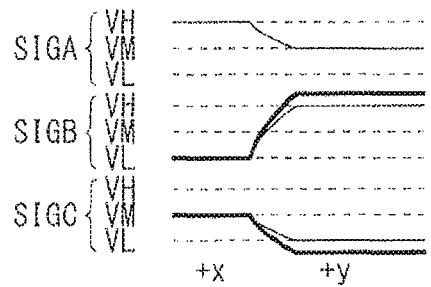
[Fig. 9C]
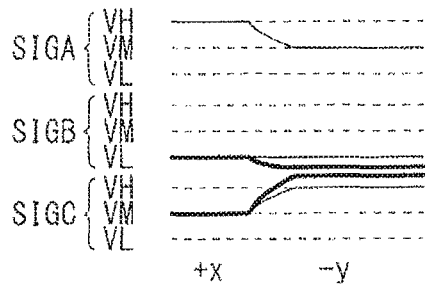
[Fig. 9D]
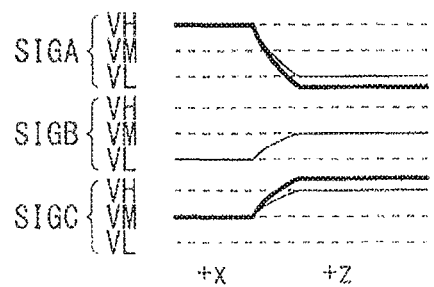
[Fig. 9E]
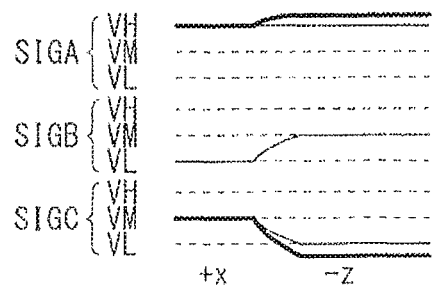

[Fig. 10A]
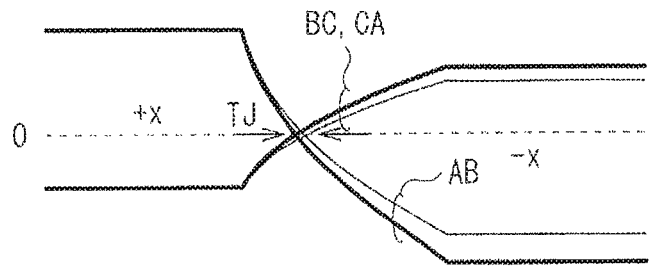
[Fig. 10B]
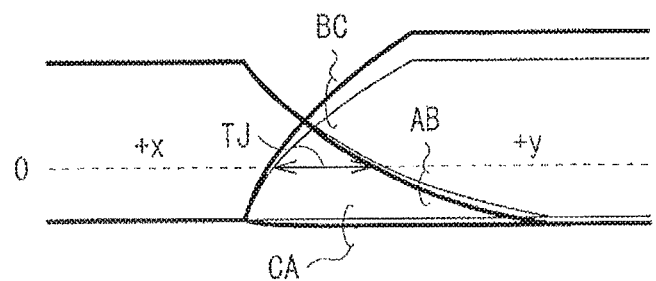
[Fig. 10C]
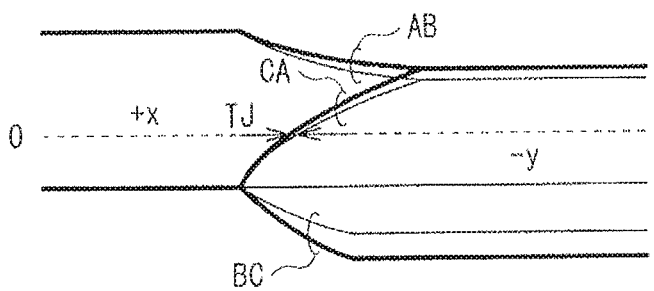
[Fig. 10D]
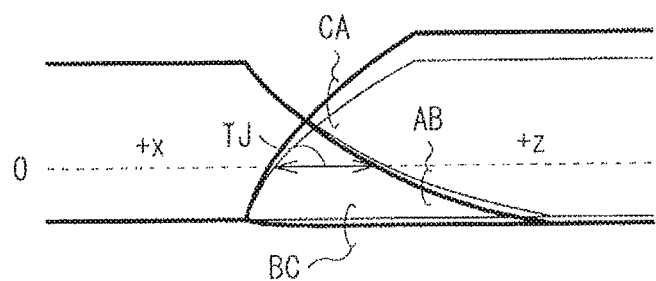
[Fig. 10E]
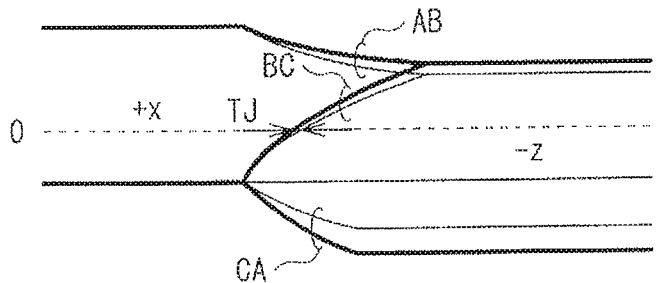

[Fig. 11A]
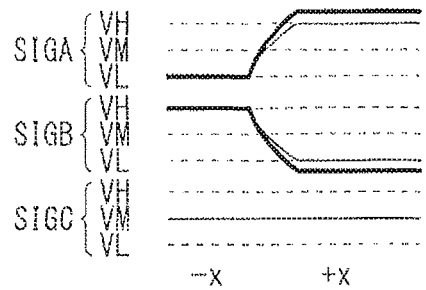
[Fig. 11B]
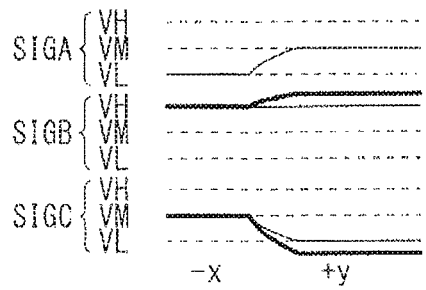
[Fig. 11C]
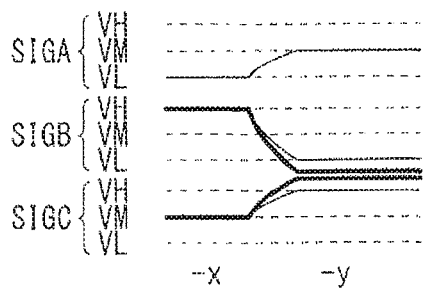
[Fig. 11D]
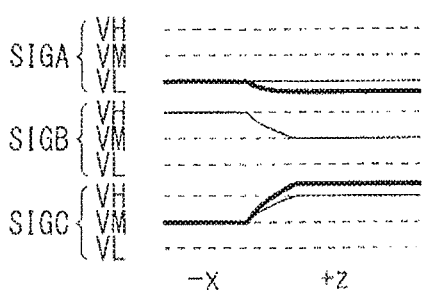
[Fig. 11E]
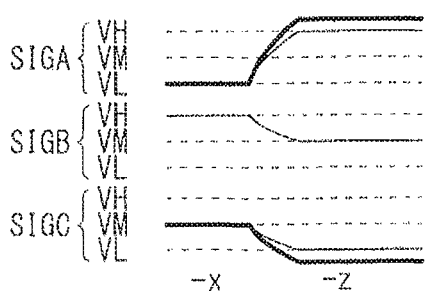

[Fig. 12A]
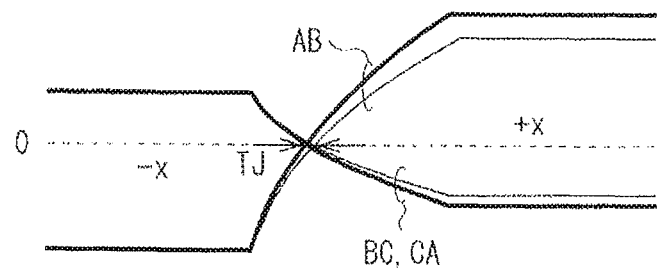
[Fig. 12B]
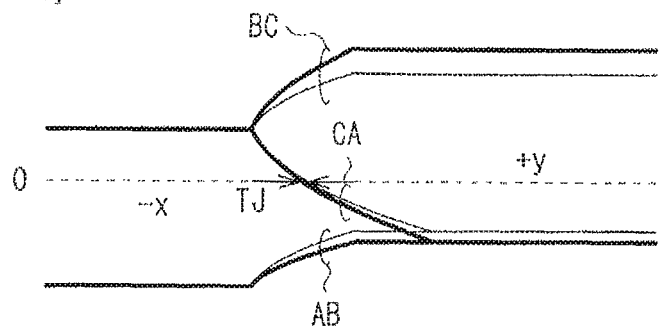
[Fig. 12C]
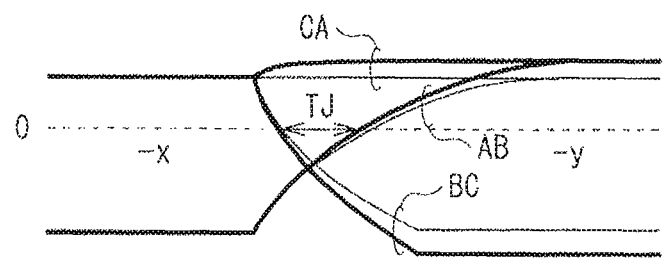
[Fig. 12D]
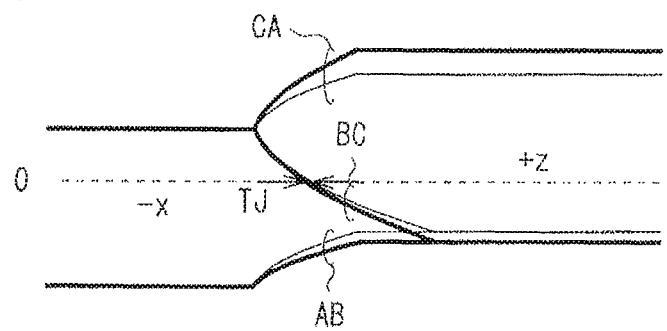
[Fig. 12E]
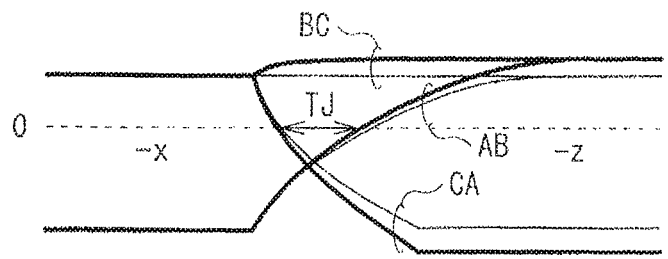

[Fig. 13]
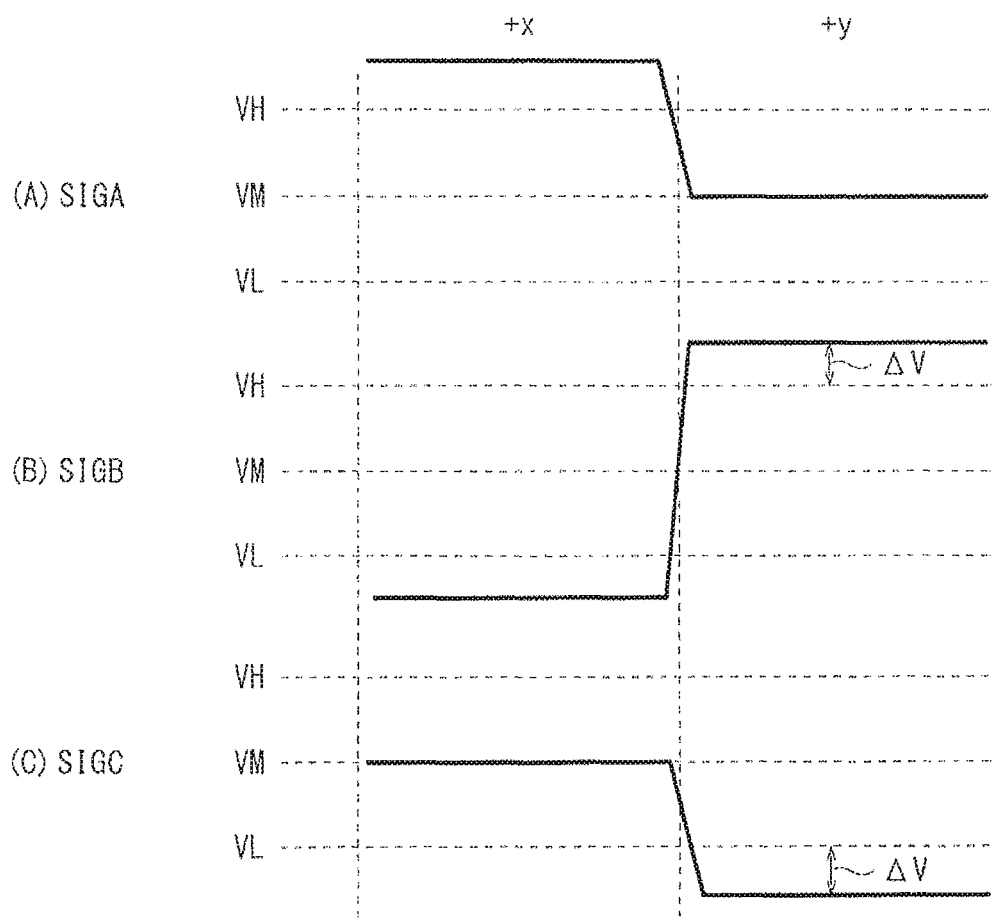

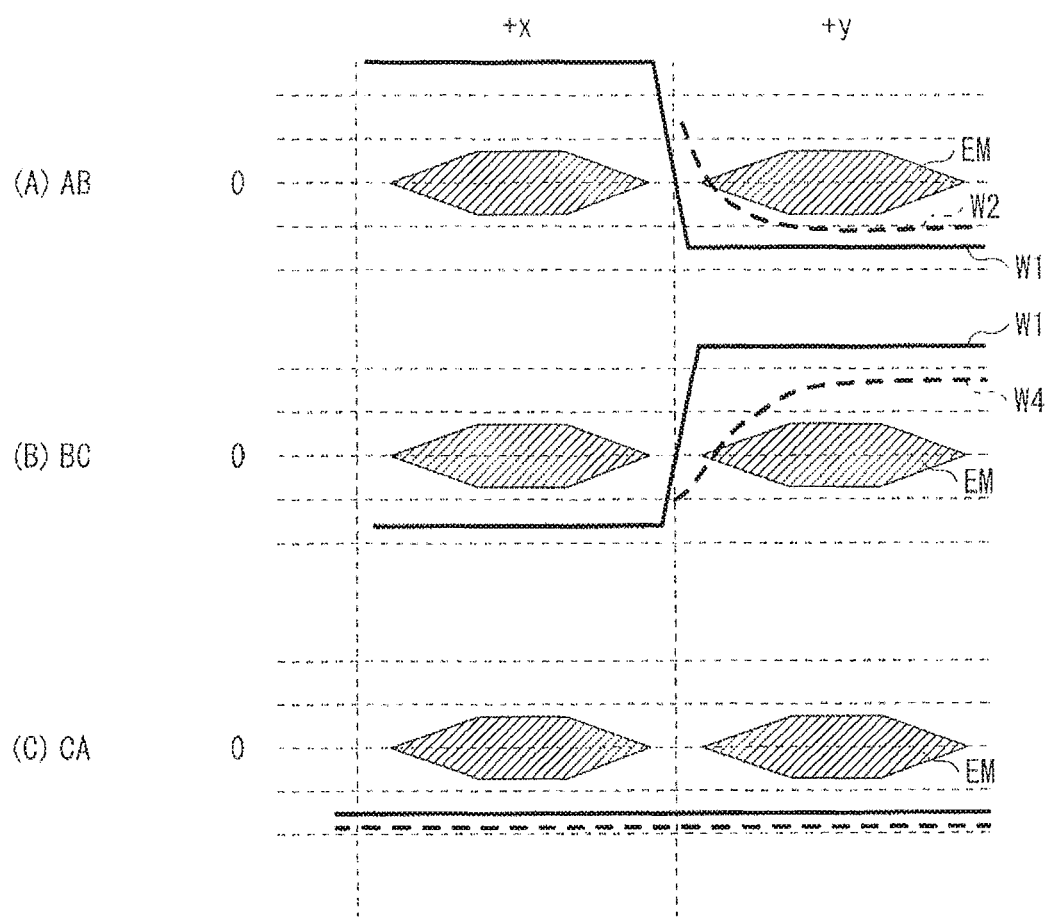
[Fig. 14]

[Fig. 15]
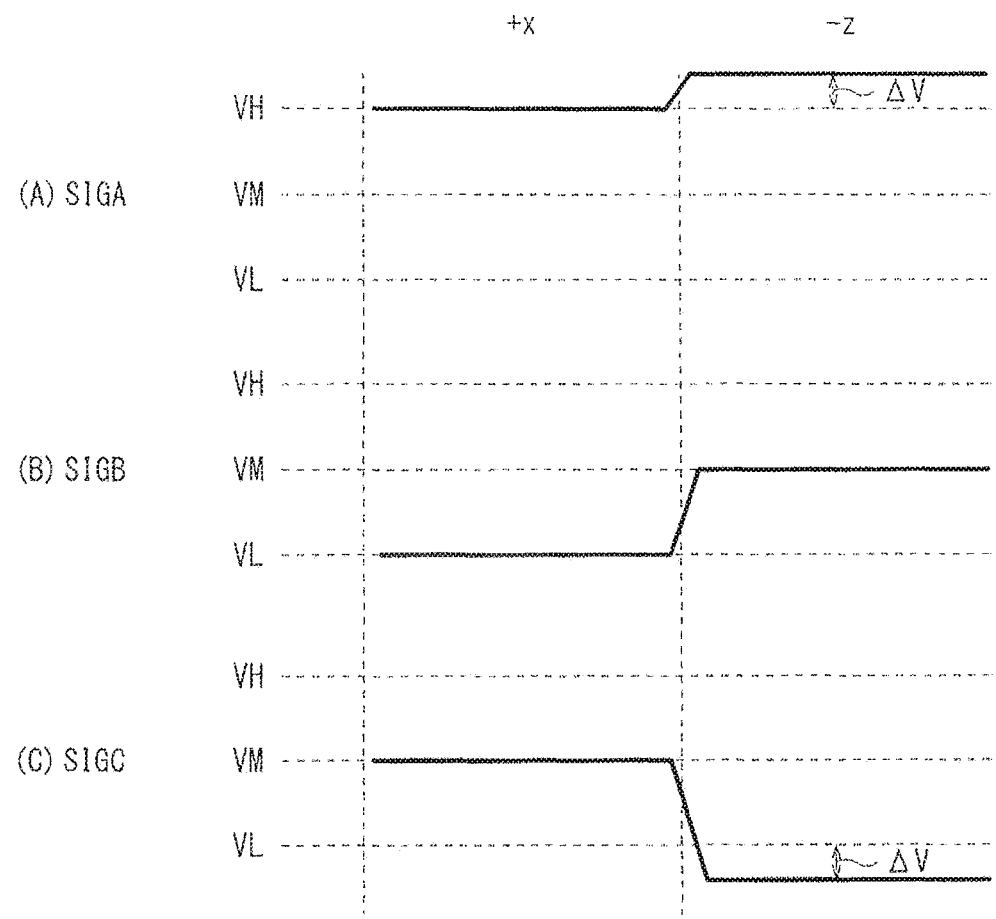

[Fig. 16]
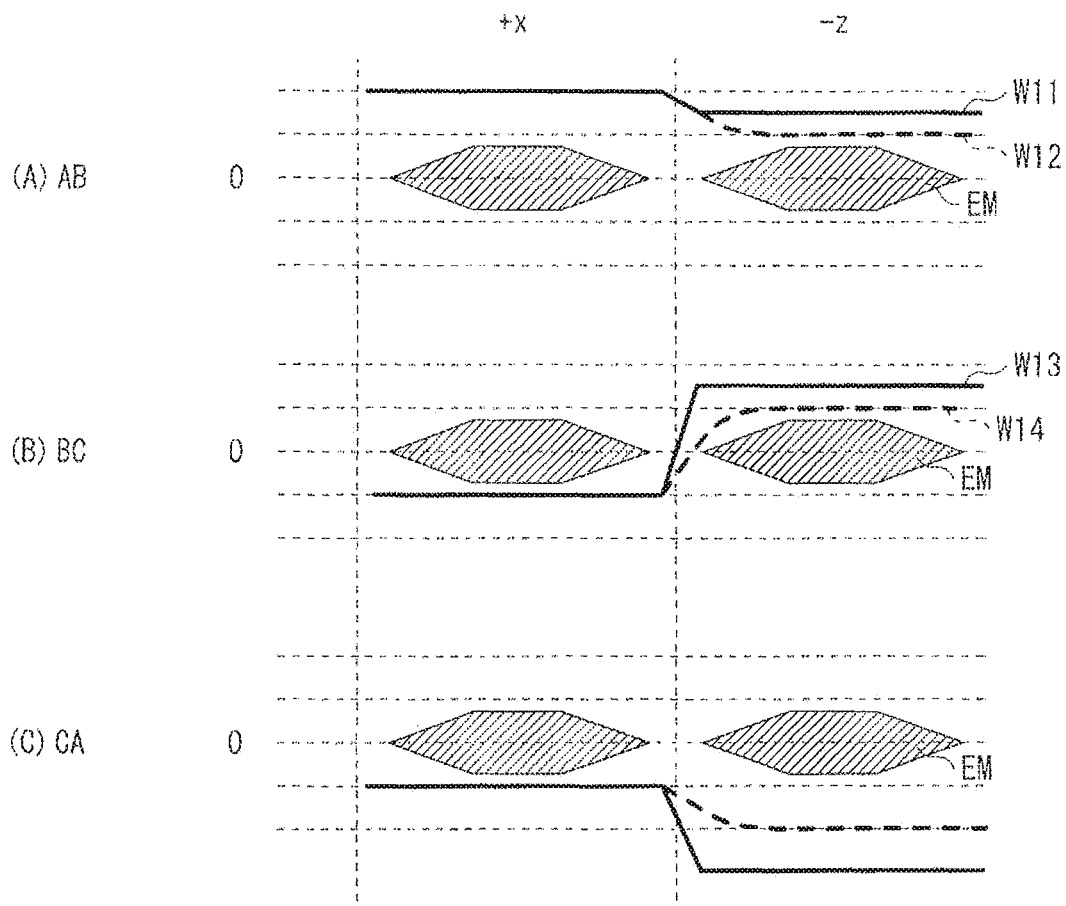

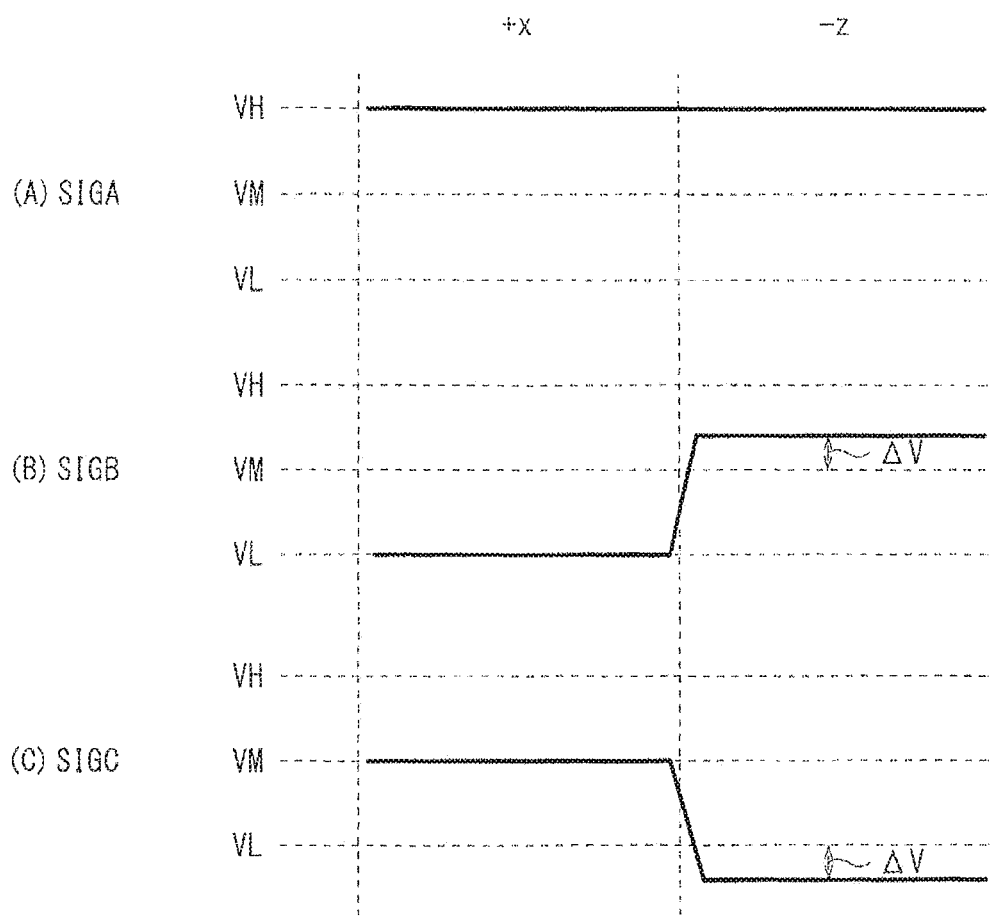
[Fig. 17]

[Fig. 18]
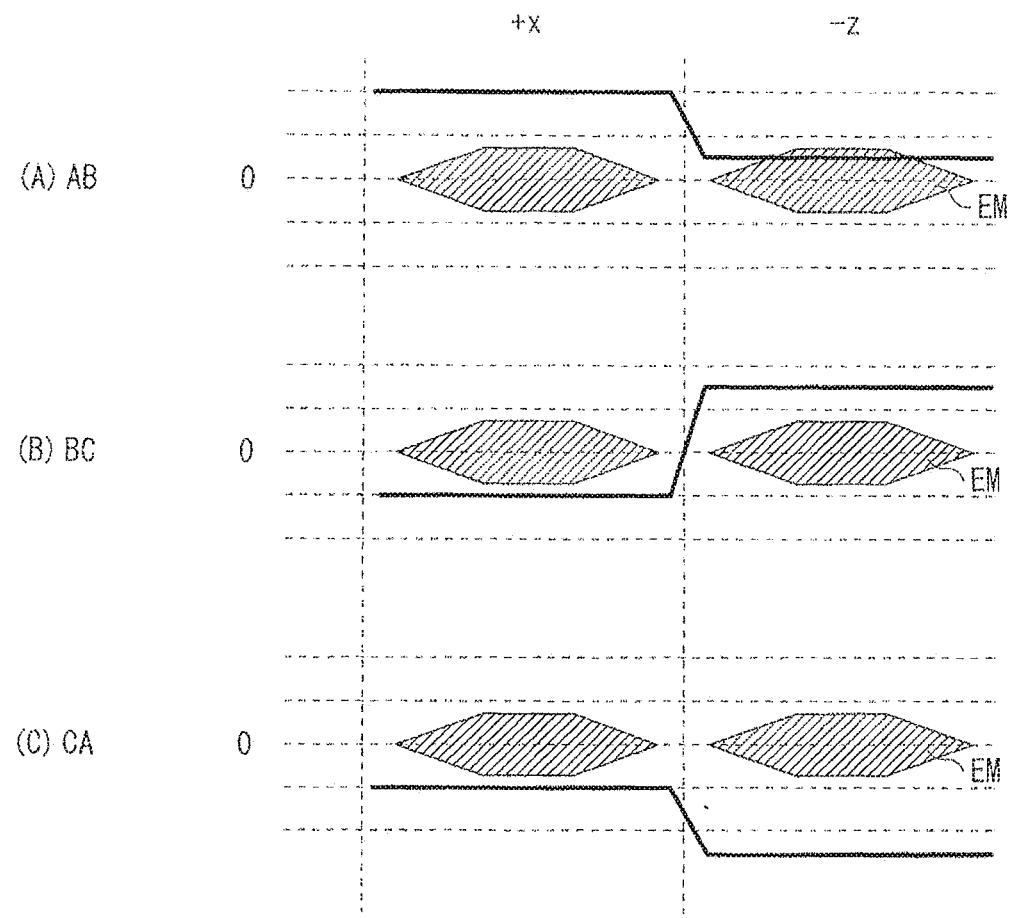

[Fig. 19]

| CS | TxF, TxR, TxP | NS | EA, EB, EC |
|---|---|---|---|
| +x | 000 | +z | 101 |
|    | 001 | -z | 000 |
|    | 010 | +y | 011 |
|    | 011 | -y | 000 |
|    | 100 | -x | 000 |
| +y | 000 | +x | 110 |
|    | 001 | -x | 000 |
|    | 010 | +z | 101 |
|    | 011 | -z | 000 |
|    | 100 | -y | 000 |
| +z | 000 | +y | 011 |
|    | 001 | -y | 000 |
|    | 010 | +x | 110 |
|    | 011 | -x | 000 |
|    | 100 | -z | 000 |
| -x | 000 | -z | 101 |
|    | 001 | +z | 000 |
|    | 010 | -y | 011 |
|    | 011 | +y | 000 |
|    | 100 | +x | 000 |
| -y | 000 | -x | 110 |
|    | 001 | +x | 000 |
|    | 010 | -z | 101 |
|    | 011 | +z | 000 |
|    | 100 | +y | 000 |
| -z | 000 | -y | 011 |
|    | 001 | +y | 000 |
|    | 010 | -x | 110 |
|    | 011 | +x | 000 |
|    | 100 | +z | 000 |

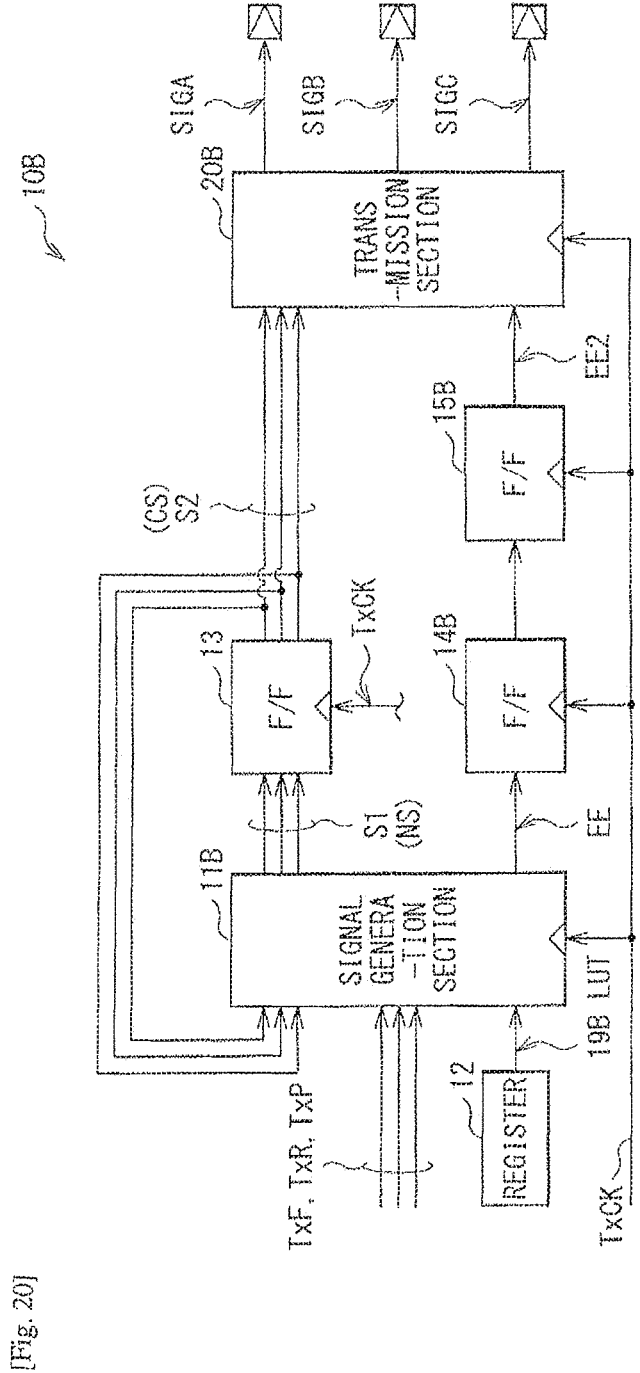
[Fig. 20]

[Fig. 21]

| CS | TxF, TxR, TxP | NS | EE |
|---|---|---|---|
| +x | 000 | +z | 1 |
| | 001 | -z | 0 |
| | 010 | +y | 1 |
| | 011 | -y | 0 |
| | 100 | -x | 0 |
| +y | 000 | +x | 1 |
| | 001 | -x | 0 |
| | 010 | +z | 1 |
| | 011 | -z | 0 |
| | 100 | -y | 0 |
| +z | 000 | +y | 1 |
| | 001 | -y | 0 |
| | 010 | +x | 1 |
| | 011 | -x | 0 |
| | 100 | -z | 0 |
| -x | 000 | -z | 1 |
| | 001 | +z | 0 |
| | 010 | -y | 1 |
| | 011 | +y | 0 |
| | 100 | +x | 0 |
| -y | 000 | -x | 1 |
| | 001 | +x | 0 |
| | 010 | -z | 1 |
| | 011 | +z | 0 |
| | 100 | +y | 0 |
| -z | 000 | -y | 1 |
| | 001 | +y | 0 |
| | 010 | -x | 1 |
| | 011 | +x | 0 |
| | 100 | +z | 0 |

[Fig. 22]
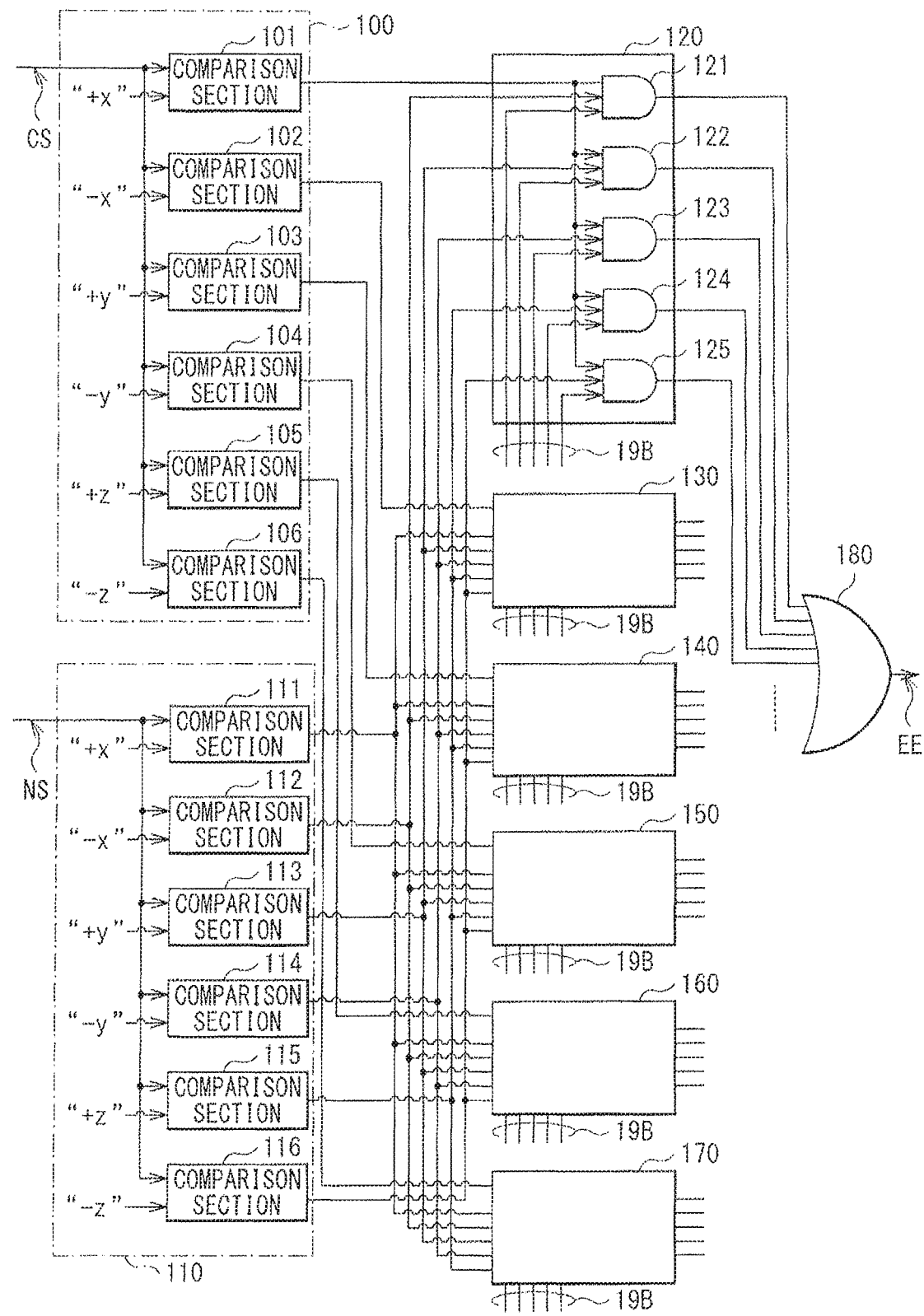

[Fig. 23]

| CS | TxF, TxR, TxP | NS | EA, EB, EC |
|---|---|---|---|
| +x | 000 | +z | 000 |
|    | 001 | -z | 100 |
|    | 010 | +y | 000 |
|    | 011 | -y | 010 |
|    | 100 | -x | 000 |
| +y | 000 | +x | 000 |
|    | 001 | -x | 010 |
|    | 010 | +z | 000 |
|    | 011 | -z | 001 |
|    | 100 | -y | 000 |
| +z | 000 | +y | 000 |
|    | 001 | -y | 001 |
|    | 010 | +x | 000 |
|    | 011 | -x | 100 |
|    | 100 | -z | 000 |
| -x | 000 | -z | 000 |
|    | 001 | +z | 100 |
|    | 010 | -y | 000 |
|    | 011 | +y | 010 |
|    | 100 | +x | 000 |
| -y | 000 | -x | 000 |
|    | 001 | +x | 010 |
|    | 010 | -z | 000 |
|    | 011 | +z | 001 |
|    | 100 | +y | 000 |
| -z | 000 | -y | 000 |
|    | 001 | +y | 001 |
|    | 010 | -x | 000 |
|    | 011 | +x | 100 |
|    | 100 | +z | 000 |

[Fig. 24A]
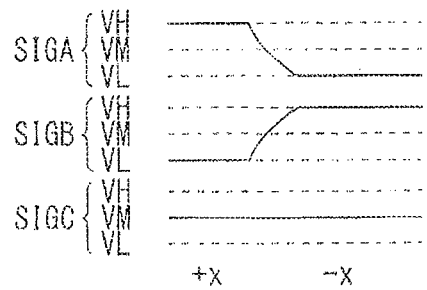
[Fig. 24B]
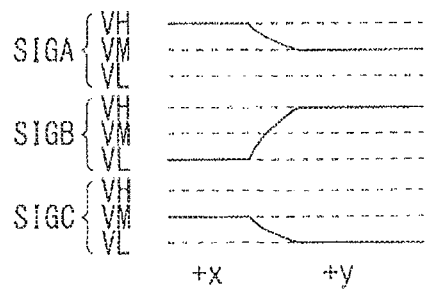
[Fig. 24C]
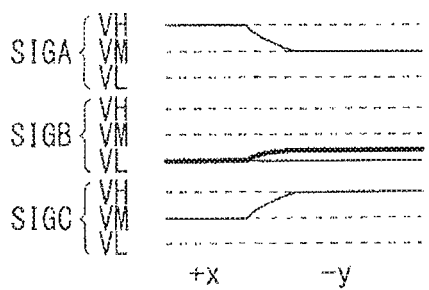
[Fig. 24D]
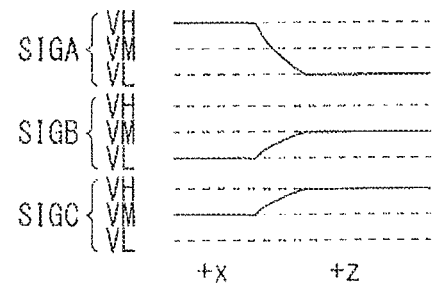
[Fig. 24E]
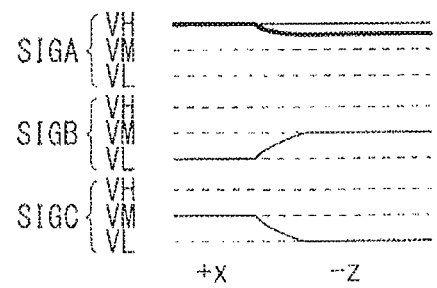

[Fig. 25A]
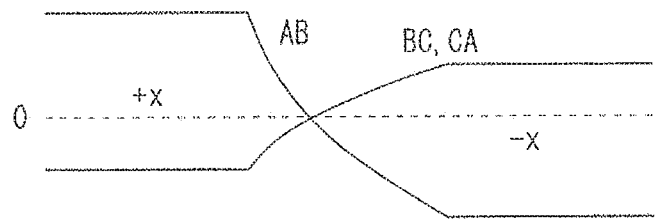
[Fig. 25B]
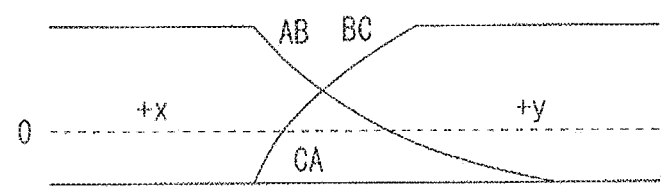
[Fig. 25C]
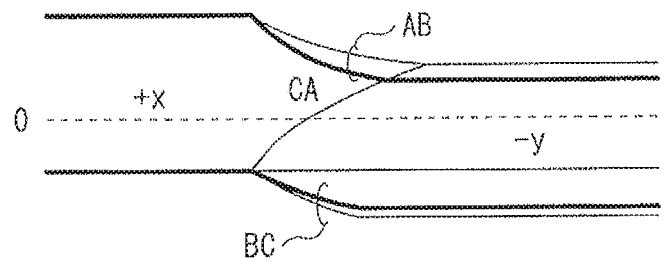
[Fig. 25D]
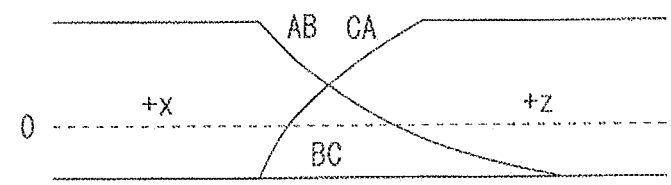
[Fig. 25E]
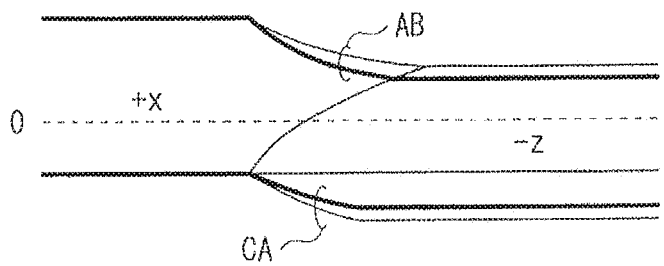

[Fig. 26]
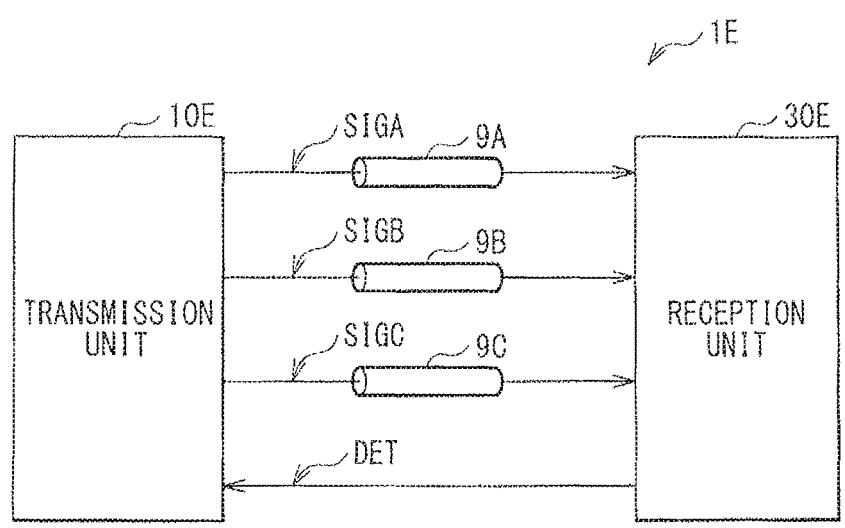

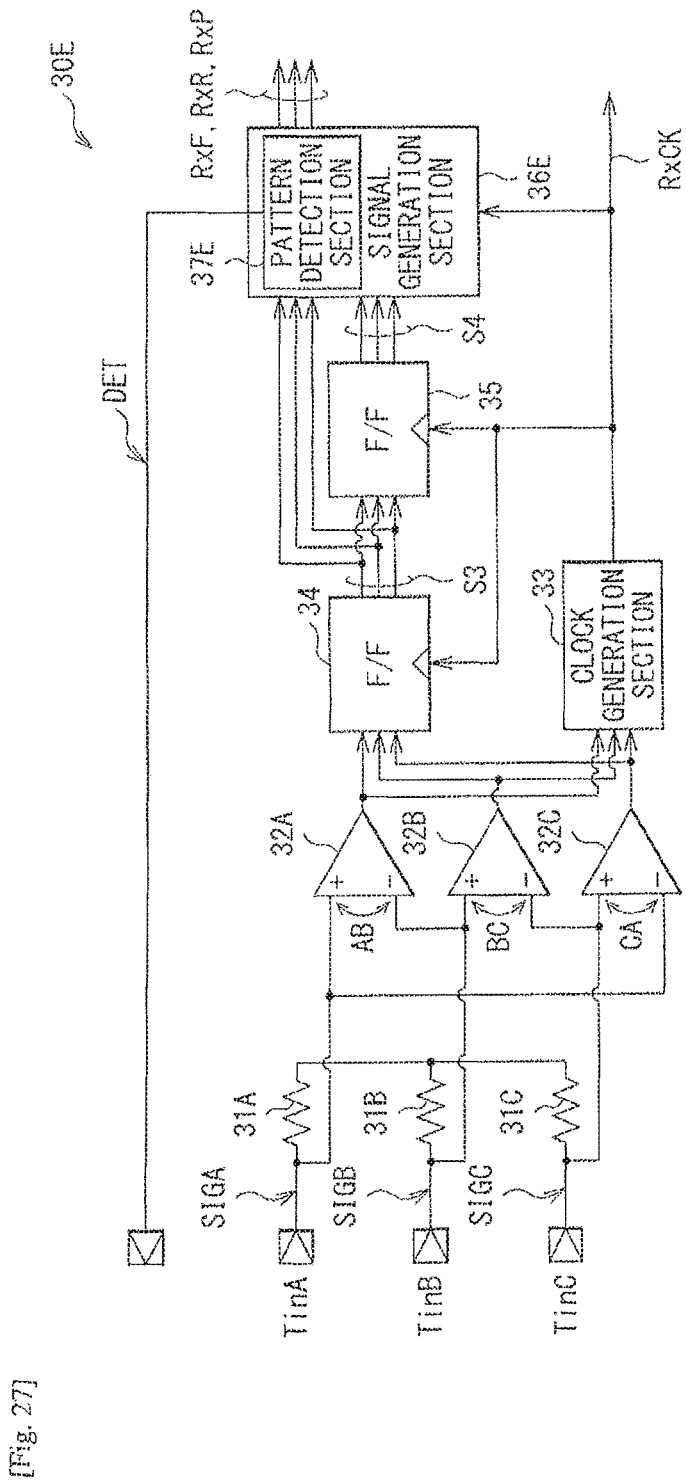
[Fig. 27]

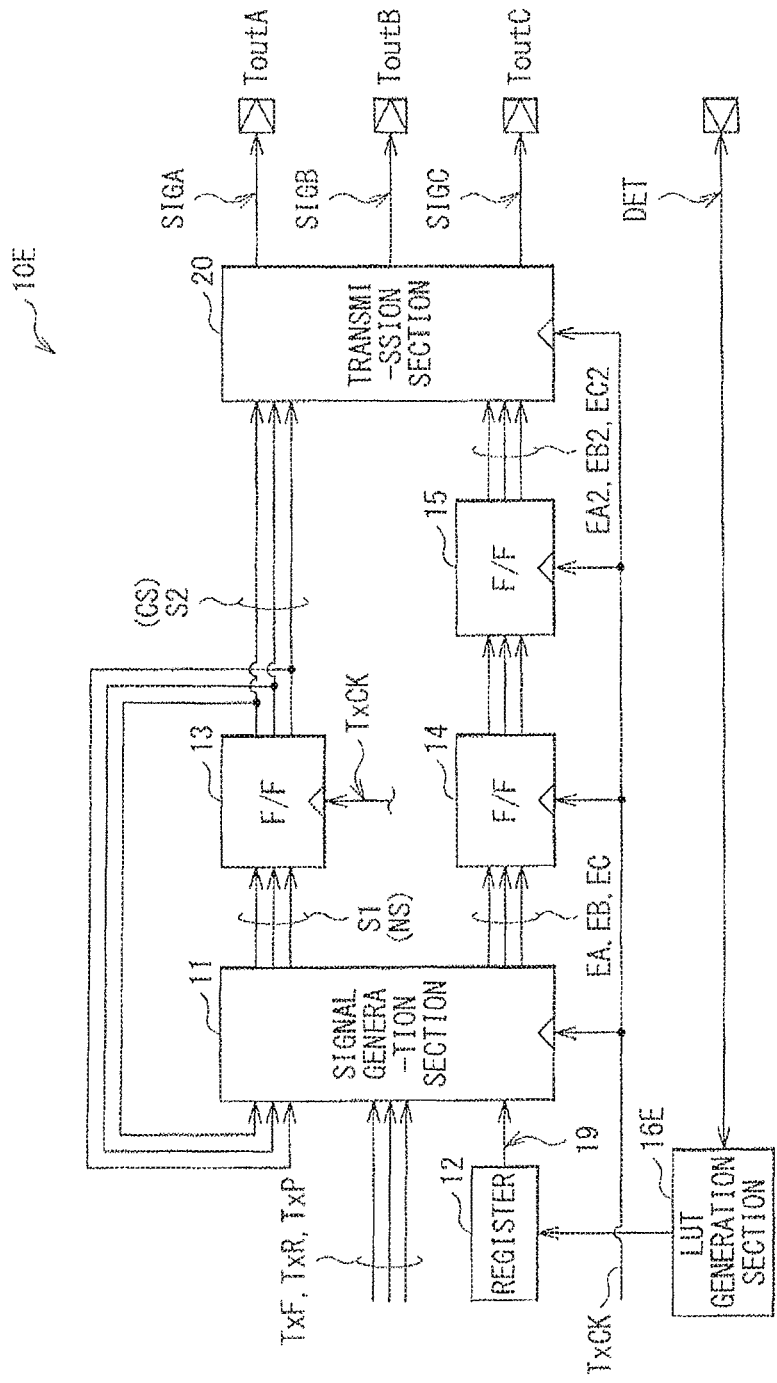
[Fig. 28]

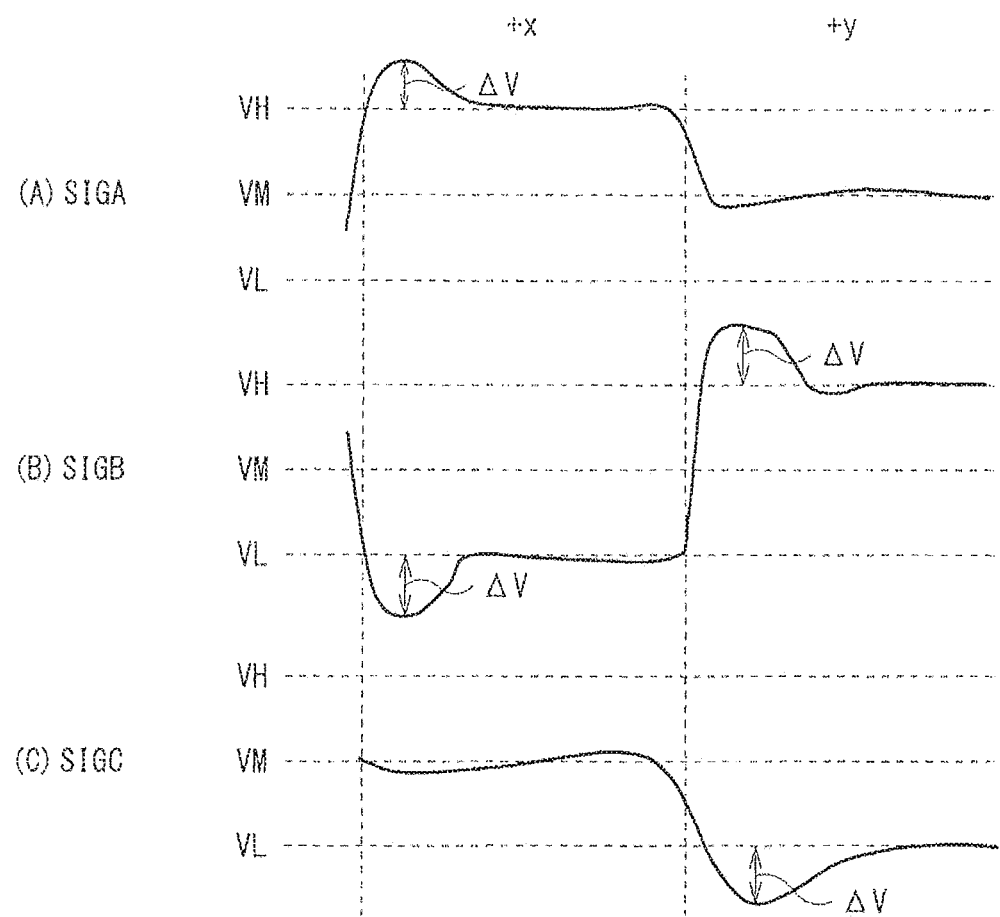
[Fig. 29]

[Fig. 30]
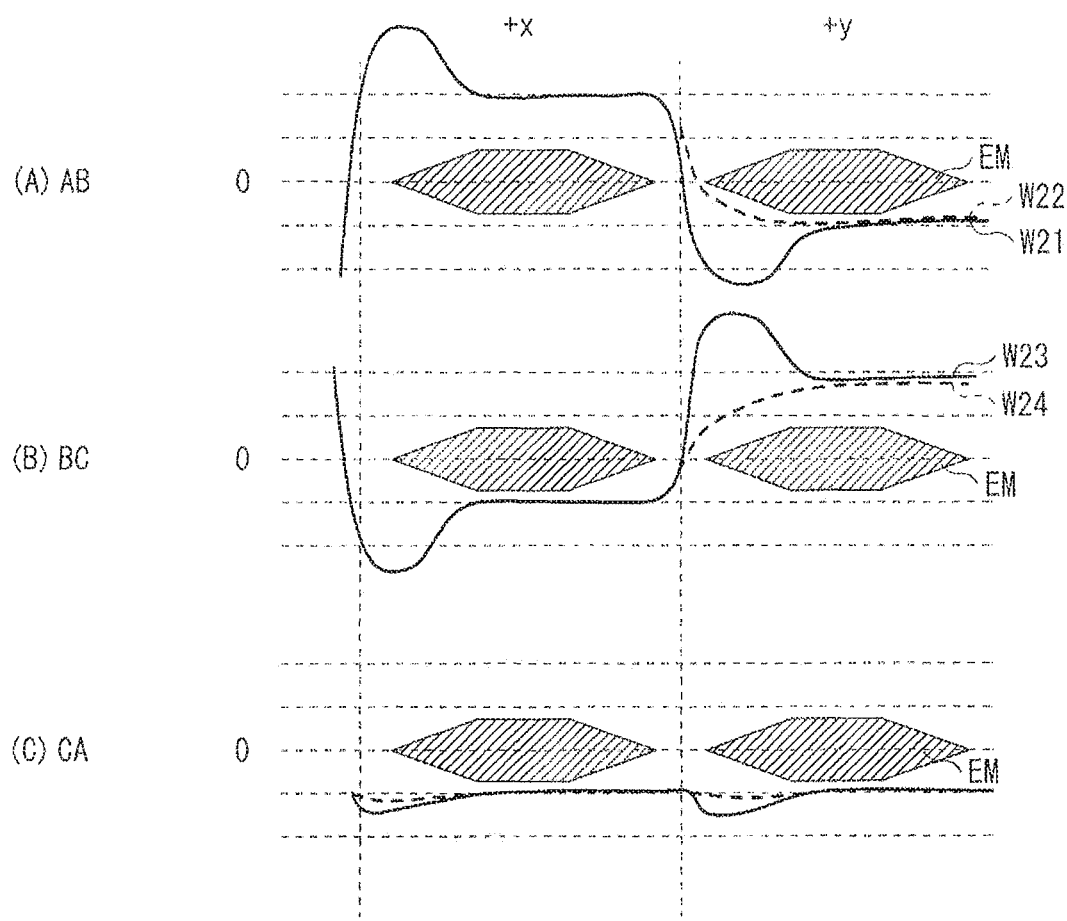

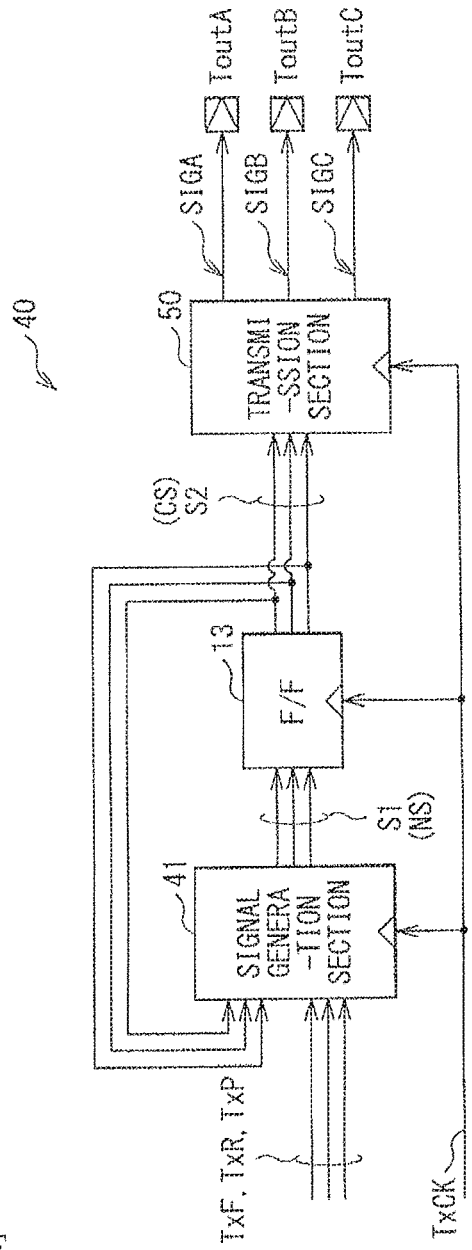
[Fig. 31]

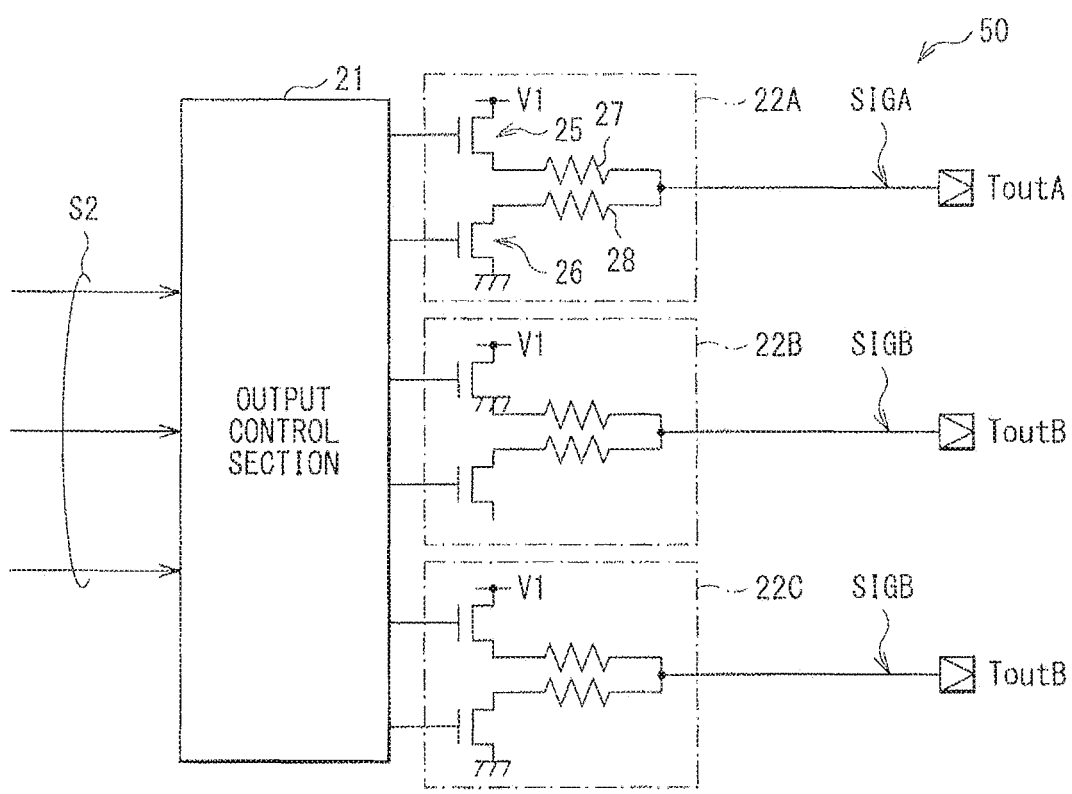
[Fig. 32]

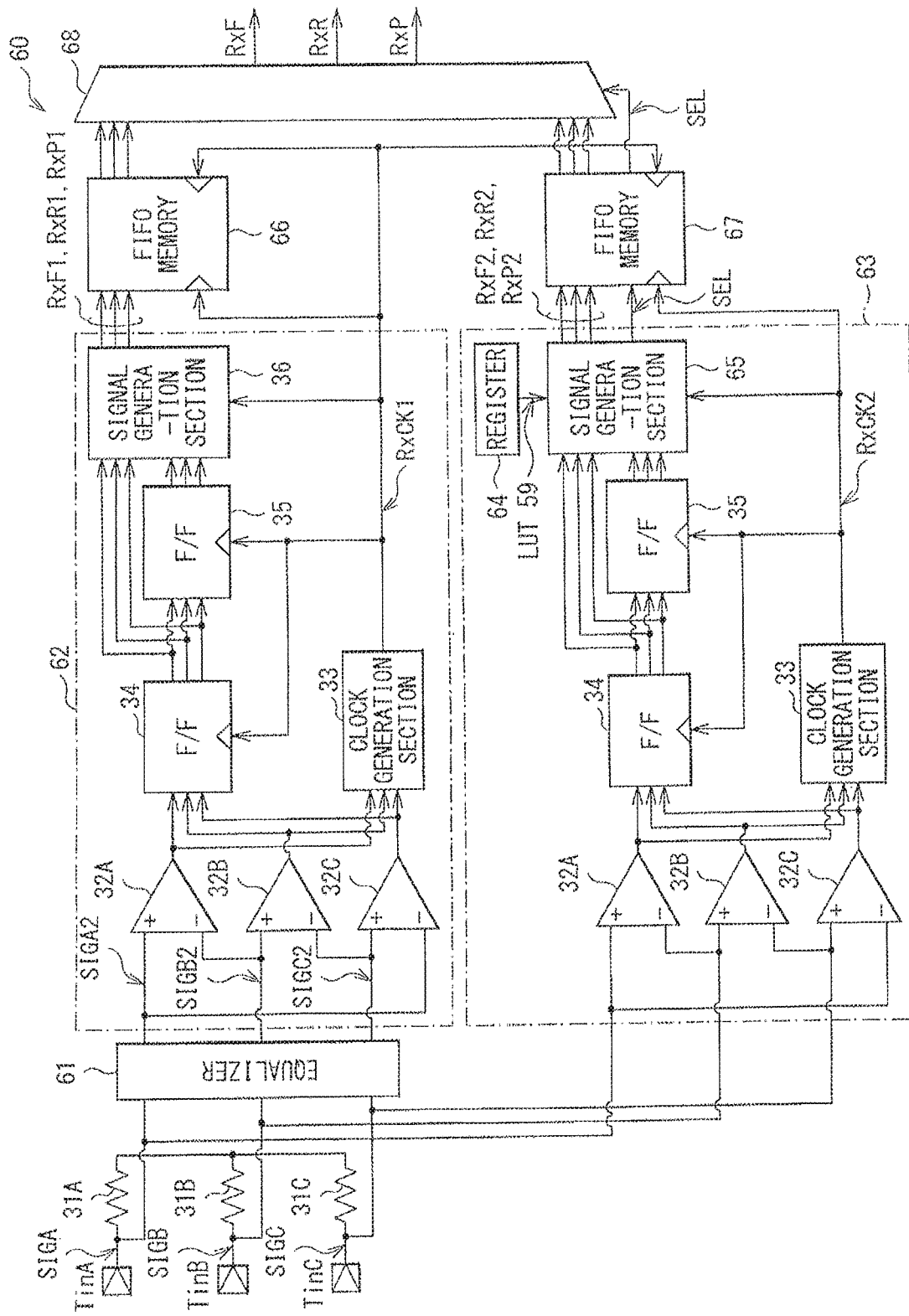
[Fig. 33]

[Fig. 34]
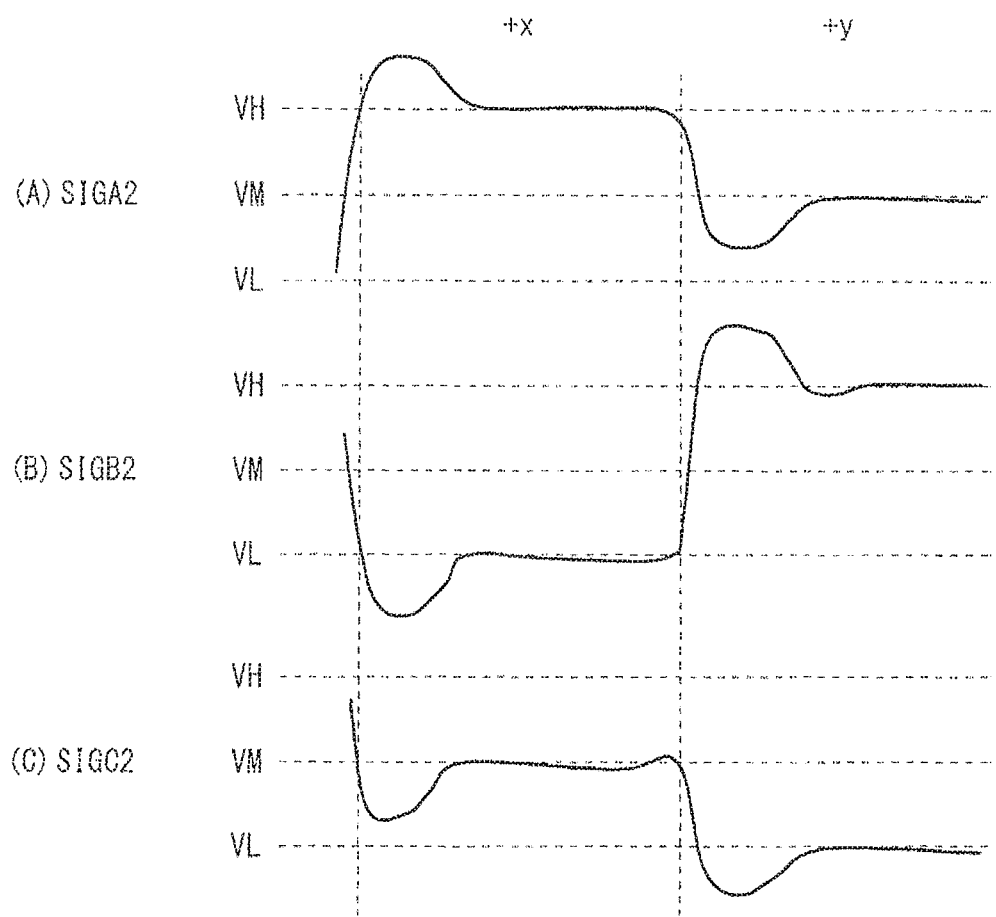

[Fig. 35]
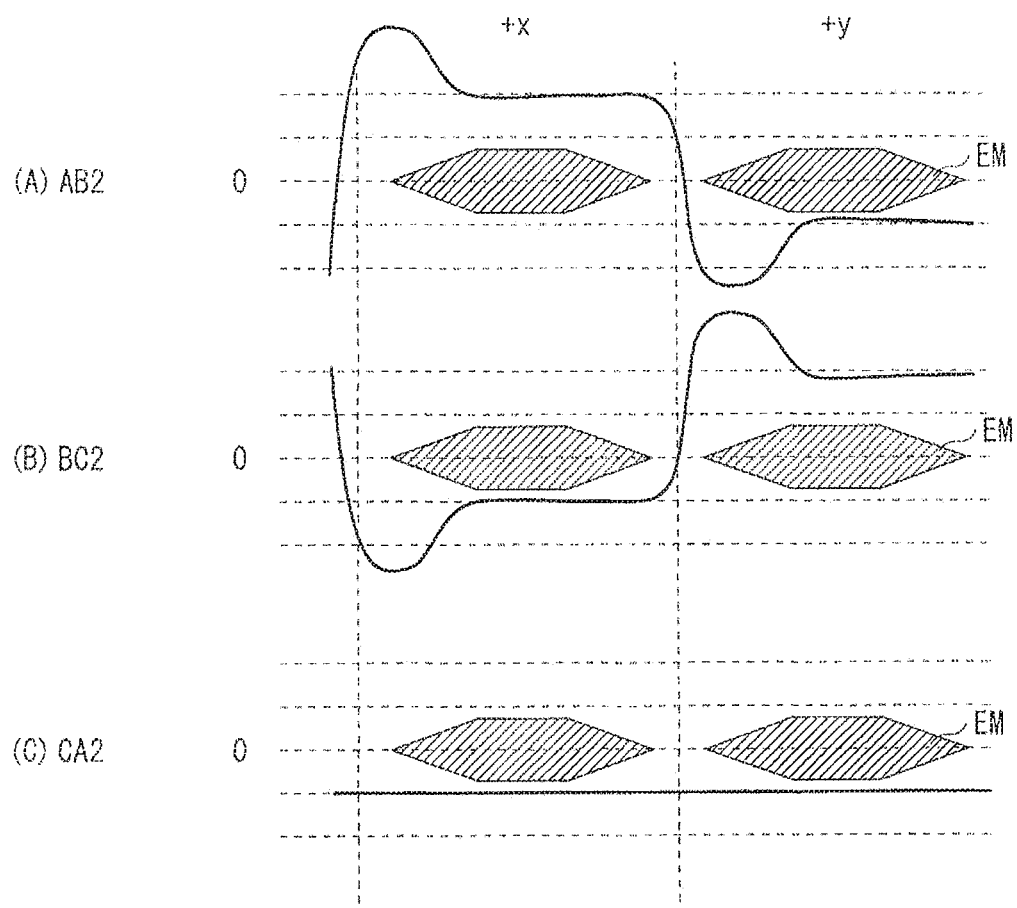

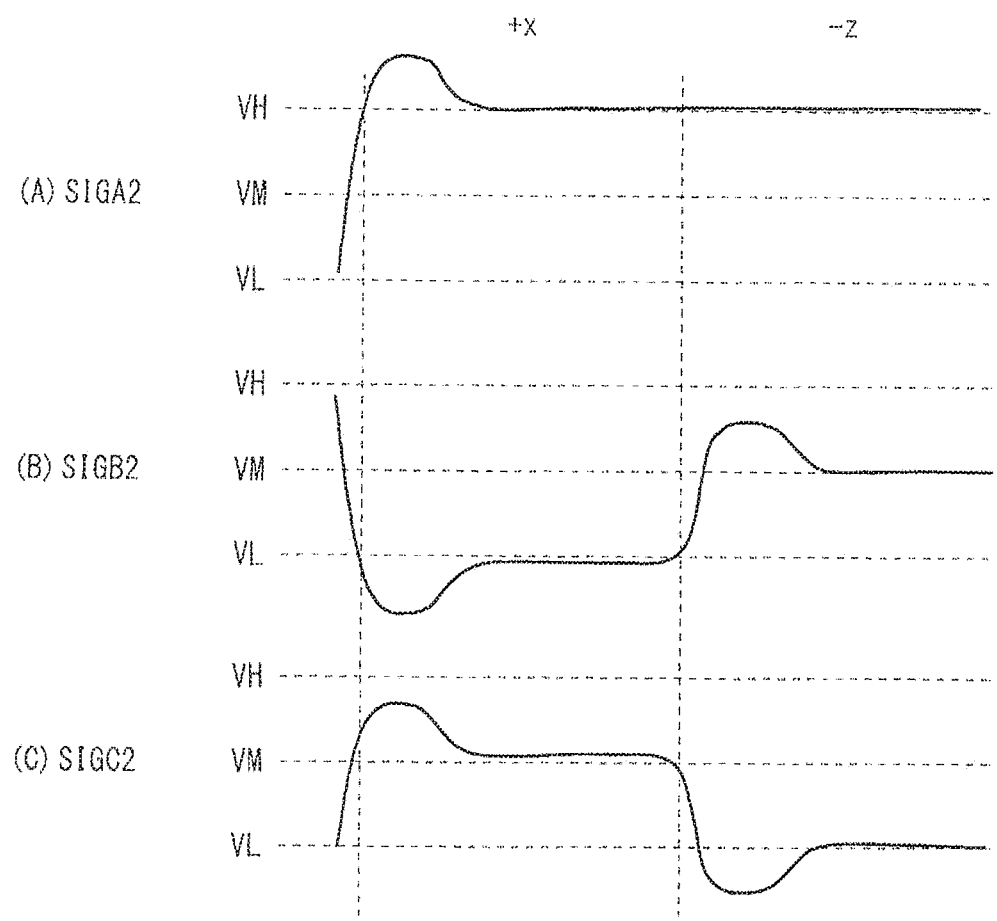
[Fig. 36]

[Fig. 37]
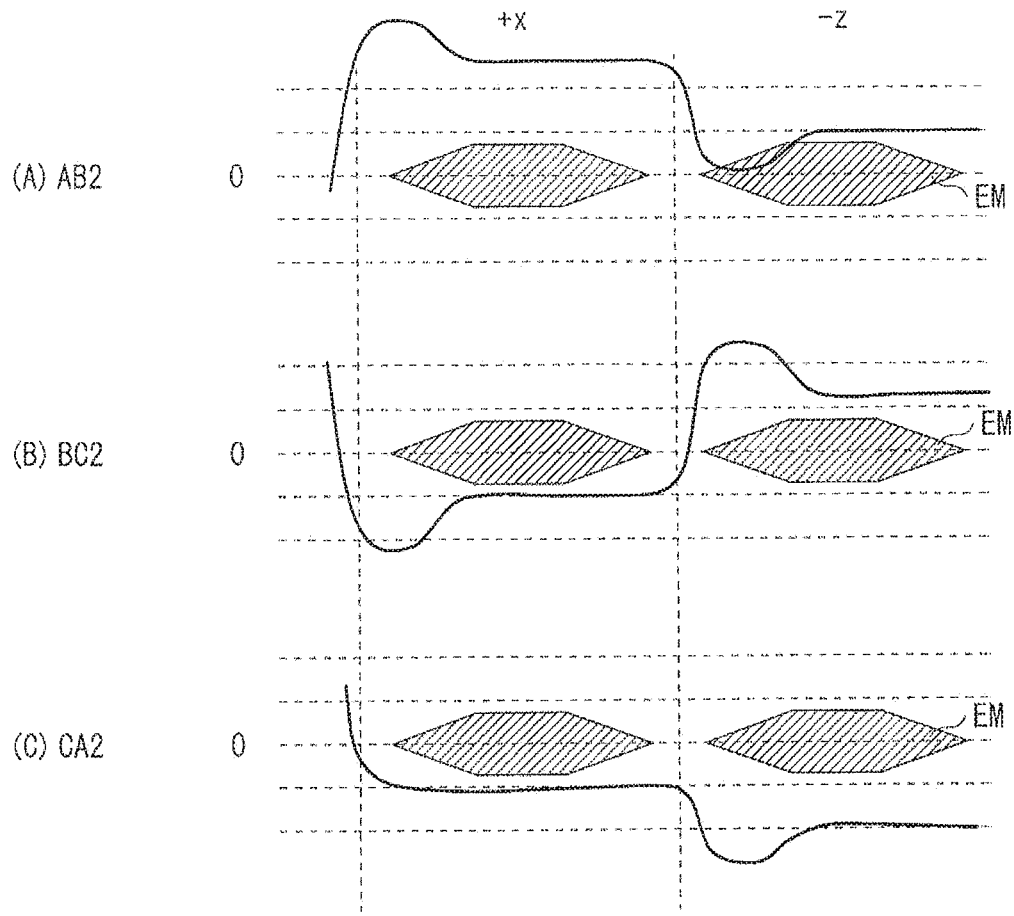
[Fig. 38]
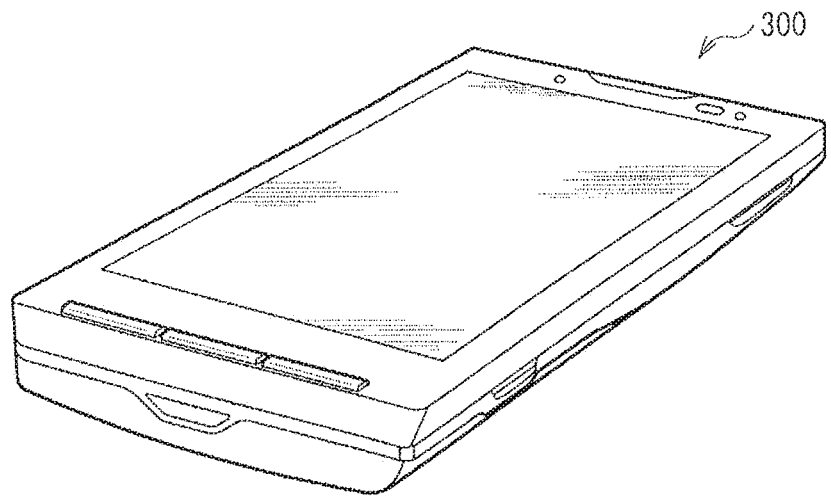

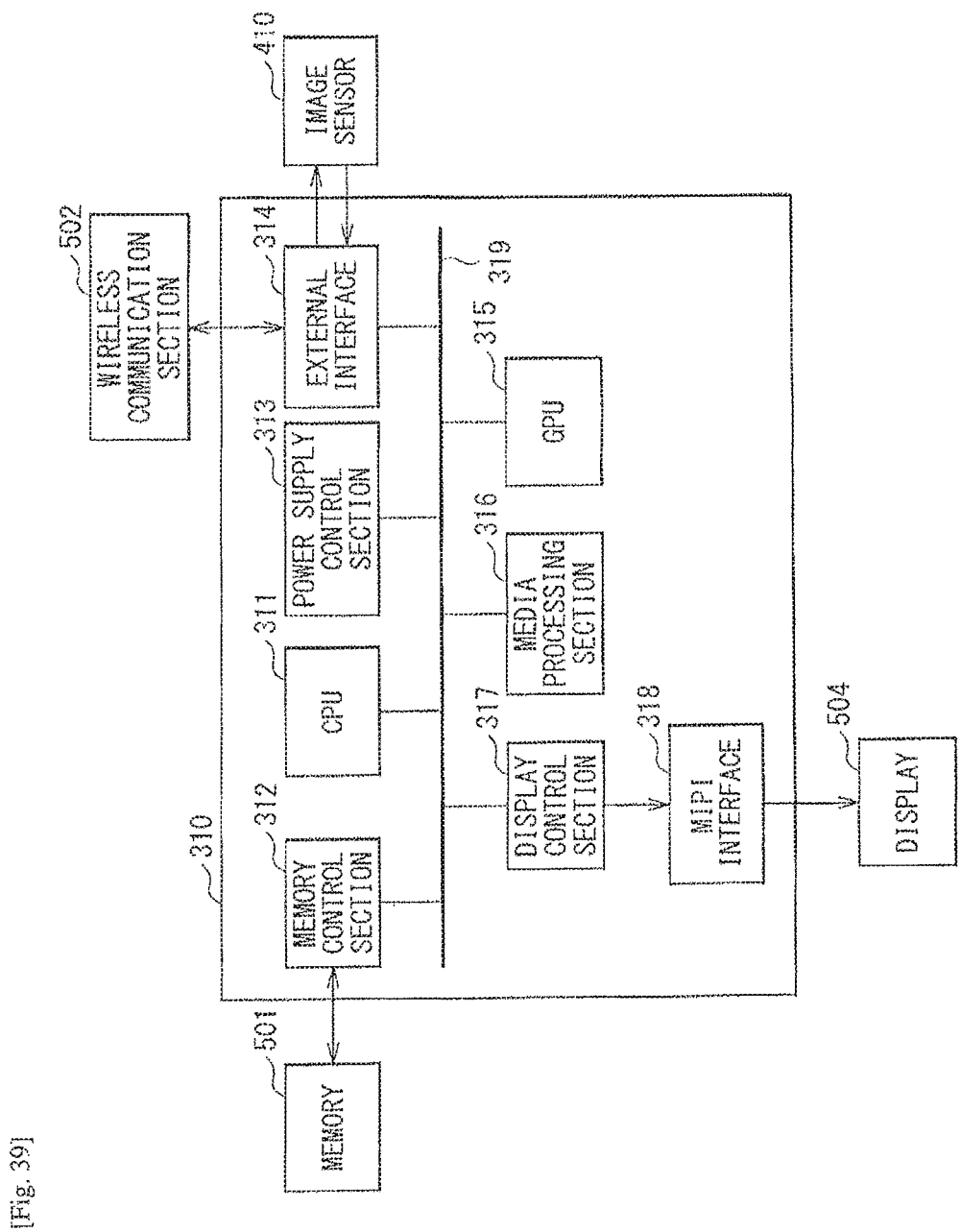
[Fig. 39]

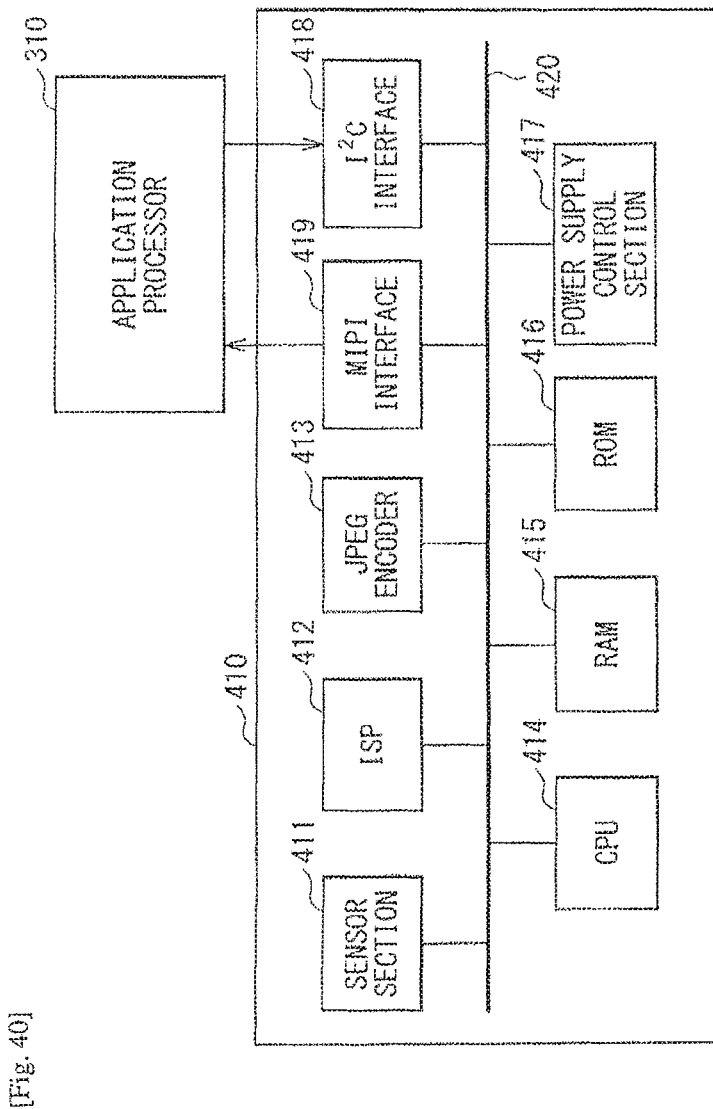
[Fig. 40]

TRANSMISSION UNIT, RECEPTION UNIT, AND COMMUNICATION SYSTEM

CROSS REFERENCE TO RELATED APPLICATIONS

The present application is a Continuation of U.S. application Ser. No. 15/284,129, filed Oct. 3, 2016, which is a Continuation of U.S. application Ser. No. 15/059,915, filed Mar. 3, 2016, now U.S. Pat. No. 9,515,858, issued Dec. 6, 2016, which is a Continuation of International Application Number PCT/JP2015/002347, filed on May 8, 2015, which contains subject matter related to Japanese Priority Patent Application JP 2014-112685, filed May 30, 2014, the entire contents of which are incorporated herein by reference.

TECHNICAL FIELD

The present disclosure relates to a transmission unit configured to transmit a signal, a reception unit configured to receive a signal, and a communication system configured to transmit and receive a signal.

BACKGROUND ART

With recent improvements in functionality and versatility of electronic apparatuses, the electronic apparatuses include various devices such as semiconductor chips, sensors, and display devices. A large number of data are exchanged among these devices, and amounts of the data have been increased with improvements in functionality and versatility of the electronic apparatuses. Therefore, data are frequently exchanged with use of, for example, a high-speed interface capable of transmitting and receiving data at several Gbps.

To improve communication performance in the high-speed interface, emphasis (pre-emphasis or de-emphasis) and an equalizer are frequently used. The pre-emphasis is used to emphasize a high-frequency component of a signal in advance during transmission (for example, refer to PTL 1), and the de-emphasis is used to reduce a low-frequency component of a signal in advance during transmission. Moreover, the equalizer is configured to increase a high-frequency component of a signal during reception. Accordingly, in communication systems, an influence of signal attenuation by a transmission path is allowed to be reduced, and an improvement in communication performance is allowed to be achieved.

CITATION LIST

Patent Literature

[PTL 1] Japanese Unexamined Patent Application Publication No. 2011-142382

SUMMARY

Technical Problem

As described above, in the communication systems, an improvement in communication performance is desired, and a further improvement in communication performance is expected.

It is desirable to provide a transmission unit, a reception unit, and a communication system that are capable of improving communication performance.

Solution to Problem

According to an embodiment of the disclosure, there is provided a transmitter comprising: a transmission control circuit configured to determine whether or not to perform an emphasis on a data signal, based on a transition pattern of the data signal; and a transmission driver configured to selectively perform the emphasis based on a result of the determination by the transmission control circuit, to generate at least one transmission signal.

According to an embodiment of the present disclosure, there is provided a receiver comprising: a first reception circuit configured to receive at least one transmission signal and output a first output signal; an equalizer configured to perform an equalization on the at least one transmission signal; a second reception circuit configured to receive at least one equalized transmission signal from the equalizer and output a second output signal; and a selection control circuit configured to select between the first output signal and the second output signal based on a transition pattern of the at least one transmission signal.

According to an embodiment of the present disclosure, there is provided a communication system comprising: a transmitter including a transmit control circuit configured to determine whether or not to perform a pre-emphasis on a data signal, based on a transition pattern of the data signal, and a transmit driver configured to selectively perform the pre-emphasis based on the determination by the transmit control circuit, to generate at least one transmission signal; and a selection control circuit configured to select between the first output signal and the second output signal based on a transition pattern of the at least one transmission signal.

According to an embodiment of the present disclosure, there is provided a communication system comprising: a transmitter; and a receiver including a first reception circuit configured to receive the at least one transmission signal and output a first output signal, an equalizer configured to perform a post-emphasis on the at least one transmission signal to generate at least one equalized transmission signal, a second reception circuit configured to receive the at least one equalized transmission signal from the equalizer and output a second output signal, and a selection control circuit configured to select between the first output signal and the second output signal based on a transition pattern of the at least one transmission signal.

Advantageous Effects of Invention

In the first transmission unit, the first communication system, and the second communication system according to the embodiments of the present disclosure, emphasis is selectively performed; therefore, communication performance is allowed to be improved.

In the second transmission unit according to the embodiment of the present disclosure, two transmission symbols adjacent to each other on the time axis in the data signal are compared with each other, and the voltage level of the transmission signal is corrected, based on the comparison result; therefore, communication performance is allowed to be improved.

In the reception unit and the second communication system according to the embodiments of the present disclosure, the first output signal or the second output signal is selected, based on the transition pattern of the one or the plurality of transmission signals received by the first reception section or the second reception section; therefore, communication performance is allowed to be improved.

It is to be noted that effects of the embodiments of the present disclosure are not limited to effects described here, and may include any effect described in this description.

It is to be understood that both the foregoing general description and the following detailed description are exemplary, and are intended to provide further explanation of the technology as claimed.

BRIEF DESCRIPTION OF DRAWINGS

FIG. 1 is a block diagram illustrating a configuration example of a communication system according to an embodiment of the present disclosure.

FIG. 2 is an explanatory diagram illustrating voltage states of signals transmitted and received in the communication system illustrated in FIG. 1.

FIG. 3 is a block diagram illustrating a configuration example of a transmission unit according to a first embodiment.

FIG. 4 is an explanatory diagram illustrating transitions of a symbol transmitted and received in the communication system illustrated in FIG. 1.

FIG. 5 is a circuit diagram illustrating a configuration example of a transmission section illustrated in FIG. 3.

FIG. 6 is a block diagram illustrating a configuration example of a reception unit according to the first embodiment.

FIG. 7 is an explanatory diagram illustrating an example of a reception operation of the reception unit illustrated in FIG. 6.

FIG. 8 is a table illustrating an operation example of a signal generation section illustrated in FIG. 3.

FIG. 9A is a waveform diagram illustrating an operation example of the transmission unit illustrated in FIG. 3.

FIG. 9B is a waveform diagram illustrating another operation example of the transmission unit illustrated in FIG. 3.

FIG. 9C is a waveform diagram illustrating another operation example of the transmission unit illustrated in FIG. 3.

FIG. 9D is a waveform diagram illustrating another operation example of the transmission unit illustrated in FIG. 3.

FIG. 9E is a waveform diagram illustrating another operation example of the transmission unit illustrated in FIG. 3.

FIG. 10A is a waveform diagram illustrating another operation example of the transmission unit illustrated in FIG. 3.

FIG. 10B is a waveform diagram illustrating another operation example of the transmission unit illustrated in FIG. 3.

FIG. 10C is a waveform diagram illustrating another operation example of the transmission unit illustrated in FIG. 3.

FIG. 10D is a waveform diagram illustrating another operation example of the transmission unit illustrated in FIG. 3.

FIG. 10E is a waveform diagram illustrating another operation example of the transmission unit illustrated in FIG. 3.

FIG. 11A is a waveform diagram illustrating another operation example of the transmission unit illustrated in FIG. 3.

FIG. 11B is a waveform diagram illustrating another operation example of the transmission unit illustrated in FIG. 3.

FIG. 11C is a waveform diagram illustrating another operation example of the transmission unit illustrated in FIG. 3.

FIG. 11D is a waveform diagram illustrating another operation example of the transmission unit illustrated in FIG. 3.

FIG. 11E is a waveform diagram illustrating another operation example of the transmission unit illustrated in FIG. 3.

FIG. 12A is a waveform diagram illustrating another operation example of the transmission unit illustrated in FIG. 3.

FIG. 12B is a waveform diagram illustrating another operation example of the transmission unit illustrated in FIG. 3.

FIG. 12C is a waveform diagram illustrating another operation example of the transmission unit illustrated in FIG. 3.

FIG. 12D is a waveform diagram illustrating another operation example of the transmission unit illustrated in FIG. 3.

FIG. 12E is a waveform diagram illustrating another operation example of the transmission unit illustrated in FIG. 3.

FIG. 13 is a waveform diagram illustrating another operation example of the transmission unit illustrated in FIG. 3.

FIG. 14 is a waveform diagram illustrating another operation example of the transmission unit illustrated in FIG. 3.

FIG. 15 is a waveform diagram illustrating another operation example of the transmission unit illustrated in FIG. 3.

FIG. 16 is a waveform diagram illustrating another operation example of the transmission unit illustrated in FIG. 3.

FIG. 17 is a waveform diagram illustrating an operation example of a transmission unit according to a comparative example.

FIG. 18 is a waveform diagram illustrating another operation example of the transmission unit according to the comparative example.

FIG. 19 is a table illustrating an operation example of a signal generation section according to a modification example of the first embodiment.

FIG. 20 is a block diagram illustrating a configuration example of a transmission unit according to another modification example of the first embodiment.

FIG. 21 is a table illustrating an operation example of a signal generation section illustrated in FIG. 20.

FIG. 22 is a block diagram illustrating a configuration example of a signal generation section according to another modification example of the first embodiment.

FIG. 23 is a table illustrating an operation example of a signal generation section according to another modification example of the first embodiment.

FIG. 24A is a waveform diagram illustrating an operation example of a transmission unit according to another modification example of the first embodiment.

FIG. 24B is a waveform diagram illustrating another operation example of the transmission unit according to another modification example of the first embodiment.

FIG. 24C is a waveform diagram illustrating another operation example of the transmission unit according to another modification example of the first embodiment.

FIG. 24D is a waveform diagram illustrating another operation example of the transmission unit according to another modification example of the first embodiment.

FIG. 24E is a waveform diagram illustrating another operation example of the transmission unit according to another modification example of the first embodiment.

FIG. 25A is a waveform diagram illustrating another operation example of the transmission unit according to another modification example of the first embodiment.

FIG. 25B is a waveform diagram illustrating another operation example of the transmission unit according to another modification example of the first embodiment.

FIG. 25C is a waveform diagram illustrating another operation example of the transmission unit according to another modification example of the first embodiment.

FIG. 25D is a waveform diagram illustrating another operation example of the transmission unit according to another modification example of the first embodiment.

FIG. 25E is a waveform diagram illustrating another operation example of the transmission unit according to another modification example of the first embodiment.

FIG. 26 is a block diagram illustrating a configuration example of a communication system according to another modification example of the first embodiment.

FIG. 27 is a block diagram illustrating a configuration example of a reception unit illustrated in FIG. 26.

FIG. 28 is a block diagram illustrating a configuration example of a transmission unit illustrated in FIG. 26.

FIG. 29 is a waveform diagram illustrating another operation example of a transmission unit according to another modification example of the first embodiment.

FIG. 30 is a waveform diagram illustrating another operation example of a transmission unit according to another modification example of the first embodiment.

FIG. 31 is a block diagram illustrating a configuration example of a transmission unit according to a second embodiment.

FIG. 32 is a circuit diagram illustrating a configuration example of the transmission section illustrated in FIG. 31.

FIG. 33 is a block diagram illustrating a configuration example of a reception unit according to the second embodiment.

FIG. 34 is a waveform diagram illustrating an operation example of the reception unit illustrated in FIG. 33.

FIG. 35 is a waveform diagram illustrating another operation example of the reception unit illustrated in FIG. 33.

FIG. 36 is a waveform diagram illustrating another operation example of the reception unit illustrated in FIG. 33.

FIG. 37 is a waveform diagram illustrating another operation example of the reception unit illustrated in FIG. 33.

FIG. 38 is a perspective view illustrating an appearance of a smartphone to which the communication system according to the embodiment is applied.

FIG. 39 is a block diagram illustrating a configuration example of an application processor to which the communication system according to the embodiment is applied.

FIG. 40 is a block diagram illustrating a configuration example of an image sensor to which the communication system according to the embodiment is applied.

DESCRIPTION OF EMBODIMENTS

Some embodiments of the present disclosure will be described in detail below referring to the accompanying drawings. It is to be noted that description will be given in the following order.
1. First Embodiment (An example using emphasis)
2. Second Embodiment (An example using an equalizer)
3. Application Examples 1. First Embodiment Configuration Example FIG. 1 illustrates a configuration example of a communication system to which a transmission unit according to a first embodiment is applied. A communication system 1 is configured to achieve an improvement in communication quality by pre-emphasis.

The communication system 1 includes a transmission unit 10 and a reception unit 30. In the communication system 1, the transmission unit 10 is configured to transmit signals SIGA, SIGB, and SIGC to the reception unit 30 through transmission paths 9A, 9B, and 9C, respectively. Each of the signals SIGA, SIGB, and SIGC makes a transition from one of three voltage states SH, SM, and SL to another. The voltage state SH is a state corresponding to a high-level voltage VH. In other words, as will be described later, a voltage indicated by the voltage state SH includes not only the high-level voltage VH but also a voltage in a case where pre-emphasis is performed on the high-level voltage VH. Likewise, the voltage state SM is a state corresponding to a middle-level voltage VM, and the voltage state SL is a state corresponding to a low-level voltage VL.

FIG. 2 illustrates voltage states of the signals SIGA, SIGB, and SIGC. The transmission unit 10 transmits six symbols "+x", "−x", "+y", "−y", "+z", and "−z" with use of three signals SIGA, SIGB, and SIGC. For example, in a case where the transmission unit 1 transmits the symbol "+x", the transmission unit 10 may shift the signal SIGA, the signal SIGB, and the signal SIGC to the voltage state SH (for example, the high-level voltage VH), the voltage state SL (for example, the low-level voltage VL), and the voltage state SM (for example, the middle-level voltage VM), respectively. In a case where the transmission unit 10 transmits the symbol "−x", the transmission unit 10 may shift the signal SIGA, the signal SIGB, and the signal SIGC to the voltage state SL, the voltage state SH, and the voltage state SM, respectively. In a case where the transmission unit 10 transmits the symbol "+y", the transmission unit 10 may shift the signal SIGA, the signal SIGB, and the signal SIGC to the voltage state SM, the voltage state SH, and the voltage state SL, respectively. In a case where the transmission unit 10 transmits the symbol "−y", the transmission unit 10 may shift the signal SIGA, the signal SIGB, and the signal SIGC to the voltage state SM, the voltage state SL, and the voltage state SH, respectively. In a case where the transmission unit 10 transmits the symbol "+z", the transmission unit 10 may shift the signal SIGA, the signal SIGB, and the signal SIGC to the voltage state SL, the voltage state SM, and the voltage state SH, respectively. In a case where the transmission unit 10 transmits the symbol "−z", the transmission unit 10 may shift the signal SIGA, the signal SIGB, and the signal SIGC to the voltage state SH, the voltage state SM, and the voltage state SL, respectively.

FIG. 3 illustrates a configuration example of the transmission unit 10. The transmission unit 10 includes a signal generation section 11, a register 12, flip-flops (F/Fs) 13 to 15, and a transmission section 20.

The signal generation section 11 is configured to determine a symbol NS, based on a symbol CS, signals TxF, TxR, and TxP, and a clock TxCK. In this case, each of the symbols CS and NS indicates any one of the six symbols "+x", "−x", "+y", "−y", "+z", and "−z". The symbol CS is a symbol (a current symbol) that is currently transmitted, and the symbol NS is a symbol (a next symbol) that is to be next transmitted.

FIG. 4 illustrates an operation of the signal generation section 11. FIG. 4 illustrates the six symbols "+x", "−x", "+y", "−y", "+z", and "−z", and transitions from one of the six symbols to another.

The signal TxF allows a symbol to make a transition between "+x" and "−x", between "+y" and "−y", or between "+z" and "−z". More specifically, in a case where the signal TxF is "1", the symbol makes a transition (for example, from "+x" to "−x") so as to change its polarity, and in a case where the signal TxF is "0", such a transition is not performed.

In a case where the signal TxF is "0", the signals TxR and TxP allow a symbol to make a transition other than the transition between "+x" and "−x", the transition between "+y" and "−y", and the transition between "+z" and "−z". More specifically, in a case where the signal TxR is "1" and the signal TxP is "0", while the polarity of the symbol is maintained, the symbol makes a transition in a clockwise direction (for example, from "+x" to "+y") in FIG. 4, and in a case where the signal TxR is "1" and the signal TxP is "1", while the polarity of the symbol is changed, the symbol makes a transition in the clockwise direction (for example, from "+x" to "−y") in FIG. 4. Moreover, in a case where the signal TxR is "0", and the signal TxP is "0", while the polarity of the symbol is maintained, the symbol makes a transition in a counterclockwise direction (for example, from "+x" to "+z") in FIG. 4, and in a case where the signal TxR is "0", and the signal TxP is "1", while the polarity of the symbol is changed, the symbol makes a transition in the counterclockwise direction (for example, from "+x" to "−z") in FIG. 4.

Thus, in the signal generation section 11, the direction of the transition of the symbol is specified by the signals TxF, TxR, and TxP. Therefore, the signal generation section 11 is allowed to determine the next symbol NS, based on the current symbol CS and the signals TxF, TxR, and TxP. In this example, the signal generation section 11 is configured to supply the symbol NS to the flip-flop 13 with use of a three-bit signal S1.

Moreover, the signal generation section 11 also has a function of generating the signals EA, EB, and EC, based on an LUT (Look-up table) 19 supplied from the register 12. The signal EA indicates whether or not to perform pre-emphasis on the signal SIGA, and the signal generation section 11 performs control to perform pre-emphasis on the signal SIGA by making the signal EA active. Likewise, the signal EB indicates whether or not to perform pre-emphasis on the signal SIGB, and the signal generation section 11 performs control to perform pre-emphasis on the signal SIGB by making the signal EB active. Moreover, the signal EC indicates whether or not to perform pre-emphasis on the signal SIGC, and the signal generation section 11 performs control to perform pre-emphasis on the signal SIGC by making the signal EC active. The LUT 19 indicates a relationship among the current symbol CS, the signals TxF, TxR, TxP, and the signals EA, EB, and EC. The signal generation section 11 generates the signals EA, EB, and EC referring to the LUT 19, based on the current symbol CS and the signals TxF, TxR, and TxP. In other words, the signal generation section 11 generates the signal EA, EB, and EC, based on two symbols (the current symbol CS and the next symbol NS) adjacent to each other on a time axis, i.e., two successive symbols.

By this configuration, for example, the signal generation section 11 may selectively perform pre-emphasis on some of transitions from one of the voltage states SH, SM, and SL to another, and may selectively perform pre-emphasis on some of the signals SIGA, SIGB, and SIGC.

The register 12 is configured to hold the LUT 19. For example, the LUT 19 may be written to the register 12 from an application processor (not illustrated) on power-up of the transmission unit 10.

The flip-flop 13 is configured to delay the signal S1 by one clock of the clock TxCK and output the delayed signal S1 as a three-bit signal S2. In other words, the flip-flop 13 generates the current symbol CS by delaying the next symbol NS indicated by the signal S1 by one clock of the clock TxCK. Then, the flip-flop 13 supplies the signal S2 to the signal generation section 11 and the transmission section 20.

The flip-flop 14 is configured to delay the signals EA, EB, and EC by one clock of the clock TxCK and output the delayed signals EA, EB, and EC. The flip-flop 15 is configured to delay three output signals of the flip-flop 14 by one clock of the clock TxCk and output the delayed output signals as signals EA2, EB2, and EC2. Then, the flip-flop 15 supplies the signals EA2, EB2, and EC2 to the transmission section 20.

The transmission section 20 is configured to generate the signals SIGA, SIGB, and SIGC, based on the signal S2 and the signals EA2, EB2, and EC2.

FIG. 5 illustrates a configuration example of the transmission section 20. The transmission section 20 includes an output control section 21, output sections 22A, 22B, and 22C, an emphasis control section 23, and output sections 24A, 24B, and 24C.

The output control section 21 is configured to supply a control signal to the output sections 22A, 22B, and 22C, based on the signal S2 to control operations of the output sections 22A, 22B, and 22C.

The output section 22A is configured to set a voltage state of the signal SIGA to one of the voltage states SH, SM, and SL, based on the control signal supplied from the output control section 21. The output section 22B is configured to set a voltage state of the signal SIGB to one of the voltage states SH, SM, and SL, based on the control signal supplied from the output control section 21. The output section 22C is configured to set a voltage state of the signal SIGC to one of the voltage states SH, SM, and SL, based on the control signal supplied from the output control section 21.

By this configuration, as illustrated in FIG. 2, the transmission section 20 is allowed to set, based on the symbol CS indicated by the signal S2, the signals SIGA, SIGB, and SIGC to the voltage states SH, SM, and SL corresponding to the symbol CS.

The output section 22A of the transmission section 20 will be described in more detail below. The output sections 22B and 22C are similar to the output section 22A.

The output section 22A includes transistors 25 and 26 and resistor devices 27 and 28. In this example, the transistors 25 and 26 are N-channel MOS (Metal Oxide Semiconductor) type FETs (Field Effect Transistors). A control signal is supplied from the output control section 21 to a gate of the transistor 25, a voltage V1 is supplied to a drain of the transistor 25, and a source of the transistor 25 is connected to a first end of the resistor device 27. A control signal is supplied from the output control section 21 to a gate of the transistor 26, a drain of the transistor 26 is connected to a first end of the resistor device 28, and a source of the transistor 26 is grounded. The resistor devices 27 and 28 are configured to function as termination resistors in the communication system 1. The first end of the resistor device 27 is connected to the source of the transistor 25, and a second end of the resistor device 27 is connected to a second end of the resistor device 28, and is connected to an output terminal ToutA. The first end of the resistor device 28 is connected to the drain of the transistor 26, and the second end of the resistor device 28 is connected to the second end of the resistor device 27 and is connected to the output terminal ToutA.

For example, in a case where the signal SIGA is set to the voltage state SH, the output control section 21 supplies a high-level control signal to transistor 25, and supplies a low-level control signal to the transistor 26. Accordingly, the transistor 25 and the transistor 26 are turned to an ON state and an OFF state, respectively, to allow an output current to flow through the transistor 25, thereby setting the signal SIGA to the voltage state SH. Moreover, for example, in a case where the signal SIGA is set to the voltage state SL, the output control section 21 supplies a low-level control signal to the transistor 25 and supplies a high-level control signal to the transistor 26. Accordingly, the transistor 25 and the transistor 26 are turned to the OFF state and the ON state, respectively, to allow an output current to flow through the transistor 26, thereby setting the signal SIGA to the voltage state SL. Further, for example, in a case where the signal SIGA is set to the voltage state SM, the output control section 21 supplies a low-level control signal to the transistors 25 and 26. Accordingly, the transistors 25 and 26 are turned to the OFF state, and the signal SIGA is set to the voltage state SM by resistor devices 31A, 31B, and 31C (that will be described later) of a reception unit 30.

The emphasis control section 23 is configured to control operations of the output sections 24A, 24B, and 24C, based on the signal S2 and the signals EA2, EB2, and EC2. More specifically, the emphasis control section 23 supplies a control signal to the output section 24A, based on the signal S2 and the signal EA2, supplies a control signal to the output section 24B, based on the signal S2 and the signal EB2, and supplies a control signal to the output section 24C, based on the signal S2 and the signal EC2.

The output section 24A is configured to perform pre-emphasis on the signal SIGA, based on the control signal supplied from the emphasis control section 23. The output section 24B is configured to perform pre-emphasis on the signal SIGB, based on the control signal supplied from the emphasis control section 23. The output section 24C is configured to perform pre-emphasis on the signal SIGC, based on the control signal supplied from the emphasis control section 23. Configurations of the output sections 24A, 24B, and 24C are similar to those of the output sections 22A, 22B, and 22C.

By this configuration, the transmission section 20 performs pre-emphasis on the signal SIGA in a case where the signal EA2 is active, performs pre-emphasis on the signal SIGB in a case where the signal EB2 is active, and performs pre-emphasis on the signal SIGC in a case where the signal EC2 is active.

It is to be noted that the transmission section 20 is not limited to this configuration, and other various configurations are applicable to the transmission section 20.

FIG. 6 illustrates a configuration example of the reception unit 30. The reception unit 30 includes the resistor devices 31A, 31B, and 31C, amplifiers 32A, 32B, and 32C, a clock generation section 33, flip-flops (F/Fs) 34 and 35, and a signal generation section 36.

The resistor devices 31A, 31B, and 31C are configured to function as termination resistors in the communication system 1. A first end of the resistor device 31A is connected to an input terminal TinA, and the signal SIGA is supplied to the first end of the resistor device 31A. A second end of the resistor device 31A is connected to second ends of the resistor devices 31B and 31C. A first end of the resistor device 31B is connected to an input terminal TinB, and the signal SIGB is supplied to the first end of the resistor device 31B. The second end of the resistor device 31B is connected to the second ends of the resistor devices 31A and 31C. A first end of the resistor device 31C is connected to an input terminal TinC, and the signal SIGC is supplied to the first end of the resistor device 31C. The second end of the resistor device 31C is connected to the second ends of the resistor devices 31A and 31B.

Each of the amplifiers 32A, 32B, and 32C is configured to output a signal according to a difference between a signal at a positive input terminal thereof and a signal at a negative input terminal thereof. The positive input terminal of the amplifier 32A is connected to the negative input terminal of the amplifier 32C and the first end of the resistor device 31A, and the signal SIGA is supplied to the positive input terminal of the amplifier 32A. The negative input terminal of the amplifier 32A is connected to the positive input terminal of the amplifier 32B and the first end of the resistor device 31B, and the signal SIGB is supplied to the negative input terminal of the amplifier 32A. The positive input terminal of the amplifier 32B is connected to the negative input terminal of the amplifier 32A and the first end of the resistor device 31B, and the signal SIGB is supplied to the positive input terminal of the amplifier 32B. The negative input terminal of the amplifier 32B is connected to the positive input terminal of the amplifier 32C and the first end of the resistor device 31C, and the signal SIGC is supplied to the negative input terminal of the amplifier 32B. The positive input terminal of the amplifier 32C is connected to the negative input terminal of the amplifier 32B and the first end of the resistor device 31C, and the signal SIGC is supplied to the positive input terminal of the amplifier 32C. The negative input terminal of the amplifier 32C is connected to the positive input terminal of the amplifier 32A and the resistor device 31A, and the signal SIGA is supplied to the negative input terminal of the amplifier 32C.

By this configuration, the amplifier 32A outputs a signal according to a difference AB (SIGA-SIGB) between the signal SIGA and the signal SIGB, the amplifier 32B outputs a signal according to a difference BC (SIGB-SIGC) between the signal SIGB and the signal SIGC, and amplifier 32C outputs a signal according to a difference CA (SIGC-SIGA) between the signal SIGC and the signal SIGA.

FIG. 7 illustrates an operation example of the amplifiers 32A, 32B, and 32C. In this example, the signal SIGA is the high-level voltage VH, the signal SIGB is the low-level voltage VL, and the signal SIGC is the middle-level voltage VM. In this case, a current Iin flows through the input terminal TinA, the resistor device 31A, the resistor device 31B, and the input terminal TinB in this order. Then, the high-level voltage VH and the low-level voltage VL are supplied to the positive input terminal and the negative input terminal of the amplifier 32A, respectively, to make the difference AB positive (AB>0); therefore, the amplifier 32A outputs "1". Moreover, the low-level voltage VL and the middle-level voltage VM are supplied to the positive input terminal and the negative input terminal of the amplifier 32B, respectively, to make the difference BC negative (BC<0); therefore, the amplifier 32B outputs "0". Further, the middle-level voltage VM and the high-level voltage VH are supplied to the positive input terminal and the negative input terminal of the amplifier 32C, respectively, to make the difference CA negative (CA<0); therefore, the amplifier 32C outputs "0".

The clock generation section 33 is configured to generate the clock RxCK, based on the output signals of the amplifiers 32A, 32B, and 32C.

The flip-flop 34 is configured to delay the output signals of the amplifiers 32A, 32B, and 32C by one clock of the clock RxCK and output the delayed output signals. In other words, the output signal of the flip-flop 34 indicates a current symbol CS2. In this case, as with the symbols CS and NS, the current symbol CS2 indicates any one of "+x", "−x", "+y", "−y", "+z", and "−z".

The flip-flop 35 is configured to delay three output signals of the flip-flop 34 by one clock of the clock RxCK and output the delayed output signals. In other words, the flip-flop 35 generates a symbol PS2 by delaying the current symbol CS2 by one clock of the clock RxCK. The symbol PS2 is a symbol (a previous symbol) that has been received previously, and as with the symbols CS, NS, and CS2, the symbol PS2 indicates any one of "+x", "−x" "+y" "−y" "+z", and "−z".

The signal generation section 36 is configured to generate signals RxF, RxR, and RxP, based on the output signals of the flip-flops 34 and 35 and the clock RxCK. The signals RxF, RxR, and RxP correspond to the signals TxF, TxR, and TxP in the transmission unit 10, respectively, and indicate the transition of the symbol. The signal generation section 36 is configured to specify the transition of the symbol (refer to FIG. 4), based on the current symbol CS2 indicated by the output signals of the flip-flop 34 and the previous symbol PS2 before being indicated by the output signals of the flip-flop 35 and generate the signals RxF, RxR, and RxP.

The signals S1 and S2 correspond to specific examples of "data signal" in an embodiment of the present disclosure. The signals SIGA, SIGB, and SIGC correspond to specific examples of "one or a plurality of transmission signals" in an embodiment of the present disclosure. The signal generation section 11 corresponds to a specific example of "control section" in an embodiment of the present disclosure.

Operation and Functions

Next, an operation and functions of the communication system 1 according to the embodiment will be described below.

(Summary of Entire Operation)

First, referring to FIG. 1 and the like, the summary of an entire operation of the communication system 1 will be described below. In the transmission unit 10, the signal generation section 11 determines the next symbol NS, based on the current symbol CS and the signals TxF, TxR, and TxP, and outputs the next symbol NS as the signal S1. Moreover, the signal generation section 11 generates and outputs the signals EA, EB, and EC referring to the LUT 19, based on the current symbol CS and the signals TxF, TxR, and TxP. The flip-flop 13 delays the signal S1 by one clock of the clock TxCK to output the delayed signal S1 as the signal S2. The flip-flop 14 delays the signals EA, EB, and EC by one clock of the clock TxCK to output the delayed signals EA, EB, and EC. The flip-flop 15 delays three output signals of the flip-flop 14 by one clock of the clock TxCK to output the delayed signals as the signals EA2, EB2, and EC2. The transmission section 20 generates the signals SIGA, SIGB, and SIGC, based on the signal S2 and the signals EA2, EB2, and EC2.

In the reception unit 30, the amplifier 32A outputs a signal according to the difference AB between the signal SIGA and the signal SIGB, the amplifier 32B outputs a signal according to the difference BC between the signal SIGB and the signal SIGC, and the amplifier 32C outputs a signal according to the difference CA between the signal SIGC and the signal SIGA. The clock generation section 33 generates the clock RxCK, based on the output signals of the amplifiers 32A, 32B, and 32C. The flip-flop 34 delays the output signals of the amplifiers 32A, 32B, and 32C by one clock of the clock RxCK to output the delayed signals. The flip-flop 35 delays the three output signals of the flip-flop 34 by one clock of the clock RxCK to output the delayed output signals. The signal generation section 36 generates the signals RxF, RxR, and RxP, based on the output signals of the flip-flops 34 and 35 and the clock RxCK.

(Specific Operation)

The signal generation section 11 determines the next symbol NS, based on the current symbol CS and the signals TxF, TxR, and TxP, and generates, referring to LUT 19, the signals EA, EB, and EC indicating whether or not to perform pre-emphasis on the signals SIGA, SIGB, and SIGC.

FIG. 8 illustrates an example of the LUT 19, and illustrates a relationship among the current symbol CS, the signal TxF, TxR, and TxP, and the signals EA, EB, and EC. It is to be noted that, for convenience of description, the next symbol NS is also illustrated in FIG. 8.

The signal generation section 11 generates the signals EA, EB, and EC referring to the LUT 19, based on the current symbol CS and the signals TxF, TxR, and TxP. Then, the flip-flops 14 and 15 delay the signals EA, EB, and EC to generate the signals EA2, EB2, and EC2, and the transmission section 20 performs pre-emphasis on the signals SIGA, SIGB, and SIGC, based on the signals EA2, EB2, and EC2. Hereinafter, a case where the current symbol CS is "+x" and a case where the current symbol CS is "−x" will be described in detail as examples.

FIGS. 9A to 9E and 10A to 10E illustrate an operation in a case where the symbol makes a transition from "+x" to a symbol other than "+x", where FIGS. 9A to 9E illustrate waveforms of the signals SIGA, SIGB, and SIGC, and FIGS. 10A to 10E illustrate waveforms of the differences AB, BC, and CA. FIGS. 9A and 10A illustrate a transition from "+x" to "−x", FIGS. 9B and 10B illustrate a transition from "+x" to "+y", FIGS. 9C and 10C illustrate a transition from "+x" to "−y", FIGS. 9D and 10D illustrate a transition from "+x" to "+z", and FIGS. 9E and 10E illustrate a transition from "+x" to "−z". In FIGS. 9A to 9E and 10A to 10E, a thin line indicates a case where pre-emphasis is not performed and a thick line indicates a case where pre-emphasis is performed. In this example, lengths of the transmission paths 9A to 9C are sufficiently short.

In a case where the symbol makes the transition from "+x" to "−x", as illustrated in FIG. 8, the signal generation section 11 changes the signals EA, EB, and EC to "1", "1", and "0", respectively. Accordingly, as illustrated in FIG. 9A, the transmission section 20 performs pre-emphasis on the signal SIGA to shift the signal SIGA from the high-level voltage VH to a voltage lower than the low-level voltage VL, and performs pre-emphasis on the signal SIGB to shift the signal SIGB from the low-level voltage VL to a voltage higher than the high-level voltage VH. At this time, the transmission section 20 does not perform pre-emphasis on the signal SIGC and allows the signal SIGC to be maintained at the middle-level voltage VM. Therefore, as illustrated in FIG. 10A, the difference AB is shifted from a positive voltage to a negative voltage faster than the case where pre-emphasis is not performed, and the differences BC and CA are shifted from negative to positive faster than the case where pre-emphasis is not performed.

In a case where the symbol makes the transition from "+x" to "+y", as illustrated in FIG. 8, the signal generation section 11 changes the signals EA, EB, and EC to "0", "1", and "1", respectively. Accordingly, as illustrated in FIG. 9B, the transmission section 20 performs pre-emphasis on the signal SIGB to shift the signal SIGB from the low-level voltage VL to a voltage higher than the high-level voltage VH, and performs pre-emphasis on the signal SIGC to shift the signal SIGC from the middle-level voltage VM to a voltage lower than the low-level voltage VL. At this time, the transmission section 20 does not perform pre-emphasis on the signal SIGA, and shifts the signal SIGA from the high-level voltage VH to the middle-level voltage VM. In other words, while the signal SIGA is shifted from the voltage state SH to the voltage state SM, the transmission section 20 does not perform pre-emphasis on the signal SIGA. Accordingly, as illustrated in FIG. 10B, the difference AB is shifted from positive to negative faster than the case where the pre-emphasis is not performed, and the difference BC is shifted from negative to positive faster than the case where pre-emphasis is not performed. Moreover, the difference CA is maintained in a negative state.

In a case where the symbol makes the transition from "+x" to "−y", as illustrated in FIG. 8, the signal generation section 11 changes the signals EA, EB, and EC to "0", "1", and "1", respectively. Accordingly, as illustrated in FIG. 9C, the transmission section 20 performs pre-emphasis on the signal SIGB to shift the signal SIGB from the low-level voltage VL to a voltage lower than the low-level voltage VL, and performs pre-emphasis on the signal SIGC to shift the signal SIGC from the middle-level voltage VM to a voltage higher than the high-level voltage VH. In other words, while the signal SIGB is maintained in the voltage state SL, the transmission section 20 performs pre-emphasis on the signal SIGB. At this time, the transmission section 20 does not perform pre-emphasis on the signal SIGA, and shifts the signal SIGA from the high-level voltage VH to the middle-level voltage VM. In other words, while the signal SIGA is shifted from the voltage state SH to the voltage state SM, the transmission section 20 does not perform pre-emphasis on the signal SIGA. Accordingly, as illustrated in FIG. 10C, the difference CA is shifted from negative to positive faster than the case where pre-emphasis is not performed. Moreover, the difference AB is maintained in the positive state, and the difference BC is maintained in the negative state.

In a case where the symbol makes the transition from "+x" to "+z", as illustrated in FIG. 8, the signal generation section 11 changes the signals EA, EB, and EC to "1", "0", and "1", respectively. Accordingly, as illustrated in FIG. 9D, the transmission section 20 performs pre-emphasis on the signal SIGA to shift the signal SIGA from the high-level voltage VH to a voltage lower than the low-level voltage VL, and performs pre-emphasis on the signal SIGC to shift the signal SIGC from the middle-level voltage VM to a voltage higher than the high-level voltage VH. At this time, the transmission section 20 does not perform pre-emphasis on the signal SIGB, and shifts the signal SIGB from the low-level voltage VL to the middle-level voltage VM. In other words, while the signal SIGB is shifted from the voltage state SL to the voltage state SM, the transmission section 20 does not perform pre-emphasis on the signal SIGB. Accordingly, as illustrated in FIG. 10D, the difference AB is shifted from positive to negative faster than the case where pre-emphasis is not performed, and the difference CA is shifted from negative to positive faster than in the case where the pre-emphasis is not performed. Moreover, the difference BC is maintained in the negative state.

In a case where the symbol makes the transition from "+x" to "−z", as illustrated in FIG. 8, the signal generation section 11 changes the signals EA, EB, and EC to "1", "0", and "1", respectively. Accordingly, as illustrated in FIG. 9E, the transmission section 20 performs pre-emphasis on the signal SIGA to shift the signal SIGA from the high-level voltage VH to a voltage higher than the high-level voltage VH, and performs pre-emphasis on the signal SIGC to shift the signal SIGC from the middle-level voltage VM to a voltage lower than the low-level voltage VL. In other words, while the signal SIGA is maintained in the voltage state SH, the transmission section 20 performs pre-emphasis on the signal SIGA. At this time, the transmission section 20 does not perform pre-emphasis on the signal SIGB, and shifts the signal SIGB from the low-level voltage VL to the middle-level voltage VM. In other words, while the signal SIGB is shifted from the voltage state SL to the voltage state SM, the transmission section 20 does not perform pre-emphasis on the signal SIGB. Accordingly, as illustrated in FIG. 10E, the difference BC is shifted from negative to positive faster than the case where pre-emphasis is not performed. Moreover, the difference AB is maintained in the positive state, and the difference CA is maintained in the negative state.

FIGS. 11A to 11E and 12A to 12E illustrate an operation in a case where the symbol makes a transition from "−x" to a symbol other than "−x", where FIG. 11A to 11E illustrate waveforms of the signals SIGA, SIGB, and SIGC, and FIGS. 12A to 12E illustrate waveforms of the differences AB, BC, and CA. FIGS. 11A and 12A illustrate a transition from "−x" to "+x", FIGS. 11B and 12B illustrate a transition from "−x" to "+y", FIGS. 11C and 12C illustrate a transition from "−x" to "−y", FIGS. 11D and 12D illustrate transition from "−x" to "+z", and FIGS. 11E and 12E illustrate a transition from "−x" to "−z".

In a case where the symbol makes the transition from "−x" to "+x", as illustrated in FIG. 8, the signal generation section 11 changes the signals EA, EB, and EC to "1", "1", and "0", respectively. Accordingly, as illustrated in FIG. 11A, the transmission section 20 performs pre-emphasis on the signal SIGA to shift the signal SIGA from the low-level voltage VL to a voltage higher than the high-level voltage VH, and performs pre-emphasis on the signal SIGB to shift the signal SIGB from the high-level voltage VH to a voltage lower than the low-level voltage VL. At this time, the transmission section 20 does not perform pre-emphasis on the signal SIGC, and allows the signal SIGC to be maintained at the middle-level voltage VM. Accordingly, as illustrated in FIG. 12A, the difference AB is shifted from negative to positive faster than the case where pre-emphasis is not performed, and the differences BC and CA are shifted from positive to negative faster than the case where pre-emphasis is not performed.

In a case where the symbol makes the transition from "−x" to "+y", as illustrated in FIG. 8, the signal generation section 11 changes the signals EA, EB, and EC to "0", "1", and "1", respectively. Accordingly, as illustrated in FIG. 11B, the transmission section 20 performs pre-emphasis on the signal SIGB to shift the signal SIGB from the high-level voltage VH to a voltage higher than the high-level voltage VH, and performs pre-emphasis on the signal SIGC to shift the signal SIGC from the middle-level voltage VM to a voltage lower than the low-level voltage VL. In other words, while the signal SIGB is maintained in the voltage state SH, the transmission section 20 performs pre-emphasis on the signal SIGB. At this time, the transmission section 20 does not perform pre-emphasis on the signal SIGA, and shifts the signal SIGA from the low-level voltage VL to the middle-level voltage VM. In other words, while the signal SIGA is shifted from the voltage state SL to the voltage state SM, the transmission section 20 does not perform pre-emphasis on the signal SIGA. Accordingly, as illustrated in FIG. 12B, the difference CA is shifted from positive to negative faster than the case where pre-emphasis is not performed. Moreover, the difference BC is maintained in the positive state, and the difference AB is maintained in the negative state.

In a case where the symbol makes the transition from "−x" to "−y", as illustrated in FIG. 8, the signal generation section 11 changes the signals EA, EB, and EC to "0", "1", and "1", respectively. Accordingly, as illustrated in FIG. 11C, the transmission section 20 performs pre-emphasis on the signal SIGB to shift the signal SIGB from the high-level voltage VH to a voltage lower than the low-level voltage VL, and performs pre-emphasis on the signal SIGC to shift the signal SIGC from the middle-level voltage VM to a voltage higher than the high-level voltage VH. At this time, the transmission section 20 does not perform pre-emphasis on the signal SIGA, and shifts the signal SIGA from the low-level voltage VL to the middle-level voltage VM. In other words, while the signal SIGA is shifted from the voltage state SL to the voltage state SM, the transmission section 20 does not perform pre-emphasis on the signal SIGA. Accordingly, as illustrated in FIG. 12C, the difference AB is shifted from negative to positive faster than the case where pre-emphasis is not performed, and the difference BC is shifted from positive to negative faster than the case where pre-emphasis is not performed. Moreover, the difference CA is maintained in the positive state.

In a case where the symbol makes the transition from "−x", to "+z", as illustrated in FIG. 8, the signal generation section 11 changes the signals EA, EB, and EC to "1", "0", and "1", respectively. Accordingly, as illustrated in FIG. 11D, the transmission section 20 performs pre-emphasis on the signal SIGA to shift the signal SIGA from the low-level voltage VL to a voltage lower than the low-level voltage VL, and performs pre-emphasis on the signal SIGC to shift the signal SIGC from the middle-level voltage VM to a voltage higher than the high-level voltage VH. In other words, while the signal SIGA is maintained in the voltage state SL, the transmission section 20 performs pre-emphasis on the signal SIGA. At this time, the transmission section 20 does not perform pre-emphasis on the signal SIGB, and shifts the signal SIGB from the high-level voltage VH to the middle-level voltage VM. In other words, while the signal SIGB is shifted from the voltage state SH to the voltage state SM, the transmission section 20 does not perform pre-emphasis on the signal SIGB. Accordingly, as illustrated in FIG. 12D, the difference BC is shifted from positive to negative faster than the case where pre-emphasis is not performed. Moreover, the difference AB is maintained in the negative state, and the difference CA is maintained in the positive state.

In a case where the symbol makes the transition from "−x" to "−z", as illustrated in FIG. 8, the signal generation section 11 changes the signals EA, EB, and EC to "1", "0", and "1", respectively. Accordingly, as illustrated in FIG. 11E, the transmission section 20 performs pre-emphasis on the signal SIGA to shift the signal SIGA from the low-level voltage VL to a voltage higher than the high-level voltage VH, and performs pre-emphasis on the signal SIGC to shift the signal SIGC from the middle-level voltage VM to a voltage lower than the low-level voltage VL. At this time, the transmission section 20 does not perform pre-emphasis on the signal SIGB, and shifts the signal SIGB from the high-level voltage VH to the middle-level voltage VM. In other words, while the signal SIGB is shifted from the voltage state SH to the voltage state SM, the transmission section 20 does not perform pre-emphasis on the signal SIGB. Accordingly, as illustrated in FIG. 12E, the difference AB is shifted from negative to positive faster than the case where pre-emphasis is not performed, and the difference CA is shifted from positive to negative faster than the case where pre-emphasis is not performed. Moreover, the difference BC is maintained in the positive state.

Thus, the transmission unit 10 performs pre-emphasis on a signal that is to be shifted from the voltage state SL or SM to the voltage state SH of the signals SIGA to SIGC, and performs pre-emphasis on a signal shifted from the voltage state SH or SM to the voltage state SL of the signals SIGA to SIGC. Moreover, the transmission unit 10 also performs pre-emphasis on a signal maintained in the voltage state SL or SH of the signals SIGA to SIGC. On the other hand, the transmission unit 10 does not perform pre-emphasis on a signal that is to be shifted from the voltage state SL or SH to the voltage state SM of the signals SIGA to SIGC, and does not perform pre-emphasis on a signal maintained in the voltage state SM.

The amplifiers 32A to 32C generate and output a signal according to whether the differences AB, BC, and CA are positive or negative. Accordingly, in the communication system 1, as illustrated in FIGS. 10A to 10E and FIG. 12A to 12E, jitter TJ is defined by an amount of a difference in timings at which the differences AB, BC, and CA cross "0". In the communication system 1, since pre-emphasis is performed on the signals SIGA to SIGC, the signals are shifted abruptly; therefore, the jitter TJ is allowed to be reduced. In particular, in a case where two of the differences AB, BC, and CA cross "0" such as the case where the symbol makes the transition from "+x" to "+y" (refer to FIG. 10B) and the case where the symbol makes the transition from "+x" to "+z" (refer to FIG. 10D), the jitter TJ is allowed to be effectively reduced.

Next, some of transitions of the symbol will be described in more detail as examples.

First, the case where the symbol makes the transition from "+x" to "+y" will be described below. In this case, as illustrated in FIG. 9B, the signal SIGA is shifted from the voltage state SH (for example, the high-level voltage VH) to the voltage state SM (for example, the middle-level voltage VM), the signal SIGB is shifted from the voltage state SL (for example, the low-level voltage VL) to the voltage state SH, and the signal SIGC is shifted from the voltage state SM to the voltage state SL. In this case, as illustrated in FIG. 10B, for example, a transition time of the difference AB is increased. A first cause of an increase in the transition time of the difference AB is that the signal SIGA is shifted to the middle-level voltage VM. More specifically, when the signal SIGA is shifted to the middle-level voltage VM, the output section 22A of the transmission section 20 turns both the transistors 25 and 26 to an OFF state. In other words, the signal SIGA is set to the voltage state SM by the resistor devices 31A to 31C of the reception unit 30. As a result, the transition time of the signal SIGA is increased, and a transition time of the difference AB is also increased. Moreover, a second cause is that a voltage change amount of the difference AB is large.

Such a case may be also caused, for example, in a case where the symbol makes the transition from "+x" to "+z" (refer to FIGS. 9D and 10D). In this case, as illustrated in FIG. 9D, the signal SIGA is shifted from the voltage state SH (for example, the high-level voltage VH) to the voltage state SL (for example, the low-level voltage VL), the signal SIGB is shifted from the voltage state SL to the voltage state SM (for example, the middle-level voltage VM), and the signal SIGC is shifted from the voltage state SM to the voltage state SH. In addition, the case may be caused in the case where the symbol makes the transition from "−x" to "−y" (refer to FIGS. 11C and 12C), the case where the symbol makes the transition from "−x" to "−z" (refer to FIGS. 11E and 12E), and the like.

FIGS. 13 and 14 illustrate an operation in the case where the symbol makes the transition from "+x" to "+y", where parts (A) to (C) in FIG. 13 illustrate waveforms of the signals SIGA, SIGB, and SIGC, respectively, and parts (A) to (C) in FIG. 14 illustrate waveforms of the differences AB, BC, and CA, respectively. FIG. 13 corresponds to FIG. 9B, and FIG. 14 corresponds to FIG. 10B. In FIG. 14, an eye mask EM indicating a reference of an eye opening is also illustrated.

When the symbol makes the transition from "+x" to "+y", as illustrated in FIG. 13, the transmission section 20 emphasizes a transition of the signal SIGB by a voltage delta V, and emphasizes a transition of the signal SIGC by the voltage delta V. At this time, the difference AB is as illustrated by a waveform W1 in FIG. 14, and the difference BC is as illustrated in a waveform W3 in FIG. 14. Thus, in the communication system 1, pre-emphasis is performed to make transitions of the waveforms abrupt; therefore, an eye is allowed to be expanded. If pre-emphasis is not performed on the signals SIGA to SIGC, for example, the difference AB may be as illustrated by a waveform W2 in FIG. 14, and the difference BC may be as illustrated by a waveform W4 in FIG. 14. In other words, in such a case, transitions of the waveforms are gentle, and amplitudes of the differences are reduced; therefore, the eye may be narrowed. On the other hand, in the communication system 1, pre-emphasis is performed on the signals SIGA to SIGC; therefore, the eye is allowed to be expanded, and communication quality is allowed to be improved.

Next, the case where the symbol makes the transition from "+x" to "−z" will be described below.

FIGS. 15 and 16 illustrate an operation in the case where the symbol makes the transition from "+x" to "−z", where parts (A) to (C) in FIG. 15 illustrate waveforms of the signals SIGA, SIGB, and SIGC, respectively, and parts (A) to (C) in FIG. 16 illustrate waveforms of the differences AB, BC, and CA, respectively. FIG. 15 corresponds to FIG. 9E, and FIG. 16 corresponds to FIG. 10E.

When the symbol makes the transition from "+x" to "−z", as illustrated in FIG. 15, the transmission section 20 sets the voltage of the signal SIGA to a voltage increased by the voltage delta V, and emphasizes the transition of the signal SIGC by the voltage delta V. In other words, even though the signal SIGA is maintained in the voltage state SH, the transmission section 20 performs pre-emphasis on the signal SIGA, and even though the signal SIGB is shifted from the voltage state SL to the voltage state SM, pre-emphasis is not performed on the signal SIGB. In other words, transmission unit 10 selects the signals SIGA and SIGC, and performs pre-emphasis on the signals SIGA and SIGC. At this time, the difference AB is as illustrated by a waveform W11 in FIG. 16, and the difference BC is as illustrated by a waveform W13 in FIG. 16. Thus, in the communication system 1, pre-emphasis is performed to make the transitions of the waveforms abrupt; therefore, the eye is allowed to be expanded. If pre-emphasis is not performed on the signals SIGA to SIGC, for example, the difference AB may be as illustrated by a waveform W12 in FIG. 16, and the difference BC may be as illustrated by a waveform W14 in FIG. 16. In other words, in such a case, the transitions of the waveforms are made gentle, and the amplitudes of the differences are reduced; therefore, the eye may be narrowed. On the other hand, in the communication system 1, since pre-emphasis is performed on the signals SIGA to SIGC, the eye is allowed to be expanded, and communication quality is allowed to be improved.

COMPARATIVE EXAMPLE

Hereinafter, a case where pre-emphasis is performed on a signal of which the voltage state is shifted of the signals SIGA to SIGC and pre-emphasis is not performed on a signal of which the voltage state is not shifted of the signals SIGA to SIGC will be considered as a comparative example.

FIGS. 17 and 18 illustrate an operation in a case where the symbol makes the transition from "+x" to "−z", where parts (A) to (C) in FIG. 17 illustrate waveforms of the signals SIGA, SIGB, and SIGC, respectively, and parts (A) to (C) in FIG. 18 illustrate waveforms of the differences AB, BC, and CA, respectively.

When the symbol makes the transition from "+x" to "−z", as illustrated in FIG. 17, a transmission unit 10R according to the comparative example emphasizes the transition of the signal SIGB by the voltage delta V, and emphasizes the transition of the signal SIGC by the voltage delta V. In other words, pre-emphasis is performed on the signals SIGB and SIGC of which the voltage states are shifted, and pre-emphasis is not performed on the signal SIGA of which the voltage state is not changed. At this time, the difference AB is as illustrated by the part (A) in FIG. 18, and the eye may be narrowed.

On the other hand, in the communication system 1, a signal that is to be subjected to pre-emphasis is selected from the signals SIGA to SIGC. More specifically, as illustrated in FIG. 15, the transmission unit 10 according to this embodiment sets the voltage of the signal SIGA to a voltage increased by the voltage delta V, and the transition of the signal SIGC is emphasized by the voltage delta V. In other words, even though the signal SIGA is maintained in the voltage state SH, the transmission unit 10 performs pre-emphasis on the signal SIGA, and even though the signal SIGB is shifted from the voltage state SL to the voltage state SM, pre-emphasis is not performed on the signal SIGB. Accordingly, in the communication system 1, a possibility that the eye is narrowed is allowed to be reduced, and communication quality is allowed to be improved.

Thus, in the communication system 1, since pre-emphasis is selectively performed on the signals SIGA to SIGC, for example, in a case of a transition with large jitter, pre-emphasis is performed, and in a case of a transition in which the eye may be narrowed by performing pre-emphasis, pre-emphasis is allowed not to be performed. Therefore, in the communication system 1, communication quality is allowed to be improved.

Effects

As described above, in this embodiment, pre-emphasis is selectively performed on the signals SIGA to SIGC; therefore, communication quality is allowed to be improved.

Modification Example 1-1

In the above-described embodiment, as illustrated in FIG. 8, in any of transitions from one of the six symbols to another, pre-emphasis is performed on one or more of the signals SIGA, SIGB, and SIGC; however, the present disclosure is not limited thereto. Alternatively, for example, pre-emphasis may be performed only in some of transitions from one of the six symbols to another. A communication system 1A according to this modification example will be described in detail below.

FIG. 19 illustrates an example of an LUT 19A according to this modification example. The signal generation section 11A according to this modification example generates signals EA, EB, and EC, based on the LUT 19A. For example, in a case where the symbol makes the transition from "+x" to "−x", in a case where the symbol makes the transition from "+x" to "−y", and in a case where the symbol makes the transition from "+x" to "−z", all of the signals EA, EB, and EC may be changed to "0". In other words, in these cases, the transmission section 20 does not perform pre-emphasis on any of the signals SIGA, SIGB, and SIGC. For example, in the case where the symbol makes the transition from "+x" to "−z", for example, when pre-emphasis is performed as illustrated in FIGS. 17 and 18, the eye is narrowed; therefore, in this modification example, pre-emphasis is not performed in such a case. On the other hand, for example, in the case where the symbol makes the transition from "+x" to "+y", the signal generation section 11A changes the signals EA, EB, and EC to "0", "1", and "1", respectively, and in the case where the symbol makes the transition from "+x" to "+z", the signal generation section 11A changes the signals EA, EB, and EC to "1", "0", and "1", respectively. In other words, in these cases, as illustrated in FIGS. 10B and 10D, the transition time of the difference AB is increased; therefore, the transmission section 20 performs pre-emphasis. In the following two cases, pre-emphasis is performed in such a manner. One of the cases is a case where a first signal of the signals SIGA, SIGB, and SIGC is shifted from the voltage state SH (for example, the high-level voltage VH) to the voltage state SM (for example, the middle-level voltage VM), a second signal of them is shifted from the voltage state SL (for example, the low-level voltage VL) to the voltage state SH, and a third signal of them is shifted from the voltage state SM to the voltage state SL. The other case is a case where the first signal of the signals SIGA, SIGB, and SIGC is shifted from the voltage state SL to the voltage state SM, the second signal is shifted from the voltage state SH to the voltage state SL, and the third signal is shifted from the voltage state SM to the voltage state SH. In other words, in a case where all of the voltage state of the signal SIGA, the voltage state of the signal SIGB, and the voltage state of the signal SIGC are shifted, pre-emphasis is performed. Thus, in the communication system 1A, only in a case where any of the transition times of the differences AB, BC, and CA is increased, pre-emphasis is performed, and pre-emphasis is not performed in other cases. Even in such a configuration, effects similar to those in the communication system 1 according to the above-described embodiment are allowed to be obtained.

It is to be noted that a transition in which pre-emphasis is performed of the transitions from one of the six symbols to another is not limited to the example in FIG. 19, and any of the transitions may be arbitrarily set as the transition in which pre-emphasis is performed.

Modification Example 1-2

In the above-described embodiment, the signal generation section 11 generates three signals EA, EB, and EC, and controls pre-emphasis on the signals SIGA to SIGC independently; however, the present disclosure is not limited thereto. A transmission unit 10B according to this modification example will be described in detail below.

FIG. 20 illustrates a configuration example of the transmission unit 10B. The transmission unit 10B includes a signal generation section 11B, flip-flops 14B and 15B, and a transmission section 20B. The signal generation section 11B is configured to determine the next symbol NS, based on the current symbol CS and the signals TxF, TxR, and TxP, and to generate a signal EE referring to an LUT 19B. The flip-flop 14B is configured to delay the signal EE by one clock of the clock TxCK and output the delayed signal EE. The flip-flop 15B is configured to delay an output signal of the flip-flop 14 by one clock of the clock TxCK and output the delayed output signal as a signal EE2. The transmission section 20B is configured to generate the signals SIGA, SIGB, and SIGC, based on the signal S2 and the signal EE2. At this time, in a case where the signal EE2 is active, the transmission section 20B is configured to perform pre-emphasis on the signals SIGA, SIGB, and SIGC. By this configuration, in the transmission unit 10B, the signal generation section 11B is configured to collectively control pre-emphasis on the signals SIGA to SIGC.

FIG. 21 illustrates an example of the LUT 19B according to this modification example. For example, in the case where the symbol makes the transition from "+x" to "−x", in a case where the symbol makes the transition from "+x" to "−y", and in the case where the symbol makes the transition from "+x" to "−z", the signal generation section 11B may change the signal EE to "0". In other words, in these cases, the transmission section 20B does not perform pre-emphasis on the signals SIGA, SIGB, and SIGC. On the other hand, for example, in the case where the symbol makes the transition from "+x" to "+y", and in the case where the symbol makes the transition from "+x" to "+z", the signal generation section 11B may change the signal EE to "1". In other words, in these cases, as with the case of the above-described modification example 1-1, the transition time of the difference AB is increased; therefore, the transmission section 20B performs pre-emphasis on the signals SIGA, SIGB, and SIGC. Thus, the communication system 10B operates to perform pre-emphasis only in a case where any of the transition times of the differences AB, BC, and CA is increased, and operates not to perform pre-emphasis in other cases. Even in such a configuration, effects similar to those in the communication system 1 according to the above-described embodiment are allowed to be obtained.

It is to be noted that the transition in which pre-emphasis is performed of the transitions from one of the six symbols to another is not limited to the example in FIG. 21, and any of the transitions may be arbitrarily set as the transition in which pre-emphasis is performed. For example, pre-emphasis may be performed only in a case where two of the differences AB, BC, and CA are shifted across "0". Moreover, pre-emphasis may be performed only in a case where all of the differences AB, BC, and CA are shifted across "0".

Modification Example 1-3

The signal generation section 11 may implement the operation of generating the signals EA, EB, and EC referring to the LUT 19 by software or hardware. An example of a method of implementing the operation by hardware will be described below. Description will be given with an example in which this modification example is applied to the signal generation section 11B according to Modification Example 1-2.

FIG. 22 illustrates a configuration example of a portion where the signal EE is generated of a signal generation section 11C according to this modification example. In this example, the signal generation section 11C generates the signal EE, based on the current symbol CS, the next symbol NS, and the LUT 19B. The signal generation section 11C includes symbol determination sections 100 and 110, logic circuits 120, 130, 140, 150, 160, and 170, and an OR circuit 180.

The symbol determination section 100 is configured to determine which one of the six symbols "+x", "−x", "+y", "−y", "+z", and "−z" is the current symbol CS. The symbol determination section 100 includes comparison sections 101 to 106. The comparison section 101 is configured to output "1" in a case where the current symbol CS is the symbol "+x". The comparison section 102 is configured to output "1" in a case where the current symbol CS is the symbol "−x". The comparison section 103 is configured to output "1" in a case where the current symbol CS is the symbol "+y". The comparison section 104 is configured to output "1" in a case where the current symbol CS is the symbol "−y". The comparison section 105 is configured to output "1" in a case where the current symbol CS is the symbol "+z". The comparison section 106 is configured to output "1" in a case where the current symbol CS is the symbol "−z".

The symbol determination section 110 is configured to determine which one of the six symbols "+x", "−x", "+y", "−y", "+z", and "−z" is the next symbol NS. The symbol determination section 110 includes comparison sections 111 to 116. The comparison section 111 is configured to output "1" in a case where the next symbol NS is the symbol "+x". The comparison section 112 is configured to output "1" in a case where the next symbol NS is the symbol "−x". The comparison section 113 is configured to output "1" in a case where the next symbol NS is the symbol "+y". The comparison section 114 is configured to output "1" in a case where the next symbol NS is the symbol "−y". The comparison section 115 is configured to output "1" in a case where the next symbol NS is the symbol "+z". The comparison section 116 is configured to output "1" in a case where the next symbol NS is the symbol "−z".

The logic circuit 120 is configured to generate a signal, based on an output signal of the comparative section 101, output signals of the comparison sections 112 to 116, and setting of pre-emphasis in the LUT 19B.

The logic circuit 120 includes AND circuits 121 to 125. The output signal of the comparison section 101 is supplied to a first input terminal of the AND circuit 121, the output signal of the comparison section 112 is supplied to a second input terminal of the AND circuit 121, a value ("0" in this example) of the signal EE corresponding to the symbol CS="+x" and the symbol NS="−x" included in the LUT 19B is supplied to a third input terminal of the AND circuit 121. In other words, the comparison section 101 is configured to output "1" in a case where the current symbol CS is the symbol "+x", and comparison section 112 is configured to output "1" in a case where the next symbol NS is the symbol "−x"; therefore, the value of the signal EE corresponding to the symbol CS="+x" and the symbol NS="−x" is supplied to the third input terminal. Likewise, the output signal of the comparison section 101 is supplied to a first input terminal of the AND circuit 122, the output signal of the comparison section 113 is supplied to a second input terminal of the AND circuit 122, and a value ("1" in this example) of the signal EE corresponding to the symbol CS="+x" and the symbol NS="+y" included in the LUT 19B is supplied to a third input terminal of the AND circuit 122. The output signal of the comparison section 101 is supplied to a first input terminal of the AND circuit 123, the output signal of the comparison section 114 is supplied to a second input terminal of the AND circuit 123, and a value ("0" in this example) of the signal EE corresponding to the symbol CS="+x" and the symbol NS="−y" included in the LUT 19B is supplied to a third input terminal of the AND circuit 123. The output signal of the comparison section 101 is supplied to a first input terminal of the AND circuit 124, the output signal of the comparison section 115 is supplied to a second input terminal of the AND circuit 124, and a value ("1" in this example) of the signal EE corresponding to the symbol CS="+x" and the symbol NS="+z" included in the LUT 19B is supplied to a third input terminal of the AND circuit 124. The output signal of the comparison section 101 is supplied to a first input terminal of the AND circuit 125, the output signal of the comparison section 116 is supplied to a second input terminal of the AND circuit 125, and a value ("0" in this example) of the signal EE corresponding to the symbol CS="+x" and the symbol NS="−z" included in the LUT 19B is supplied to a third input terminal of the AND circuit 125.

Thus, as illustrated in FIG. 21, the logic circuit 120 is configured to allow the AND circuit 122 to output "1" in a case of the symbol CS="+x" and the symbol NS="+y", and to allow the AND circuit 124 to output "1" in a case of the symbol CS="+x" and the symbol NS="+z".

Likewise, the logic circuit 130 is configured to generate a signal, based on the output signal of the comparison section 102, the output signals of the comparison sections 111 and 113 to 116, and setting of pre-emphasis in the LUT 19B. The logic circuit 140 is configured to generate a signal, based on the output signal of the comparison section 103, the output signals of the comparison sections 111, 112, and 114 to 116, and setting of pre-emphasis in the LUT 19B. The logic circuit 150 is configured to generate a signal, based on the output signal of the comparison section 104, the output signals of the comparison sections 111 to 113, 115, and 116, and setting of pre-emphasis in the LUT 19B. The logic circuit 160 is configured to generate a signal, based on the output signal of the comparison section 105, the output signals of the comparison sections 111 to 114 and 116, and setting of pre-emphasis in the LUT 19B. The logic circuit 170 is configured to generate a signal, based on the output signal of the comparison section 106, the output signals of the comparison sections 111 to 116, and setting of pre-emphasis in the LUT 9B. The logic circuits 130, 140, 150, 160, and 170 have a configuration similar to that of the logic circuit 120.

The OR circuit 180 is configured to determine a logical OR of the output signals of all AND circuits in the logic circuits 120, 130, 140, 150, 160, and 170.

Even in such a configuration, effects similar to those in the communication system 1 according to the above-described embodiment are allowed to be obtained.

Modification Example 1-4

In the above-described embodiment, the transmission unit 10 performs pre-emphasis on the signals SIGA, SIGB, and SIGC; however, the present disclosure is not limited thereto. Alternatively, for example, de-emphasis may be performed. A transmission unit 10D according to this modification example will be described in detail below.

FIG. 23 illustrates an example of an LUT 19D according to this modification example. A signal generation section 11D of the transmission unit 10D is configured to generate signals EA, EB, and EC referring to the LUT 19D, based on the current symbol CS and the signals TxF, TxR, and TxP. Then, a transmission section 20D of the transmission unit 10D performs de-emphasis on the signal SIGA, SIGB, and SIGC, based on signals EA2, EB2, and EC2. A case where the current symbol CS is "+x" will be described as an example in detail below.

FIGS. 24A to 24E and 25A to 25E illustrate an operation in a case where the symbol makes a transition from "+x" to a symbol other than "+x", where FIGS. 24A to 24E illustrate waveforms of the signals SIGA, SIGB, and SIGC, and FIGS. 25A to 25E illustrate waveforms of the differences AB, BC, and CA. In this example, the lengths of the transmission paths 9A to 9C are sufficiently short.

In a case where the symbol makes the transition from "+x" to "−x", as illustrated in FIG. 23, the signal generation section 11D changes the signals EA, EB, and EC to "0", "0", and "0", respectively. Accordingly, as illustrated in FIG. 24A, the transmission section 20D does not perform de-emphasis on the signals SIGA to SIGC. Therefore, the differences AB, BC, and CA have waveforms as illustrated in FIG. 25A.

In a case where the symbol makes the transition from "+x" to "+y", as illustrated in FIG. 23, the signal generation section 11D changes the signals EA, EB, and EC to "0", "0", and "0", respectively. Accordingly, as illustrated in FIG. 24B, the transmission section 20D does not perform de-emphasis on the signals SIGA to SIGC. Therefore, the differences AB, BC, and CA have waveforms as illustrated in FIG. 25B.

In a case where the symbol makes the transition from "+x" to "−y", as illustrated in FIG. 23, the signal generation section 11D changes the signals EA, EB, and EC to "0", "1", and "0", respectively. Accordingly, as illustrated in FIG. 24C, the transmission section 20D performs de-emphasis on the signal SIGB to shift the signal SIGB from the low-level voltage VL to a voltage higher than the low-level voltage VL. At this time, the transmission section 20D does not perform de-emphasis on the signals SIGA and SIGC. Therefore, the differences AB, BC, and CA have waveforms as illustrated in FIG. 25C. In other words, the difference CA that is shifted across "0" is not affected by de-emphasis.

In a case where the symbol makes the transition from "+x" to "+z", as illustrated in FIG. 23, the signal generation section 11D changes the signals EA, EB, and EC to "0", "0", and "0", respectively. Accordingly, as illustrated in FIG. 24D, the transmission section 20D does not perform de-emphasis on the signals SIGA to SIGC. Therefore, the differences AB, BC, and CA have waveforms as illustrated in FIG. 25D.

In a case where the symbol makes the transition from "+x" to "−z", as illustrated in FIG. 23, the signal generation section 11D changes the signals EA, EB, and EC to "1", "0", and "0", respectively. Accordingly, as illustrated in FIG. 24E, the transmission section 20D performs de-emphasis on the signal SIGA to shift the signal SIGA from the high-level voltage VH to a voltage lower than the high-level voltage VH. At this time, the transmission section 20D does not perform de-emphasis on the signals SIGA and SIGB. Therefore, the differences AB, BC, and CA have waveforms as illustrated in FIG. 25E. In other words, the difference BC that is shifted across "0" is not affected by de-emphasis.

Thus, the transmission unit 10D performs de-emphasis so as not to affect a difference that is shifted across "0" of the differences AB, BC, and CA. Even in such a configuration, effects similar to those of the communication system 1 according to the above-described embodiment are allowed to be obtained.

It is to be noted that a transition in which de-emphasis is performed of the transitions from one of the six symbols to another is not limited to the example in FIG. 23, and any of the transitions may be arbitrarily set as the transition in which de-emphasis is performed.

Modification Example 1-5

In the above-described embodiment, the signal generation section 11 generates the signals EA, EB, and EC with use of the LUT 19 stored in the register 12. At this time, the LUT 19 may be configured to change setting of pre-emphasis. A communication system 1E according to this modification example will be described in detail below.

FIG. 26 illustrates a configuration example of the communication system 1E. The communication system 1E includes a reception unit 30E and a transmission unit 10E. The communication system 1E is configured to change setting of pre-emphasis, based on a result of transmission and reception of a predetermined pattern for calibration.

FIG. 27 illustrates a configuration example of the reception unit 30E. The reception unit 30E includes a signal generation section 36E. The signal generation section 36E includes a pattern detection section 37E. The pattern detection section 37E is configured to compare a pattern of a signal received by the reception unit 30E with the predetermined pattern for calibration in a calibration mode and then supply a comparison result as a signal DET to the transmission unit 10E.

FIG. 28 illustrates a configuration example of the transmission unit 10E. The transmission unit 10E includes an LUT generation section 16E. The LUT generation section 16E is configured to generate the LUT 19, based on the signal DET and then store the LUT 19 in the register 12.

The signal DET corresponds to a specific example of "control signal" in an embodiment of the present disclosure. The pattern detection section 37E corresponds to a specific example of "control signal generation section" in an embodiment of the present disclosure. The LUT generation section 16E corresponds to a specific example of "table setting section" in an embodiment of the present disclosure.

In the communication system 1E, in the calibration mode, for example, setting of pre-emphasis may be changed so as to reduce a bit error rate. More specifically, first, the transmission unit 10E transmits the signals SIGA to SIGC with the predetermined pattern for calibration. Then, the reception unit 30E receives the signals SIGA to SIGC, and the pattern detection section 37E compares the patterns of the received signals with the predetermined pattern for calibration, and provides a notification of a comparison result to the transmission unit 10E. Then, the LUT generation section 16E of the transmission unit 10E changes the setting of pre-emphasis, based on the comparison result. In the communication system 1E, for example, setting of pre-emphasis may be changed by such an operation so as to reduce the bit error rate. Then, after completion of setting of pre-emphasis, the calibration mode is terminated, and normal data transmission is performed. Such calibration may be executed, for example, on power-up of the communication system 1E, at regular time intervals, or when an amount of exchanged data is small.

Modification Example 1-6

In the above-described embodiment, the LUT 19 indicating the relationship among the current symbol CS, the signals TxF, TxR, and TxP, and the signals EA, EB, and EC is used; however, the present disclosure is not limited thereto. Alternatively, for example, an LUT indicating a relationship among the next symbol NS, the signals TxF, TxR, and TxP, and the signals EA, EB, and EC may be used, or, for example, an LUT indicating a relationship among the current symbol CS, the next symbol NS, and the signals EA, EB, and EC may be used.

Modification Example 1-7

In the above-described embodiment, as illustrated in FIG. 13 and the like, pre-emphasis is performed throughout a period in which one symbol is transmitted; however, the present disclosure is not limited thereto. Alternatively, for example, as illustrated in FIGS. 29 and 30, pre-emphasis may be performed only in a predetermined period after transitions of the signals SIGA, SIGB, and SIGC. FIGS. 29 and 30 illustrate a case where the symbol makes the transition from "+x" to "+y". As illustrated in FIG. 29, the transmission section 20 performs pre-emphasis only in the predetermined period after transitions of the signals SIGA, SIGB, and SIGC. At this time, the difference AB is as illustrated by a waveform W21 in FIG. 30, and the difference BC is as illustrated by a waveform W23 in FIG. 30. If pre-emphasis is not performed on the signals SIGA to SIGC, for example, the difference AB may be as illustrated by a waveform W22 in FIG. 30, and the difference BC may be as illustrated by a waveform W24 in FIG. 30. In other words, in such a case, the transitions of the waveforms are gentle; therefore, the eye may be narrowed. On the other hand, in this modification example, pre-emphasis is performed only in the predetermined period after transitions of the signals SIGA, SIGB, and SIGC; therefore, the eye is allowed to be expanded, and communication quality is allowed to be improved.

Other Modification Examples

Moreover, two or more of these modification examples may be combined.

2. Second Embodiment

Next, a communication system 2 according to a second embodiment will be described below. The communication system 2 is configured to achieve an improvement in communication quality by an equalizer. In other words, while, in the communication system 1 according to the above-described first embodiment, the transmission unit 10 performs pre-emphasis on the signals SIGA to SIGC, in this communication system 2, a reception unit performs equalization on the signals SIGA to SIGC. It is to be noted that like components are denoted by like numerals as of the communication system 1 according to the above-described first embodiment and will not be further described.

As illustrated in FIG. 1, the communication system 2 includes a transmission unit 40 and a reception unit 60. In the communication system 2, the transmission unit 40 does not perform pre-emphasis on the signals SIGA to SIGC, and the reception unit 60 is configured to perform equalization on the signals SIGA to SIGC.

FIG. 31 illustrates a configuration example of the transmission unit 40. The transmission unit 40 includes a signal generation section 41 and a transmission section 50. As with the signal generation section 11 according to the first embodiment, the signal generation section 41 is configured to determine the next symbol NS, based on the current symbol CS, the signals TxF, TxR, and TxP, and the clock TxCK and output the next symbol NS as the signal S1. In other words, the signal generation section 41 is the signal generation section 11 without a function of generating the signals EA, EB, and EC. The transmission section 50 is configured to generate the signals SIGA, SIGB, and SIGC, based on the signal S2.

FIG. 32 illustrates a configuration example of the transmission section 50. The transmission section 50 includes an output control section 21, and output sections 22A, 22B, and 22C. In other words, the transmission section 50 is the transmission section 20 according to the first embodiment without the emphasis control section 23 and the output sections 24A to 24C.

FIG. 33 illustrates a configuration example of the reception unit 60. The reception unit 60 includes an equalizer 61, reception sections 62 and 63, FIFO (First In First Out) memories 66 and 67, and a selector 68.

The equalizer 61 is configured to increase high-frequency components of the signals SIGA, SIGB, and SIGC and output resultant signals as signals SIGA2, SIGB2, and SIGC2, respectively.

The reception section 62 is configured to generate signals RxF1, RxR1, and RxP1, and a clock RxCK1, based on the equalized signals SIGA2, SIGB2, and SIGC2. The reception section 62 includes amplifiers 32A, 32B, and 32C, a clock generation section 33, flip-flops 34 and 35, and a signal generation section 36. In other words, the reception section 62 has a configuration similar to the reception unit 30 according to the first embodiment.

The reception section 63 is configured to generate the signals RxF2, RxR2, and RxP2 and the clock RxCK2, based on the signals SIGA, SIGB, and SIGC that are not equalized. The reception section 63 includes the amplifiers 32A, 32B, and 32C, the clock generation section 33, the flip-flops 34 and 35, a signal generation section 65, and a register 64. In other words, the reception section 63 is the reception section 62 including the signal generation section 65 instead of the signal generation section 36 and further including the register 64.

As with the signal generation section 36, the signal generation section 65 is configured to generate the signals RxF2, RxR2, and RxP2, based on output signals of the flip-flops 34 and 35 and the clock RxCK2. Moreover, the signal generation section 65 also has a function of generating a signal SEL, based on an LUT 59 supplied from the register 64. The signal SEL indicates which of the signals RxF1, RxR1, and RxP1 generated, based on the equalized signals SIGA2, SIGB2, and SIGC2 and the signals RxF2, RxR2, and RxP2 generated, based on the signals SIGA, SIGB, and SIGC that are not equalized are to be selected. The LUT 59 may indicate, for example, a relationship among the current symbol CS2, the signals RxF2, RxR2, and RxP2, and the signal SEL, and may be similar to, for example, the LUT 19 according to the first embodiment, and the like. The signal generation section 65 is configured to generate the signal SEL referring to the LUT 59, based on the current symbol CS2 and the signals RxF2, RxR2, and RxP2 and output the signal SEL.

The register 64 is configured to hold the LUT 59. For example, the LUT 59 may be written to the register 64 from an application processer (not illustrated) on power-up of the reception unit 60.

The FIFO memory 66 is a buffer memory that temporarily holds the signals RxF1, RxR1, and RxP1 supplied from the reception section 62. In this example, the FIFO memory 66 is configured to perform writing and reading of data with use of the clock RxCK1.

The FIFO memory 67 is a buffer memory that temporarily holds the signals RxF2, RxR2, and RxP2 and the signal SEL supplied from the reception section 63. In this example, the FIFO memory 67 is configured to perform writing of data with use of the clock RxCK2 and perform reading of data with use of the clock RxCK1.

The selector 68 is configured to select, based on the signal SEL read from the FIFO memory 67, the signals RxF1, RxR1, and RxP1 read from the FIFO memory 66 or the signals RxF2, RxR2, and RxP2 read from the FIFO memory 67 and output the selected signals as the signals RxF, RxR, and RxP, respectively.

The reception section 63 corresponds to a specific example of "first reception section" in an embodiment of the present disclosure. The reception section 62 corresponds to a specific example of "second reception section" in an embodiment of the present disclosure. The signal generation section 65 and the selector 68 correspond to specific examples of "selection control section" in an embodiment of the present disclosure.

Next, some of transitions of the symbol will be described in detail as examples.

FIGS. 34 and 35 illustrate an operation in a case where the symbol makes the transition from "+x" to "+y", where parts (A) to (C) in FIG. 34 illustrate waveforms of the equalized signals SIGA2, SIGB2, and SIGC2, respectively, and parts (A) to (C) in FIG. 35 illustrate a difference AB2 between the signals SIGA2 and SIGB2, a difference BC2 between the signals SIGB2 and SIGC2, and a difference CA2 between the signals SIGC2 and SIGA2, respectively. In this example, the lengths of the transmission paths 9A to 9C are sufficiently short.

When the symbol makes the transition from "+x" to "+y", as illustrated in FIG. 34, the equalizer 61 emphasizes transitions in the signals SIGA to SIGC to generate the signals SIGA2 to SIGC2, respectively. At this time, the differences AB2, BC2, and CA2 are as illustrated in FIG. 35. Thus, in the communication system 2, equalization is performed to make transitions of the waveforms abrupt; therefore, the eye is allowed to be expanded. Therefore, in such a transition, the selector 68 selects the signals RxF1, RxR1, and RxP1 generated, based on the equalized signals SIGA2, SIGB2, and SIGC2, and outputs selected signals RxF1, RxR1, and RxP1 as the signals RxF, RxR, and RxP, respectively.

FIGS. 36 and 37 illustrates an operation in a case where the symbol makes the transition from "+x" to "−z", where parts (A) to (C) in FIG. 36 illustrate waveforms of the equalized signals SIGA2, SIGB2, and SIGC2, respectively, and parts (A) to (C) in FIG. 37 illustrate waveforms of the differences AB2, BC2, and CA2, respectively.

When the symbol makes the transition from "+x" to "−z", as illustrated in FIG. 36, the equalizer 61 emphasizes transitions in the signals SIGA to SIGC to generate the signals SIGA2 to SIGC2, respectively. At this time, the differences AB2, BC2, and CA2 are as illustrated in FIG. 37. Thus, as illustrated in the part (A) in FIG. 37, the waveform of the difference AB2 causes undershoot during the transition and the eye may be narrowed accordingly. Therefore, in such a transition, the selector 68 selects the signals RxF2, RxR2, and RxP2 generated, based on the signals SIGA, SIGB, and SIGC that are not equalized, and outputs the signals RxF2, RxR2, and RxP2 as the signals RxF, RxR, and RxP, respectively.

Thus, in the communication system 2, the signals SIGA, SIGB, and SIGC are selectively equalized; therefore, for example, in a case of a transition in which equalization causes narrowing of the eye, the communication system is allowed not to perform equalization. Accordingly, in the communication system 2, communication quality is allowed to be improved.

As described above, in this embodiment, equalization is selectively performed on the signals SIGA to SIGC; therefore, communication quality is allowed to be improved.

Modification Example 2-1

In the above-described embodiment, the signal generation section 65 of the reception section 63 generates the signal SEL; however, the present disclosure is not limited thereto. Alternatively, for example, the signal generation section 36 of the reception section 62 may generate the signal SEL. Moreover, each of the signal generation section 36 of the reception section 62 and the signal generation section 65 of the reception section 63 may generate the signal SEL, and the selector 68 may perform a selection operation, based on these signals SEL.

Modification Example 2-2

Moreover, a communication system may be configured of a combination of the transition unit 10 according to the first embodiment and the reception unit 60 according to this embodiment. In this case, the transmission unit 10 performs pre-emphasis on the signals SIGA, SIGB, and SIGC and the reception unit 60 performs equalization on the signals SIGA, SIGB, and SIGC; therefore, data transmission and reception are allowed to be performed through longer transmission paths 9A, 9B, and 9C.

3. Application Examples

Next, application examples of the communication systems described in the above-described embodiments and the above-described modification examples will be described below.

FIG. 38 illustrates an appearance of a smartphone 300 (a multi-functional cellular phone) to which any one of the communication systems according to the above-described embodiments and the like is applied. The smartphone 300 includes various devices, and any one of the communication systems according to the above-described embodiments and the like is applied to a communication system configured to exchange data between these devices.

FIG. 39 illustrates a configuration example of an application processor 310 used in the smartphone 300. The application processor 310 includes a CPU (Central Processing Unit) 311, a memory control section 312, a power supply control section 313, an external interface 314, a GPU (Graphics Processing Unit) 315, a media processing section 316, a display control section 317, and an MIPI (Mobile Industry Processor Interface) interface 318. The CPU 311, the memory control section 312, the power supply control section 313, the external interface 314, the GPU 315, the media processing section 316, and the display control section 317 are connected to a system bus 319 in this example, and they exchanges data therebetween through the system bus 319.

The CPU 311 is configured to process various information treated in the smartphone 300 according to a program. The memory control section 312 is configured to control the memory 501 used when the CPU 311 performs information processing. The power supply control section 313 is configured to control a power supply of the smartphone 300.

The external interface 314 is an interface used to communicate with an external device, and is connected to a wireless communication section 502 and an image sensor 503 in this example. The wireless communication section 502 is configured to perform wireless communication with base stations of cellular phones, and may include, for example, a base band section, an RF (Radio Frequency) front end section, and the like. The image sensor 503 is configured to acquire an image, and may include, for example, a CMOS sensor, and the like.

The GPU 315 is configured to perform image processing. The media processing section 316 is configured to process information such as sounds, texts, and graphics. The display control section 317 is configured to control a display 504 through the MIPI interface 318. The MIPI interface 318 is configured to transmit an image signal to the display 504. As the image signal, for example, a signal of a YUV format, an RGB format, or the like may be used. The communication system according to any one of the above-described embodiments and the like is applied to a communication system between the MIPI interface 318 and the display 504.

FIG. 40 illustrates a configuration example of an image sensor 410. The image sensor 410 includes a sensor section 411, an ISP (Image Signal Processor) 412, a JPEG (Joint Photographic Experts Group) encoder 413, a CPU 414, a RAM (Random Access Memory) 415, a ROM (Read Only Memory) 416, a power supply control section 417, an I$^2$C (Inter-Integrated Circuit) interface 418, and an MIPI interface 419. Respective blocks of these components are connected to a system bus 420 in this example, and are allowed to exchange data therebetween through the system bus 420.

The sensor section 411 is configured to acquire an image, and may be configured of, for example, a CMOS sensor. The ISP 412 is configured to perform predetermined processing on the image acquired by the sensor section 411. The JPEG encoder 413 is configured to encode the image processed by the ISP 412 to generate a JPEG-format image. The CPU 414 is configured to control respective blocks of the image sensor 410 according to a program. The RAM 415 is a memory used when the CPU 414 performs information processing. The ROM 416 is configured to hold a program that is to be executed in the CPU 414. The power supply control section 417 is configured to control a power supply of the image sensor 410. The I$^2$C interface 418 is configured to receive a control signal from the application processor 310. Moreover, although not illustrated, the image sensor 410 is configured to also receive a clock signal, in addition to the control signal, from the application processor 310. More specifically, the image sensor 410 is allowed to operate, based on clock signals of various frequencies. The MIPI interface 419 is configured to transmit an image signal to the application processor 310. As the image signal, for example, a signal of a YUV-format, an RGB format, or the like may be used. The communication system according to any one of the above-described embodiments and the like is applied to a communication system between the MIPI interface 419 and the application processor 310.

Although the present technology is described referring to the embodiments, the modification examples thereof, and application examples to electronic apparatuses, the present technology is not limited thereto, and may be variously modified.

For example, in the respective above-described embodiments, each of the signals SIGA, SIGB, and SIGC makes a transition from one of three voltage states SH, SM, and SL to another; however, the number of voltage states is not limited thereto. Alternatively, for example, a transition may be made between two voltage states, or from one of four or more voltage states to another.

Moreover, in the respective above-described embodiments, communication is performed with use of three signals SIGA, SIGB, and SIGC; however, the number of signals is not limited thereto. Alternatively, for example, communication may be performed with use of two signals or four or more signals.

It is to be noted that the effects described in this description are merely examples; therefore, effects in the present technology are not limited thereto, and the present technology may have other effects.

It is to be noted that the present technology is allowed to have following configurations.

(1) A transmission unit including:
a transmission section configured to selectively perform emphasis, based on a data signal to generate one or a plurality of transmission signals; and
a control section configured to determine whether or not to perform emphasis, based on a transition pattern of the data signal to control the transmission section.

(2) The transmission unit according to (1), in which
the data signal indicates a sequence of transmission symbols, and
the control section compares two successive transmission symbols with each other and determines whether or not to perform emphasis, based on a comparison result.

(3) The transmission unit according to (1) to (2), in which
the control section includes a look-up table indicating a relationship between the transition pattern and a flag indicating whether or not to perform emphasis, and determines whether or not to perform emphasis, based on the look-up table.

(4) The transmission unit according to (3), in which the look-up table is configured to be programmable.

(5) The transmission unit according to any one of (1) to (4), in which the transmission section performs emphasis to increase a high-frequency component of the transmission signal.

(6) The transmission unit according to (5), in which
each transmission signal makes a transition from one of a plurality of voltage states to another, and
the control section determines that emphasis is supposed to be performed on the transmission signal in some of transitions from one of the plurality of voltage states to another.

(7) The transmission unit according to (5) or (6), in which
the transmission section generates three transmission signals,
each of the transmission signals makes a transition from one of a first voltage state, a second voltage state, and a third voltage state to another, the third voltage state having a voltage level between a voltage level of the first voltage states and a voltage level of the second voltage state,
the control section determines that emphasis is supposed to be performed on a transmission signal that makes a transition from the first voltage state and the third voltage state to the second voltage state of the three transmission signals, and
the control section determines that emphasis is supposed to be performed on a transmission signal that makes a transition from the second voltage state and the third voltage state to the first voltage state of the three transmission signals.

(8) The transmission unit according to (7), in which the control section determines that emphasis is supposed to be performed on a transmission signal maintained in the first voltage state and the second voltage state of the three transmission signals.

(9) The transmission unit according to (7), in which
the control section determines that emphasis is not supposed to be performed on a transmission signal that makes a transition from the first voltage state and the second voltage state to the third voltage state of the three transmission signals, and
the control section determines that emphasis is not supposed to be performed on a transmission signal maintained in the third voltage state of the three transmission signals.

(10) The transmission unit (5) or (6), in which
the transmission section generates a first transmission signal, a second transmission signal, and a third transmission signal,
each of the transmission signals makes a transition from one of a first voltage state, a second voltage state, and a third voltage state to another, the third voltage state having a voltage level between a voltage level of the first voltage state and a voltage level of the second voltage state, and
the control section determines that emphasis is supposed to be performed on the second transmission signal and the third transmission signal when the first transmission signal makes a transition from the first voltage state to the third voltage state, the second transmission signal makes a transition from the second voltage state to the first voltage state, and the third transmission signal makes a transition from the third voltage state to the second voltage state.

(11) The transmission unit according to (5) or (6), in which
the transmission section generates a first transmission signal, a second transmission signal, and a third transmission signal,
each of the transmission signals makes a transition from one of a first voltage state, a second voltage state, and a third voltage state to another, the third voltage state having a voltage level between a voltage level of the first voltage state and a voltage level of the second voltage state, and
the control section determines that emphasis is supposed to be performed when polarities of a difference signal between the first transmission signal and the second transmission signal, a difference signal between the second transmission signal and the third transmission signal, and a difference signal between the first transmission signal and the third transmission signal are changed.

(12) The transmission unit according to any one of (1) to (4), in which the transmission section performs emphasis to reduce a low-frequency component of the transmission signal.

(13) The transmission unit according to (12), in which
each transmission signal makes a transition from one of a plurality of voltage states to another, and
the control section determines that emphasis is supposed to be performed on each transmission signal when the transmission signal is maintained in some voltage states of the plurality of voltage states.

(14) The transmission unit according to (12) or (13), in which
the transmission section generates three transmission signals,
each of the transmission signals makes a transition from one of a first voltage state, a second voltage state, and a third voltage state to another, the third voltage state having a voltage level between a voltage level of the first voltage state and a voltage level of the second voltage state, and
the control section determines that emphasis is supposed to be performed on a transmission signal maintained in the first voltage state and the second voltage state of the three transmission signals.

(15) The transmission unit according to (14), in which the control section determines that emphasis is not supposed to be performed on a transmission signal maintained in the third voltage state of the three transmission signals.

(16) The transmission unit according to any one of (1) to (15), in which
the transmission section generates a plurality of transmission signals, and
the control section individually determines whether or not to perform emphasis on each of the plurality of transmission signals.

(17) The transmission unit according to any one of (1) to (15), in which
the transmission section generates a plurality of transmission signal, and
the control section collectively determines whether or not to perform emphasis on the plurality of transmission signals.

(18) A transmission unit including:
a transmission section configured to generate one or a plurality of transmission signals, based on a data signal indicating a sequence of transmission symbols and to correct a voltage level of each transmission signal; and
a control section configured to compare two transmission symbols adjacent to each other on a time axis in the data signal with each other and control the transmission section to correct the voltage level, based on a comparison result.

(19) A reception unit including:
a first reception section configured to receive one or a plurality of transmission signals;
an equalizer configured to perform equalization on the one transmission signal or each of the plurality of transmission signals;
a second reception section configured to receive the one or the plurality of transmission signals equalized; and
a selection control section configured to select a first output signal of the first reception section or a second output signal of the second reception section, based on a transition pattern of the one or the plurality of transmission signals received by the first reception section or the second reception section.

(20) The reception unit according to (19), in which the selection control section determines a sequence of voltage states in the one or the plurality of transmission signals, and compares two voltage states adjacent to each other on a time axis with each other, and selects the first output signal or the second output signal, based on a comparison result.

(21) The reception unit according to (19) or (20), in which the control section includes a look-up table indicating a relationship between the transition pattern and a flag indicating whether or not to perform equalization, and selects the first output signal or the second output signal, based on the look-up table.

(22) The reception unit according to any one of (19) to (21), in which the equalizer performs equalization to increase a high-frequency component of the transmission signal.

(23) The reception unit according to any one of (19) to (22), in which
the one or the plurality of transmission signals are a plurality of transmission signals that are three transmission signals, and
each of the three transmission signals makes a transition from one of a first voltage state, a second voltage state, and a third voltage state to another, the third voltage state having a voltage level between a voltage level of the first voltage states and a voltage level of the second voltage state.

(24) A communication system including:
a transmission unit configured to transmit one or a plurality of transmission signals; and
a reception unit configured to receive the one or the plurality of transmission signals,
in which the transmission unit includes
a transmission section configured to selectively perform emphasis, based on a data signal to generate the one or the plurality of transmission signals; and a control section configured to determine whether or not to perform emphasis, based on a transition pattern of the data signal to control the transmission section.

(25) The communication system according to (24), in which the control section includes a look-up table indicating a relationship between the transition pattern and a flag indicating whether or not to perform emphasis, and determines whether or not to perform emphasis, based on the look-up table, the reception unit includes a reception section configured to receive the one or the plurality of transmission signals, and a control signal generation section configured to generate a control signal, based on the one or the plurality of transmission signals received by the reception section, and the transmission unit further includes a table setting section configured to program the look-up table, based on the control signal.

(26) A communication system including:

a transmission unit configured to transmit one or a plurality of transmission signals; and a reception unit configured to receive the one or the plurality of transmission signals, in which the transmission unit includes a transmission section configured to selectively perform emphasis, based on a data signal to generate the one or the plurality of transmission signals, and a control section configured to determine whether or not to perform emphasis, based on a transition pattern of the data signal to control the transmission section, and the reception unit includes a first reception section configured to receive the one or the plurality of transmission signals, an equalizer configured to perform equalization on the one transmission signal or each of the plurality of transmission signals, a second reception section configured to receive the one or the plurality of transmission signals equalized, and a selection control section configured to select a first output signal of the first reception section or a second output signal of the second reception section, based on a transition pattern of the one or the plurality of transmission signals received by the first reception section or the second reception section.

Additionally or alternatively, it is to be noted that the present technology is allowed to have the following configurations.

(1) A transmitter comprising:

a transmission control circuit configured to determine whether or not to perform an emphasis on a data signal, based on a transition pattern of the data signal; and a transmission driver configured to selectively perform the emphasis based on a result of the determination by the transmission control circuit, to generate at least one transmission signal.

(2) The transmitter according to (2), wherein the data signal indicates a sequence of transmission symbols, and the transmission control circuit is configured to compare two successive transmission symbols and determine whether or not to perform the emphasis based on a result of the comparison.

(3) The transmitter according to (1) or (2), wherein the transmission control circuit includes a look-up table indicating a relationship between the transition pattern and a flag indicating whether or not to perform the emphasis, and is configured to determine whether or not to perform the emphasis based on the look-up table.

(4) The transmitter according to (3), wherein the look-up table is programmable.

(5) The transmitter according to any one of (1) to (4), wherein the transmission driver is configured to selectively perform the emphasis to selectively increase a high-frequency component of the at least one transmission signal.

(6) The transmitter according to (5), wherein respective ones of the at least one transmission signal make a transition from a first voltage state of a plurality of voltage states to a second voltage state of the plurality of voltage states, and the transmission control circuit is configured to determine that the emphasis is to be performed on the respective ones of the at least one transmission signal in some of the corresponding transitions.

(7) The transmission unit according to (5) or (6), wherein the at least one transmission signal is three transmission signals, respective ones of the three transmission signals make a transition from one of a high voltage state, a low voltage state, and an intermediate voltage state to another, the transmission control circuit is configured to determine that the emphasis is to be performed on a respective transmission signal that makes a transition from the high voltage state or the intermediate voltage state to the low voltage state, and the transmission control circuit is configured to determine that the emphasis is to be performed on a respective transmission signal that makes a transition from the low voltage state or the intermediate voltage state to the high voltage state.

(8) The transmission unit according to (7), wherein the transmission control circuit is configured to determine that the emphasis is to be performed on a respective transmission signal that is maintained in the high voltage state or the low voltage state.

(9) The transmission unit according to (7) or (8), wherein the transmission control circuit is configured to determine that the emphasis is not to be performed on a respective transmission signal that makes a transmission from the high voltage state or the low voltage state to the intermediate voltage state, and the transmission control circuit is configured to determine that the emphasis is not to be performed on a respective transmission signal that is maintained in the intermediate voltage state.

(10) The transmission unit according to (5) or (6), wherein the at least one transmission signal is a first transmission signal, a second transmission signal, and a third transmission signal, respective ones of the first, second, and third transmission signals make a transition from one of a high voltage state, a low voltage state, and an intermediate voltage state to another, and the transmission control circuit is configured to determine that the emphasis is to be performed on the second transmission signal and the third transmission signal when the first transmission signal makes a transition from the high voltage state to the intermediate voltage state, the second transmission signal makes a transition from the low voltage state to the high voltage state, and the third transmission signal makes a transition from the intermediate voltage state to the low voltage state.

(11) The transmission unit according to (5) or (6), wherein
the at least one transmission signal is a first transmission signal, a second transmission signal, and a third transmission signal,
respective ones of the first, second, and third transmission signals make a transition from one of a high voltage state, a low voltage state, and an intermediate voltage state to another, and
the transmission control circuit is configured to determine that the emphasis is to be performed when there is a change between respective polarities of a first difference signal between the first transmission signal and the second transmission signal, a second difference signal between the second transmission signal and the third transmission signal, and a third difference signal between the first transmission signal and the third transmission signal.

(12) The transmitter according to any one of (1) to (4), wherein the transmission driver is configured to selectively perform the emphasis to selectively reduce a low-frequency component of the at least one transmission signal.

(13) The transmitter according to (12), wherein
respective ones of the at least one transmission signal make a transition from a first voltage state of a plurality of voltage states to a second voltage state of the plurality of voltage states, and
the transmission control circuit is configured to determine that the emphasis is to be performed on the respective ones of the at least one transmission signal that are maintained in some voltage states of the plurality of voltage states.

(14) The transmitter according to (12) or (13), wherein
the at least one transmission signal is three transmission signals,
respective ones of the three transmission signals make a transition from one of a high voltage state, a low voltage state, and an intermediate voltage state to another, and
the transmission control circuit is configured to determine that the emphasis is to be performed on a respective transmission signal that is maintained in the high voltage state or the low voltage state.

(15) The transmitter according to (14), wherein the transmission control circuit is configured to determine that emphasis is not to be performed on a respective transmission signal that is maintained in the intermediate voltage state.

(16) The transmitter according to any one of (1) to (15), wherein
the at least one transmission signal is a plurality of transmission signal, and
the transmission control circuit is configured to individually determine whether or not to perform emphasis on respective ones of the plurality of transmission signals.

(17) The transmitter according to any one of (1) to (15), wherein
the at least one transmission signal is a plurality of transmission signal, and
the transmission control circuit is configured to collectively determine whether or not to perform emphasis on respective ones of the plurality of transmission signals.

(18) An imaging system comprising:
a CMOS image sensor configured to generate the data signal; and
the transmitter according to any one of (1) to (17).

(19) A receiver comprising:
a first reception circuit configured to receive at least one transmission signal and output a first output signal;
an equalizer configured to perform an equalization on the at least one transmission signal;
a second reception circuit configured to receive at least one equalized transmission signal from the equalizer and output a second output signal; and
a selection control circuit configured to select between the first output signal and the second output signal based on a transition pattern of the at least one transmission signal.

(20) The receiver according to (19), wherein the selection control circuit determines a sequence of voltage states in the at least one transmission signal, compares two time-adjacent voltage states of the sequence of voltage states, and selects between the first output signal and the second output signal based on a result of the comparison.

(21) The receiver according to (19) or (20), wherein the selection control circuit includes a look-up table indicating a relationship between the transition pattern and a flag indicating whether or not to perform the emphasis, and selects between the first output signal and the second output signal based on the look-up table.

(22) The receiver according to any one of (19) to (21), wherein the equalizer is configured to perform equalization to increase a high-frequency component of the at least one transmission signal.

(23) The receiver according to any one of (19) to (22), wherein the at least one transmission signal is three transmission signals, and
respective ones of the three transmission signals make a transition from one of a high voltage state, a low voltage state, and an intermediate voltage state to another.

(24) A device comprising:
a circuit configured to generate a data signal; and
the receiver according to any one of (19) to (23).

(25) A communication system comprising:
a transmitter including
a transmit control circuit configured to determine whether or not to perform a pre-emphasis on a data signal, based on a transition pattern of the data signal, and
a transmit driver configured to selectively perform the pre-emphasis based on the determination by the transmit control circuit, to generate at least one transmission signal; and
a selection control circuit configured to select between the first output signal and the second output signal based on a transition pattern of the at least one transmission signal.

(26) A communication system comprising:
a transmitter; and
a receiver including
a first reception circuit configured to receive the at least one transmission signal and output a first output signal,
an equalizer configured to perform a post-emphasis on the at least one transmission signal to generate at least one equalized transmission signal,
a second reception circuit configured to receive the at least one equalized transmission signal from the equalizer and output a second output signal, and
a selection control circuit configured to select between the first output signal and the second output signal based on a transition pattern of the at least one transmission signal.

It should be understood by those skilled in the art that various modifications, combinations, sub-combinations, and alterations may occur depending on design requirements and other factors insofar as they are within the scope of the appended claims or the equivalents thereof.

REFERENCE SIGNS LIST 1, 1E, 2 communication system
9A to 9C transmission path
10, 10B, 10E, 40 transmission unit
11, 11B signal generation section
12 register
13 to 15, 14B, 15B flip-flop
16E LUT generation section
19, 19B, 59 LUT
20, 20B, 50 transmission section
21 output control section
22A to 22C output section
23 emphasis control section
24A to 24C output section
25, 26 transistor
27, 28 resistor device
30, 30E, 60 reception unit
31A to 31C resistor device
32A to 32C amplifier
33 clock generation section
34, 35 flip-flop
36, 36E signal generation section
37E pattern detection section
61 equalizer
62, 63 reception section
64 register
65 signal generation section
66, 67 FIFO memory
68 selector
100, 110 symbol determination section
120, 130, 140, 150, 160, 170 logic circuit
121 to 125 AND circuit
180 OR circuit
AB, BC, CA, AB2, BC2, CA2 difference
CS, CS2, NS, PS2 symbol
EA to EC, EE, EA2 to EC2, EE2, SEL, SIGA to SIGC, SIGA2 to SIGC2, S1, S2, RxF, RxR, RxP, RxF1, RxR1, RxP1, RxF2, RxR2, RxP2, TxF, TxR, TxP signal
DET signal
EM eye mask
SH, SL, SM voltage state
RxCK, RxCK1, RxCK2, TxCK clock
TinA, TinB, TinC input terminal
TJ jitter
ToutA, ToutB, ToutC output terminal
VH high-level voltage
VL low-level voltage
VM middle-level voltage
V1 voltage

The invention claimed is:

1. A transmission unit including:
a transmission driver configured to selectively perform an emphasis based on a data signal, so as to generate at least one transmission signal; and
a transmission control circuit configured to determine whether or not to perform the emphasis based on a transition pattern among three or more voltage states of the data signal, so as to control the transmission driver.

2. The transmission unit according to claim 1, wherein
the data signal indicates a sequence of transmission symbols, and
the transmission control circuit compares two successive transmission symbols with each other and determines whether or not to perform the emphasis based on a comparison result.

3. The transmission unit according to claim 1, wherein the transmission control circuit utilizes a look-up table indicating a relationship between the transition pattern and a flag indicating whether or not to perform the emphasis, and determines whether or not to perform the emphasis based on the look-up table.

4. The transmission unit according to claim 3, wherein the look-up table is programmable.

5. The transmission unit according to claim 1, wherein the transmission driver performs the emphasis to increase a high-frequency component of the at least one transmission signal.

6. The transmission unit according to claim 5, wherein a respective transmission signal makes a plurality of transitions, respective ones of the plurality of transitions being from one of the three or more voltage states to another of the three or more voltage states, and
the transmission control circuit determines that the emphasis is to be performed on the respective transmission signal in at least one of the plurality of transitions.

7. The transmission unit according to claim 5, wherein
the at least one transmission signal is a first transmission signal, a second transmission signal, and a third transmission signal,
respective ones of the transmission signals make a transition from one of a first voltage state, a second voltage state, and a third voltage state to another of the first voltage state, the second voltage state, and the third voltage state, the third voltage state having a voltage level between a voltage level of the first voltage state and a voltage level of the second voltage state, and
the transmission control circuit determines that the emphasis is to be performed on the second transmission signal and the third transmission signal in a case where the first transmission signal makes a transition from the first voltage state to the third voltage state, the second transmission signal makes a transition from the second voltage state to the first voltage state, and the third transmission signal makes a transition from the third voltage state to the second voltage state.

8. The transmission unit according to claim 5, wherein
the at least one transmission signal is a first transmission signal, a second transmission signal, and a third transmission signal,
respective ones of the transmission signals make a transition from one of a first voltage state, a second voltage state, and a third voltage state to another of the first voltage state, the second voltage state, and the third voltage state, the third voltage state having a voltage level between a voltage level of the first voltage state and a voltage level of the second voltage state, and
the transmission control circuit determines that the emphasis is to be performed in a case where polarities of a difference signal between the first transmission signal and the second transmission signal, a difference signal between the second transmission signal and the third transmission signal, and a difference signal between the first transmission signal and the third transmission signal are changed.

9. The transmission unit according to claim 1, wherein
the at least one transmission signal is three transmission signals,
respective ones of the transmission signals make a transition from one of a first voltage state, a second voltage state, and a third voltage state to another of the first voltage state, the second voltage state, and the third voltage state, the third voltage state having a voltage level between a voltage level of the first voltage state and a voltage level of the second voltage state, the transmission control circuit determines that the emphasis is to be performed on a respective transmission signal that makes a transition from the first voltage state or the third voltage state to the second voltage state, and the transmission control circuit determines that the emphasis is to be performed on a respective transmission signal that makes a transition from the second voltage state or the third voltage state to the first voltage state.

10. The transmission unit according to claim 9, wherein the transmission control circuit determines that the emphasis is to be performed on a respective transmission signal that is maintained in the first voltage state or the second voltage state.

11. The transmission unit according to claim 9, wherein the transmission control circuit determines that the emphasis is not to be performed on a respective transmission signal that makes a transition from the first voltage state or the second voltage state to the third voltage state, and the transmission control circuit determines that the emphasis is not to be performed on a respective transmission signal that is maintained in the third voltage state.

12. The transmission unit according to claim 1, wherein the transmission driver performs the emphasis to reduce a low-frequency component of the at least one transmission signal.

13. The transmission unit according to claim 12, wherein a respective transmission signal makes a plurality of transitions, respective ones of the plurality of transitions being from one of the three or more voltage states to another of the three or more voltage states, and the transmission control circuit determines that the emphasis is to be performed on the respective transmission signal in a case where the respective transmission signal is maintained in some voltage states of the three or more voltage states.

14. The transmission unit according to claim 12, wherein the at least one transmission signal is three transmission signals, respective ones of the transmission signals make a transition from one of a first voltage state, a second voltage state, and a third voltage state to another of the first voltage state, the second voltage state, and the third voltage state, the third voltage state having a voltage level between a voltage level of the first voltage state and a voltage level of the second voltage state, and the transmission control circuit determines that the emphasis is to be performed on a respective transmission signal that is maintained in the first voltage state or the second voltage state.

15. The transmission unit according to claim 14, wherein the transmission control circuit determines that the emphasis is not to be performed on a respective transmission signal that is maintained in the third voltage state.

16. The transmission unit according to claim 1, wherein the at least one transmission signal is a plurality of transmission signals, and the transmission control circuit individually determines whether or not to perform the emphasis on the plurality of transmission signals.

17. The transmission unit according to claim 1, wherein the at least one transmission signal is a plurality of transmission signals, and the transmission control circuit collectively determines whether or not to perform the emphasis on the plurality of transmission signals.

18. The transmission unit according to claim 1, wherein the transmission driver includes a first output driver configured to set a voltage state of at least one output signal, and a second output driver configured to selectively perform the emphasis on the at least one output signal, so as to generate the at least one transmission signal, and the second output driver is separate from the first output driver.

19. The transmission unit according to claim 1, wherein the transmission driver is configured to set a voltage state of at least one output signal, and to selectively perform the emphasis on the at least one output signal, so as to generate the at least one transmission signal.

20. The transmission unit according to claim 1, wherein the transmission control circuit includes a first determination circuit configured to determine a current symbol of the data signal and a second determination circuit configured to determine a next symbol of the data signal, and the transmission control circuit is configured to determine whether or not to perform the emphasis based on the current symbol and the next symbol, and by referring to a lookup table.

21. A transmission unit including:

a transmission driver configured to generate at least one transmission signal based on a data signal indicating a sequence of transmission symbols, and to correct a voltage level of the at least one transmission signal; and a transmission control driver configured to compare two transmission symbols adjacent to each other on a time axis in the data signal with each other, and control the transmission section to correct the voltage level based on a comparison result, wherein respective ones of the transmission symbols indicate three or more voltage states.

22. A communication system including:

a transmission circuit configured to transmit at least one transmission signal; and a reception circuit configured to receive the at least one transmission signal, wherein the transmission circuit includes a transmission driver configured to selectively perform an emphasis based on a data signal, so as to generate the at least one transmission signal; and a transmission control circuit configured to determine whether or not to perform the emphasis based on a transition pattern among three or more voltage states of the data signal, so as to control the transmission driver.

23. A communication system including:

a transmission circuit configured to transmit at least one transmission signal; and a reception circuit configured to receive the at least one transmission signal, wherein the transmission circuit includes a transmission driver configured to selectively perform an emphasis based on a data signal, so as to generate the at least one transmission signal, and a transmission control circuit configured to determine whether or not to perform the emphasis based on a transition pattern among three or more voltage states of the data signal, so as to control the transmission section, and wherein the reception circuit includes a first reception amplifier configured to receive the at least one transmission signal, an equalizer configured to perform an equalization on the at least one transmission signal so as to generate at least one equalized signal, a second reception amplifier configured to receive the at least one equalized transmission signal, and a selection control circuit configured to select a first output signal of the first reception amplifier or a second output signal of the second reception amplifier, based on the transition pattern of the at least one transmission signal or on a transition pattern of the at least one equalized signal.

* * * * *